United States Patent
Oshima et al.

(10) Patent No.: US 8,451,372 B2
(45) Date of Patent: May 28, 2013

(54) PHOTOGRAPHING APPARATUS THAT ADJUSTS SHOOTING SETTINGS DURING SHOOTING

(75) Inventors: Mitsuaki Oshima, Kyoto (JP); Ikuo Fuchigami, Fukuoka (JP); Tadanori Tezuka, Fukuoka (JP); Tadamasa Toma, Osaka (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 12/594,020

(22) PCT Filed: Jul. 25, 2008

(86) PCT No.: PCT/JP2008/001987
§ 371 (c)(1),
(2), (4) Date: May 3, 2010

(87) PCT Pub. No.: WO2009/013907
PCT Pub. Date: Jan. 29, 2009

(65) Prior Publication Data
US 2010/0214439 A1    Aug. 26, 2010

(30) Foreign Application Priority Data
Jul. 26, 2007    (JP) .................................. 2007-194189

(51) Int. Cl.
*H04N 5/238*    (2006.01)
(52) U.S. Cl.
USPC ....................................................... 348/363
(58) Field of Classification Search
None
See application file for complete search history.

(56) References Cited

U.S. PATENT DOCUMENTS

| | | | |
|---|---|---|---|
| 3,683,765 A | 8/1972 | Iura | |
| 6,567,123 B1 | 5/2003 | Hashimoto | |
| 2004/0202456 A1* | 10/2004 | Sasagawa | ...................... 386/120 |
| 2005/0200744 A1* | 9/2005 | Kobayashi | ...................... 348/362 |
| 2006/0238620 A1 | 10/2006 | Asada et al. | |
| 2007/0166020 A1 | 7/2007 | Quan et al. | |

FOREIGN PATENT DOCUMENTS

| | | | |
|---|---|---|---|
| JP | 2003-87630 | | 3/2003 |
| JP | 2004-222074 | * | 8/2004 |
| JP | 2005-6198 | | 1/2005 |
| JP | 2005-136754 | | 5/2005 |
| JP | 2007-6343 | | 1/2007 |

OTHER PUBLICATIONS

European Search Report issued Jan. 18, 2011 in corresponding European Patent Application No. 08776884.2.
International Search Report issued Nov. 4, 2008 in International (PCT) Application No. PCT/JP2008/001987.
Toyoda, K., *Apex Hoshiki to Ev-chi, Zukai Camera no Shikumi*, Ed. 1 (Oct. 10, 2004), pp. 132-133.

* cited by examiner

*Primary Examiner* — Albert Cutler
(74) *Attorney, Agent, or Firm* — Wenderoth, Lind & Ponack, L.L.P.

(57) ABSTRACT

An image shooting apparatus, before the frame rate is actually changed, causes the aperture to transit to a value which ensure that the amount of exposure before the change of the frame rate is ensured after the change, in correspondence with the exposure time that can be ensured during the high-speed shooting; and causes the exposure time to transit to the exposure time that can be ensured during the high-speed shooting, so that the frame rate is changed quickly and the image is reproduced smoothly when a portion corresponding to the frame rate change is reproduced.

6 Claims, 36 Drawing Sheets

FIG.1
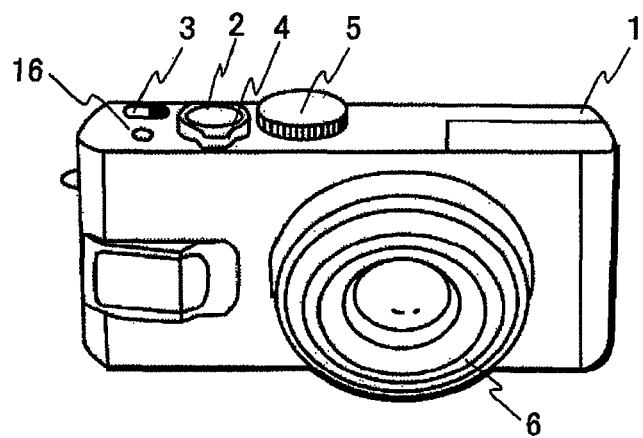
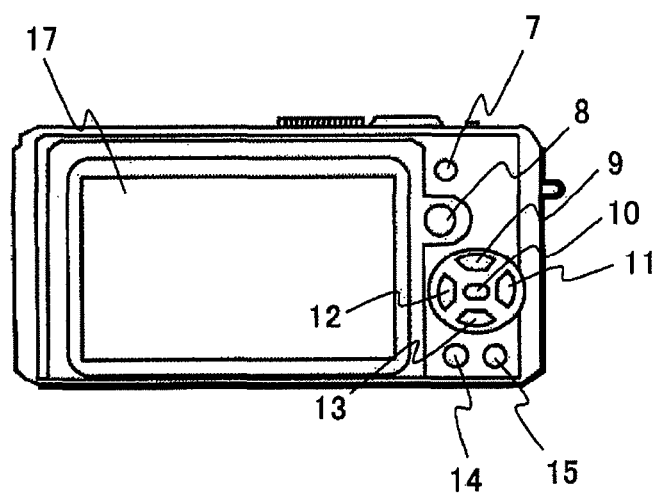

PHOTOGRAPHING APPARATUS THAT ADJUSTS SHOOTING SETTINGS DURING SHOOTING

BACKGROUND OF THE INVENTION

1. Technical Field

The present invention relates to an image shooting apparatus for shooting a video image at a predetermined frame rate, and especially relates to an image shooting technology for shooting an image by changing the frame rate in the middle of the shooting.

2. Background Art

There has been known an image shooting technology for shooting video images at different frame rates (hereinafter, also referred to as "shooting frame rates").

For example, when an image is shot at a frame rate higher than a normal frame rate and the recorded image is reproduced at the normal frame rate, a slow-motion image is displayed.

The Patent Document 1 identified below discloses an image shooting apparatus for shooting a video image by changing the shooting frame rate in the middle of the shooting. For example, when the image shooting apparatus receives a predetermined trigger signal from outside the apparatus while shooting a video image at a normal frame rate, it starts to perform a high-speed shooting at a high frame rate. The image shooting apparatus records the image by changing the signal charge output cycle of the image sensor, depending on the frame rate.

With this structure, when the image shot by the apparatus is reproduced, images are reproduced seamlessly continuing from an image shot at the normal, frame rate to an image shot at the high frame rate, namely, continuing from a normal-speed video image to a slow motion video image.

Patent Document 1: Japanese Patent Application Publication. No. 2003-87630

SUMMARY OF THE INVENTION

However, in the above-described image shooting apparatus, when an image is shot at the high frame rate, the exposure time becomes shorter than when an image is shot at the normal frame rate due to the shorter signal charge output cycle of the image sensor, thus the amount of exposure becomes smaller, and the image signal level is decreased.

Therefore, the above-described image shooting apparatus has a problem that images shot at the high frame rate are darker when they are reproduced, than images shot at the normal frame rate.

Also, when the decrease of the image signal level is supplemented by the amplification of the signal, noise is also amplified, and the image quality of the reproduced image is decreased. This is another problem of the above-described image shooting apparatus.

It is thus an object of the present invention to provide an image shooting apparatus that can shoot a video image by changing the shooting frame rate in the middle of the shooting, and can shoot a video image so that the brightness of the reproduced image is kept even if a change occurs between the normal speed image and the slow motion image, and the image quality of the slow reproduced image is not decreased.

The above-described object is fulfilled by an image shooting apparatus comprising: an imaging unit operable to read out signals from an image sensor and output image frames in sequence at a predetermined frame rate, the image sensor collecting charges through a photoelectric conversion of incident light; a frame rate changing unit operable to change a frame rate while the imaging unit outputs the image frames in sequence; an aperture adjusting unit operable to adjust a level of aperture that determines an amount of the incident light; an exposure time adjusting unit operable to adjust an exposure time that is a time taken for collecting the charges through the photoelectric conversion of the incident light; a determining unit operable to determine a post-change, aperture level so that a post-change amount is substantially equal to a pre-change amount, the post-change amount being an amount of collected charges corresponding to each frame of image shot at a post-change frame rate, the pre-change amount being an amount of collected charges corresponding to each frame of image shot at a pre-change frame rate, where the frame rate changing unit changes the frame rate from the pre-change frame rate to the post-change frame rate; and a control unit operable, before the change of the frame rate, to control the aperture adjusting unit to adjust the level of aperture to transit to the post-change aperture level determined by the determining unit, and to control the exposure time adjusting unit to adjust the exposure time in accordance with the level of aperture in transition so that the post-change amount of collected charges is substantially equal to the pre-change amount of collected charges.

With the above-described structure, the image shooting apparatus, before actually-changing the frame rate, causes the exposure time and aperture to transit to respective values thereof that correspond to the frame rate after change, while keeping the same amount of exposure. This makes it possible to keep the amount of exposure per frame before and after the frame rate is changed.

More specifically, the image shooting apparatus causes the exposure time and aperture to transit so that the amount of exposure per frame before the change of the frame, rate is substantially equal to the amount of exposure per frame after the change of the frame rate, that is to say, the image shooting apparatus causes the exposure time and aperture to transit to respective values in a range which ensure that, when the shot image is reproduced, a visual change in the brightness of the reproduced image is not recognized in correspondence with the change of the frame rate.

Accordingly, when an image is shot by changing the frame rate in the middle of the shooting and the shot image is reproduced, the image is reproduced smoothly without darkening of the screen because the amount of exposure hardly varies before and after the change of the frame rate.

The above-stated image shooting apparatus may further comprise an instruction obtaining unit operable to obtain from outside an instruction for changing the frame rate while the image frames are output by the imaging unit in sequence, the determining unit determines the post-change aperture level when the instruction obtaining unit obtains the instruction for changing the frame rate, and when the instruction obtaining unit obtains the instruction, the control unit, before the change of the frame rate, controls the aperture adjusting unit and the exposure time adjusting unit to start adjusting respectively the level of aperture and the exposure time.

With the above-described structure, after receiving from the user an instruction, for preparing to change the frame rate, the image shooting apparatus causes the aperture and exposure time to start transiting, and the aperture and exposure time transit before the frame rate is actually changed. This makes it possible to change the frame rate speedily.

That is to say, compared with the case where, after receiving from the user an instruction for changing the frame rate, the apparatus adjusts the aperture and exposure time and then changes the frame rate, the above-described structure quickly changes the frame rate immediately after receiving an instruction from the user, thus producing an advantageous effect that a shutter opportunity is not missed.

In the above-stated image shooting apparatus, the determining unit may further determine a post-change exposure time in accordance with the post-change frame rate, and when having determined the post-change exposure time to be "1/a" times the exposure time before the change, may determine the post-change aperture level so that an area of opening of an aperture becomes substantially "a" times thereof, and the control unit controls the exposure time adjusting unit to adjust the exposure time to transit to the post-change exposure time determined by the determining unit.

With the above-described structure, the image shooting apparatus determines the exposure time based on the post-change frame rate. That is to say, the image shooting apparatus determines the exposure time to be in a range of time that can be taken for each frame at the post-change frame rate, and determines the level of aperture based on the determined exposure time. This makes it possible to keep the amount of exposure per frame before and after the frame rate is changed.

In the above-stated image shooting apparatus, after the frame rate changing unit returns the frame rate from the post-change frame rate to the pre-change frame rate, the control unit may control the aperture adjusting unit to adjust the level of aperture to transit from the post-change aperture level to an aperture level before the change, and control the exposure time adjusting unit to adjust the exposure time in accordance with the level of aperture in transition so that an amount of collected charges for each image frame after the return of the frame rate is substantially equal to an amount of collected charges for each image frame before the return.

With the above-described structure, when the frame rate is returned to the pre-change frame rate, the exposure time and aperture transit to respective values that correspond to the pre-change frame rate, while the amount of exposure is kept to be constant. This makes it possible to keep the amount of exposure per frame before and after the frame rate is changed, and the image can be reproduced smoothly, with no sudden brightening up of the screen.

In the above-stated image shooting apparatus, the post-change frame rate may be higher than the pre-change frame rate, the image shooting apparatus further comprises: a recording instruction obtaining unit operable to obtain an instruction for recording; a conversion unit operable to convert from an image frame output at the post-change frame rate to an image frame output at the pre-change frame rate; a storage unit storing the image frames output from the imaging unit, wherein, when the recording instruction obtaining unit obtain the instruction for recording after the frame rate changing unit changes the frame rate, the storage unit stores a predetermined number of images frames before and after the receiving of the recording instruction, and images frames other than the images frames before and after the receiving of the recording instruction are converted by the conversion unit and results of the conversion are stored in the storage unit.

With the above-described structure, only a predetermined number of frames before and after the input of the instruction are recorded at the post-change high frame rate. This makes it possible to restrict the whole amount of image data to be recorded, and record a desired image portion at the high frame rate.

The above-described object is also fulfilled by an image shooting apparatus comprising: an imaging unit operable to read out signals from an image sensor and output image frames in sequence at a predetermined frame rate, the image sensor collecting charges through a photoelectric conversion of incident light; a frame rate changing unit operable to change a frame rate while the imaging unit outputs the image frames in sequence; an aperture adjusting unit operable to adjust a level of aperture that determines an amount of the incident light; an exposure time adjusting unit operable to adjust an exposure time that is a time taken for collecting the charges through the photoelectric conversion of the incident light; a determining unit operable to determine a post-change aperture level so that a post-change amount is substantially equal to a pre-change amount, the post-change amount being an amount of collected charges per frame of image shot at a post-change frame rate, the pre-change amount being an amount of collected charges corresponding to each frame of image shot at a pre-change frame rate, where the frame rate changing unit changes the frame rate from the pre-change frame rate to the post-change frame rate; and a control unit operable, after the change of the frame rate, to control the aperture adjusting unit to adjust the level of aperture to transit to the post-change aperture level determined by the determining unit.

With the above-described structure, the image shooting apparatus first changes the frame rate, and causes the exposure time and aperture to transit to respective values thereof that are determined based on the post-change frame rate. This realizes a quick change of the values. This is because, different from a transition by the conventional automatic exposure, the image shooting apparatus of the present invention determines the post-change aperture level and adjusts the level of aperture to transit to the determined post-change aperture level, therefore only the time taken for the level of aperture to transit to the determined post-change aperture level is the time necessary for the transition.

BRIEF DESCRIPTION OF THE DRAWING

FIG. 1 shows an outer appearance of an image shooting apparatus 1 of the present invention.

Figure 2:
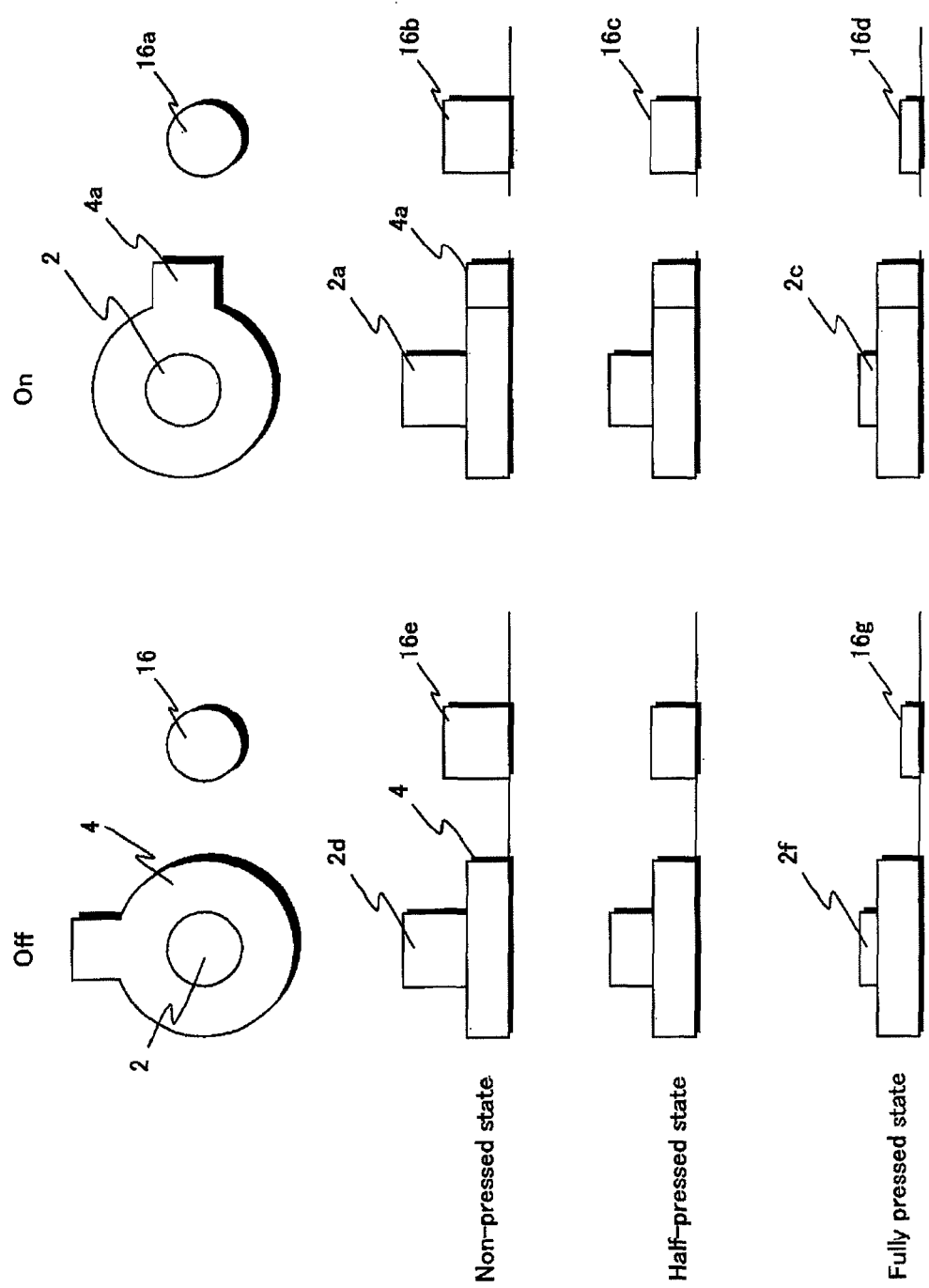
FIG. 2 shows the buttons and switches that are related to the high-speed shooting.

DESCRIPTION OF CHARACTERS 1 image shooting apparatus
2 shooting button
4 high-speed shooting preparation switch
5 mode dial
16 high-speed shooting switch
33 zoom driving unit
35 aperture driving unit
36 aperture
40 image sensor
42 shooting mode setting unit
48 high-speed shooting control unit
49 shutter time control unit
50 front end unit
51 amplifier.
52 A/D converter
53 exposure stop time control unit
54 image signal processing unit
55 aperture target value calculating unit
56 brightness detecting unit
57 AGC unit
58 frame synthesizing unit
60 frame rate control unit
72 reduction control unit
73 sensitivity control unit
74 noise filter
75 noise adding unit
76 exposure control unit
82 calculation unit
90 buffer memory
91 recording medium

DETAILED DESCRIPTION OF THE INVENTION

Embodiment 1

<Overview>

The image shooting apparatus of the present invention is aimed to prevent the variation in the signal level of the image signal to be recorded, by adjusting an amount of exposure per frame before a change of the shooting frame rate to be substantially equal to an amount of exposure per frame after the change of the shooting frame rate.

To keep a constant amount of exposure before and after the shooting frame rate is changed, the exposure time may be kept constant. However, since the maximum exposure time that can be assigned to a frame is determined according to the shooting frame rate, there may be a case when a necessary exposure time cannot be ensured.

The following are considered as the measures for dealing with such a case: adjusting the gain by increasing the amplification rate; and adjusting the aperture by opening the aperture. However, in the case of the gain adjustment, an amount of noise may drastically increase to decrease the image quality of the reproduced image. On the other hand, in the case of the aperture adjustment, since it is performed mechanically, it takes time and the shutter opportunity may be missed.

In view of these problems, the present invention is provided with a preparation period before the shooting changes from the shooting at the normal frame rate (hereinafter, referred to as "normal shooting") to the shooting at the high frame rate (hereinafter, referred to as "high-speed shooting"), so that the shooting modes change smoothly and the reproduced image is prevented from changing greatly in brightness, and the image quality is prevented from decreasing. Note that in the present image shooting apparatus, even if the preparation period cannot be provided, for example, for the reason that the high-speed shooting should be started immediately, almost the same reproduction is performed as the reproduction with the preparation period.

The following describes the image shooting apparatus of the present embodiment with reference to the attached drawings.

Hereinafter, images that are reproduced smoothly even if the images have been shot with a change of frame rate are referred to as seamless images. As far as there is no spec if is notification, it is presumed that the frame rate in the normal shooting is 60 fps (frame per second) and the frame rate in the high-speed shooting is 180 fps.

<Outer Appearance and Operation Procedure of Image Shooting Apparatus>

First, the outer appearance of the image shooting apparatus of the present invention and the operation procedure for high-speed shooting will be explained.

FIG. 1 shows an outer appearance of an image shooting apparatus 1 of the present invention.

The upper part of FIG. 1 is a perspective view of the image shooting apparatus 1, and the lower part of FIG. 1 is a rear view of the image shooting Apparatus 1.

The image shooting apparatus 1 is equipped with a shooting button 2, a power switch 3, a high-speed shooting mode switch 4, a mode dial 5, a lens 6, a focus/exposure fixing button 7, a function button 8, a function button upward 9, a function button rightward 11, a function button downward 13, a function button leftward 12, an enter button 10, a display button 14, a cancel button 15, a high-speed shooting switch 16, and a liquid crystal monitor 17.

The following describes functions of the shooting button 2, the high-speed shooting mode switch 4, and the high-Speed shooting switch 16 which are related to the high-speed shooting, with reference to FIG. 2.

FIG. 2 shows the buttons and switches that are related to the high-speed shooting.

The first row in FIG. 2 is a plan view of the shooting button 2, the high-speed shooting mode switch 4 and the high-speed shooting switch 16, and the second through fourth rows show the states in which the shooting button 2 and the high-speed shooting switch 16 are non-pressed, half-pressed, and fully pressed, respectively. Note that the drawing shows separate states of the shooting button 2 and the high-speed shooting switch 16, and is not to indicate that the shooting button 2 and the high-speed shooting switch 16 are interlocked to be simultaneously pressed or half-pressed.

Also, the column on the left-hand side shows the state in which the high-speed shooting mode switch 4 is "OFF", and the column on the right-hand side shows the state in which the high-speed shooting mode switch 4 is "ON". When a projection 4a provided in the high-speed shooting mode switch 4 is facing the high-speed shooting switch 16, the high-speed shooting mode switch 4 is in the state of "ON".

The shooting button 2 is a button that is used when a normal shooting is to be performed. When the shooting button 2 is fully pressed, the image shooting apparatus 1 starts a shooting; and when the shooting button 2 is released to return to the not-pressed state, the shooting ends.

The high-speed shooting mode switch 4 is a switch for setting a high-speed shooting with preparation period.

Also, the high-speed shooting switch 16 is a switch for actually starting a high-speed shooting. When the high-speed shooting switch 16 is fully pressed during the normal shooting, the high-speed shooting is started; and when the high-speed shooting switch 16 is released to return to the not-pressed state, the high-speed shooting ends and returns to the normal shooting.

The following explains how shooting is performed by the image shooting apparatus 1 when the shooting button 2 and the high-speed shooting switch 16 are pressed in each of the states in which the high-speed shooting mode switch 4 is "ON" and "OFF".

In the state in which the high-speed shooting mode switch 4 is "ON", the high-speed shooting with preparation period can be performed, and when the shooting button 2 changes from the not-pressed state (which is represented by a shooting button 2a) to the fully pressed state (which is represented by a shooting button 2c), the normal shooting is started. In this state, when the high-speed shooting switch 16 changes from the not-pressed state (which is represented by a high-speed shooting switch 16b) to the half-pressed state (which is represented by a high-speed shooting switch 16c), the preparation for the high-speed shooting is started; and when the high-speed shooting switch 16 changes from the half-pressed state to the fully pressed state (which is represented by a high-speed shooting switch 16d), the high-speed shooting is started.

In the state in which the high-speed shooting mode switch 4 is "OFF", the high-speed shooting without preparation period can be performed, and when the shooting button 2 changes from the not-pressed state (which is represented by a shooting button 2d) to the fully pressed state (which is represented by a shooting button 2f), the normal shooting is started. In this state, when the high-speed shooting switch 16 changes from the not-pressed state (which is represented by a high-speed shooting switch 16e) to the fully pressed state (which is represented by a high-speed shooting switch 16g), the high-speed shooting is started.

Here, a description is given of the image shooting apparatus of the present embodiment, with reference to the attached drawings.

<Structure>

Figure 3:
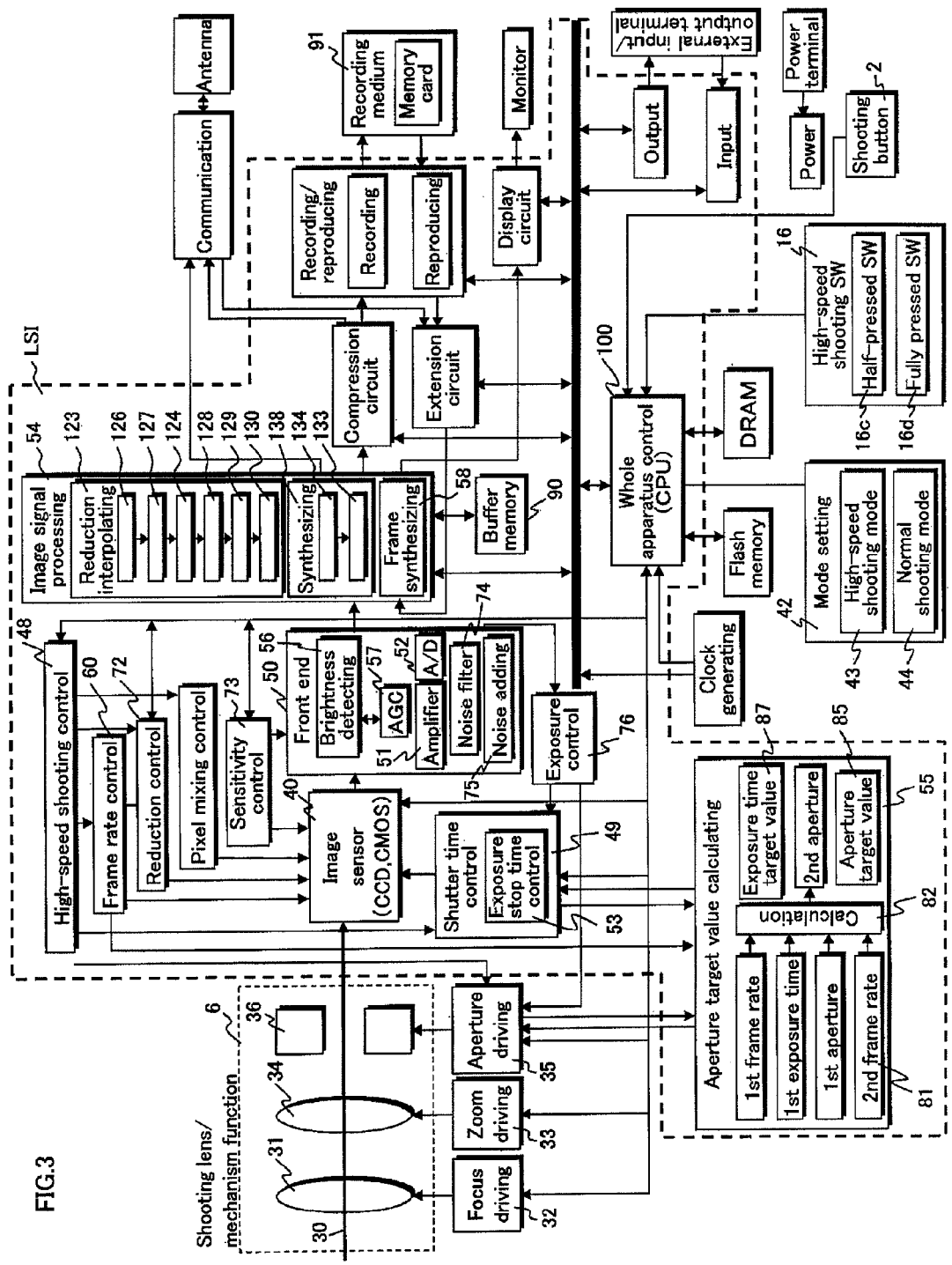
FIG. 3 is a functional block diagram showing the structure of the image shooting apparatus 1.

FIG. 3 is a functional block diagram showing the structure of the image shooting apparatus 1.

First, the normal shooting will be explained briefly with reference to the functional block diagram.

Incident light 30 enters the image shooting apparatus through a shooting lens/mechanism function 6. More specifically, the incident light 30 enters through a main lens 31 that is driven by a focus driving unit 32, is enlarged or reduced by a zoom lens 34 that is driven by a zoom driving unit 33, and is adjusted in brightness by an aperture 36 that is driven by an aperture driving unit 35.

The incident light 30 after adjustment in brightness by the aperture 36 forms an image in an image sensor 40 which is the CMOS (Complementary Metal-Oxide Semiconductor), the CCD (Charge-Coupled Device) or the like.

After performing the photoelectric conversion, the image sensor 40 sends an image output to a front end unit 50. The image output is then amplified by an amplifier 51, converted into a digital signal by an A/D converter 52, and subjected to the signal processing performed by an image signal processing unit 54 using a buffer memory 90.

An image signal which is output from the image signal processing unit 54 after the processing therein is compressed by a compression circuit, and is recorded into a recording medium 91 via a recording unit of a recording/reproduction unit.

The front end unit 50 further includes a brightness detecting unit 56, an AGC (Automatic Gain Central) unit 57, a noise filter 74, and a noise adding unit 75 having a function to add noise.

The image shooting apparatus 1 further includes a high-speed shooting control unit 48 for controlling the high-speed shooting, a frame rate control unit 60 for controlling the change of frame rate, a shutter time control unit 49 for controlling a shutter time, namely an exposure time, and an exposure control unit 76 for performing an automatic exposure. The shutter time control unit 49 includes an exposure stop time control unit 53. The actual exposure time is adjusted, by controlling the exposure stop time, and the adjustment is performed by the exposure stop time control unit 53.

Also, the image shooting apparatus 1 includes an aperture target value calculating unit 55. The aperture target value calculating unit 55 includes a first frame rate storing a frame rate at the normal shooting, a first exposure time storing an exposure time at the normal shooting, a first aperture level storing an aperture level at the normal shooting, a second frame rate 81 storing a frame rate at the high-speed shooting, and a calculation unit 82 for calculating a second aperture from these information stored in the aperture target value calculating unit 55, the second aperture being an aperture after a frame switch. The aperture target value calculating unit 55 also includes an aperture target value 85 and an exposure time target value 87. The aperture target value calculating unit 55 will be described in detail in <Aperture/exposure time transition process>.

The image shooting apparatus 1 further includes a sensitivity control unit 73 for changing an application voltage that sets the sensitivity of the image sensor 40, and a whole apparatus control unit 100 that includes a CPU and controls the whole apparatus. The whole apparatus control unit 100 controls the high-speed shooting and the like by referring to, for example, how the shooting button 2 and the high-speed shooting switch 16 are pressed (More specifically, the half-pressed state 16c or the fully pressed state 16d) and the mode that is set in a mode setting unit 42 (more specifically, a high-speed shooting mode 43 or a normal shooting mode 44).

The image shooting apparatus 1 roughly has two characteristics. One relates to the shooting method, and the other relates to the recording method. Of these, the shooting method is explained in the present embodiment, Embodiment 1.

Also, the recording method will be explained in Embodiment 2. The image signal processing unit 54 will be explained in Embodiment 2, as well.

<Method for Increasing Frame Rate>

Here, a brief description is given of an image sensor scanning method when the frame rate is increased.

The image sensor scanning method when the frame rate is increased includes an n-pixel mixing method and a reduction method, as well as a high-speed scanning method.

Now, the n-pixel mixing method and the reduction method will be described with reference to FIG. 4.

Figure 4:
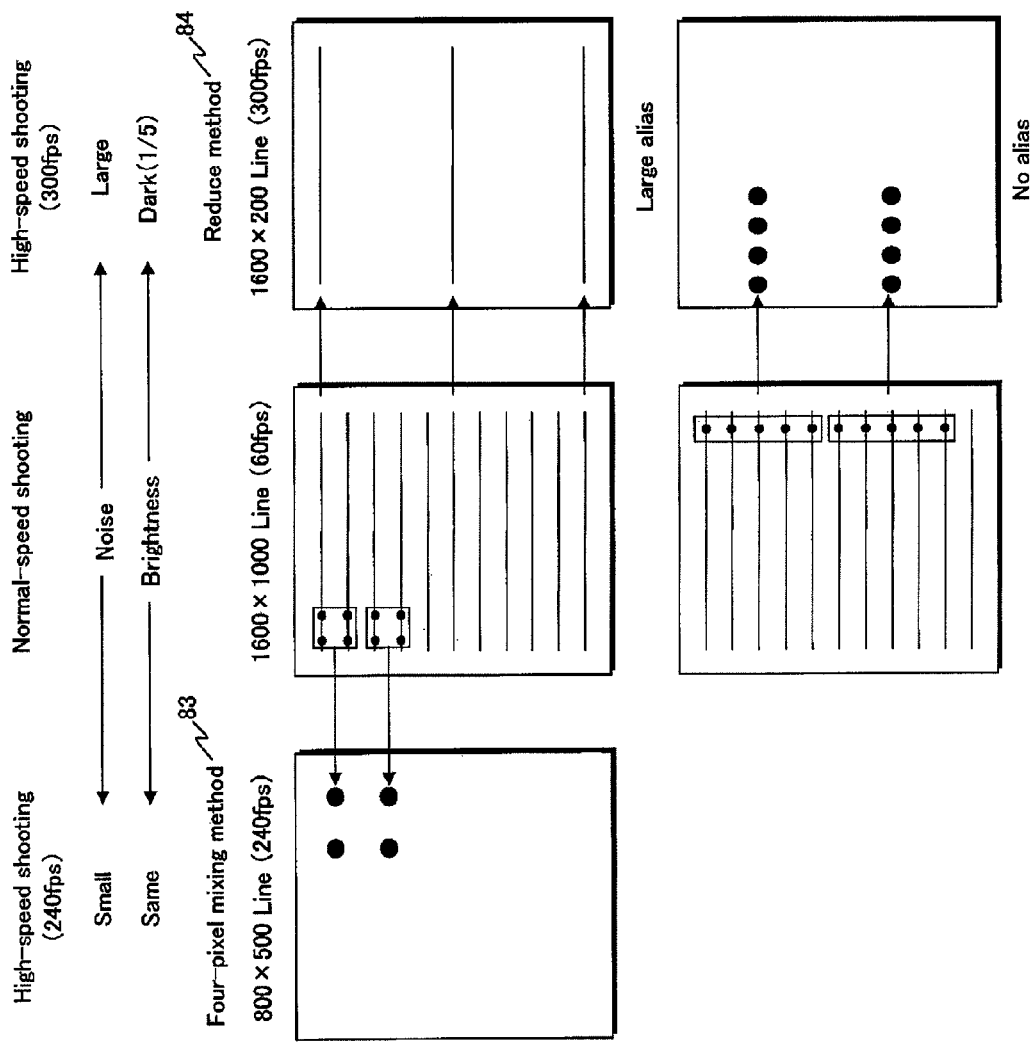
FIG. 4 shows the n-pixel mixing method and the reduction method.

FIG. 4 shows the n-pixel mixing method and the reduction method.

The drawing in the left-hand-side column shows an example of the n-pixel mixing method; the drawing in the middle column shows an example of the all line scanning at the normal shooting; and the drawing in the right-hand-side column shows an example of the reduction method. In the present embodiment, a four-pixel mixing method 83 is used as an example of the n-pixel mixing method, and a ⅕ reduction method 84 is used as an example of the reduction method.

In the ⅕ reduction method 84 shown in the right-hand-side column of FIG. 4, the frame rate is 300 fps, which is five times that of the normal shooting. In the four-pixel mixing method 83 shown in the left-hand-side column of FIG. 4, the frame rate is 240 fps, which is four times that at the normal shooting. Accordingly, by adopting the four-pixel mixing method 83 and the ⅕ reduction method 84, it is possible to perform high-speed shootings at two frame rates of 240 fps and 300 fps, with one image shooting apparatus.

As shown in the left-hand-side column, in the n-pixel mixing method, n pixels are mixed (added). Therefore, if the exposure time becomes ¼, the brightness does not change. Accordingly, the method does not produce the problem that the reproduction screen becomes dark. This means that processes such as those for adjusting the exposure time and for releasing the aperture are not necessary.

On the other hand, as shown in the right-hand-side column of FIG. 4, in the reduction method, the reproduction screen becomes dark when a change from a low frame rate to a high frame rate occurs. Therefore, the process for adjusting the exposure time and/or the process for releasing the aperture is necessary.

In the image shooting apparatus 1, high-speed shootings at two frame rates of 240 fps and 300 fps are available, and the process for changing the exposure time or aperture may be or may not be performed, depending on the frame rate.

The following describes only the case of the reduction method.

<Shooting Method of Image Shooting Apparatus 1>

The shooting method of image shooting apparatus 1 will be described with reference to FIGS. 5 to 13. The description will be given separately for two cases: the case in which the preparation period is provided; and the case in which the preparation period is not provided.

<Case in which Preparation Period is Provided>

First, the case in which the preparation period is provided before the high-speed shooting will be described with reference to FIGS. 5 to 9.

Figure 5:
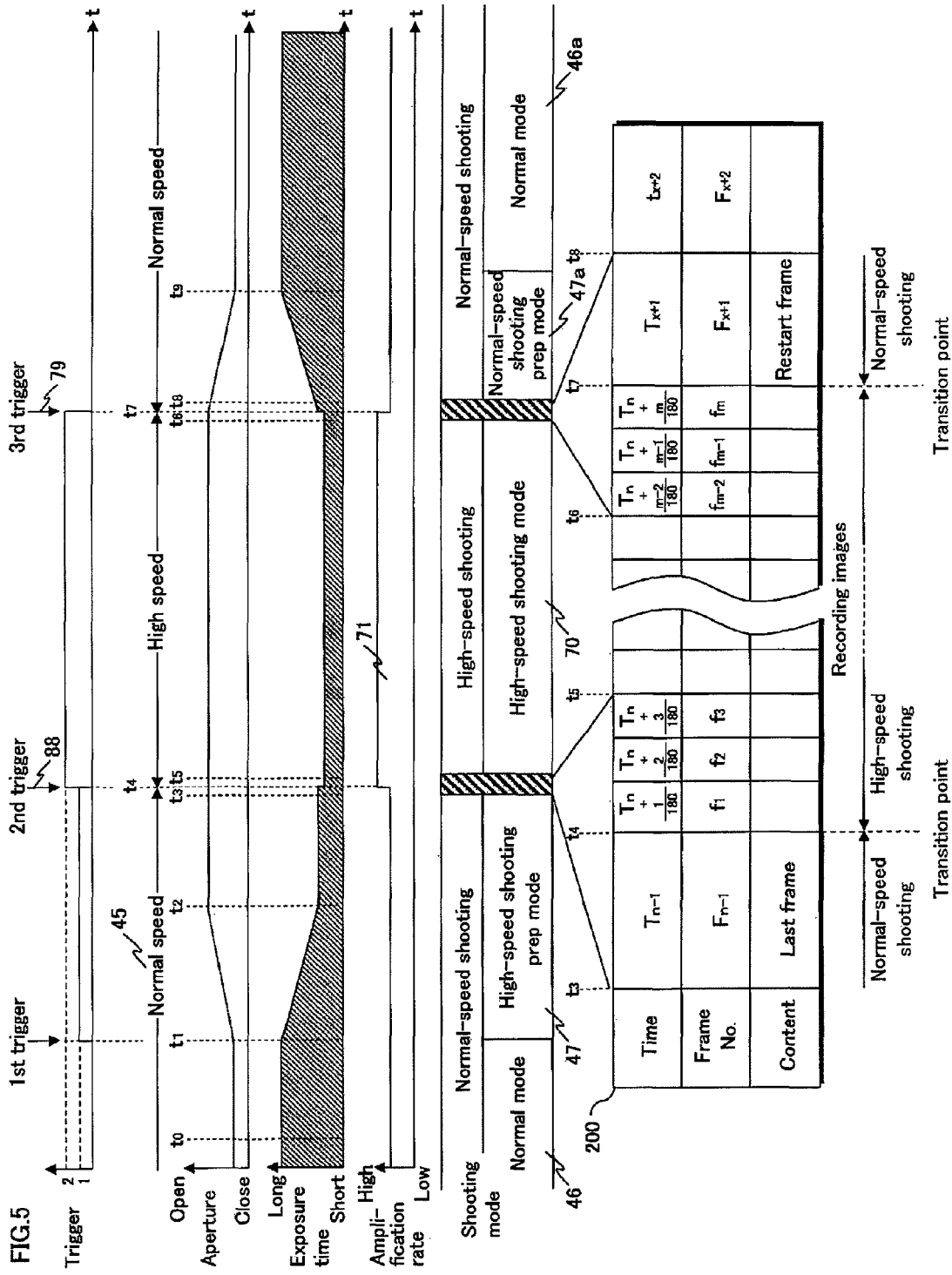
FIG. 5 shows a high-speed shooting method in which the preparation period is provided.

FIG. 5 shows the case in which the preparation period is provided before the high-speed shooting.

FIG. 5 shows time charts regarding the trigger, aperture, exposure time, amplification rate and the like when a normal shooting, a high-speed shooting, and a normal shooting are performed in the stated order.

More specifically, the first row in FIG. 5 shows a time chart regarding the trigger, and "1" in the vertical axis indicates the half-pressed state of the high-speed shooting switch 16, and "2" in the vertical axis indicates the fully pressed state of the high-speed shooting switch 16. Also, the second row shows a time chart regarding the aperture, and the vertical axis indicates how the aperture is opened. The third row shows a time chart regarding the exposure time, and the vertical axis indicates the length of exposure time for each frame. Further, the fourth row shows a time chart regarding the amplification rate, and the vertical axis indicates how high the amplification rate is.

The fifth row in FIG. 5 shows a time chart regarding the shooting mode. A frame transition table 200 indicates a time chart regarding frames that are shot before and after the transition from the normal-speed shooting to the high-speed shooting. The signs "t3" and the like that appear above the frame transition table 200 indicate the times "t3" and the like that are indicated in the time charts regarding the trigger and the like.

First, the following describes changes in the aperture, exposure time, and amplification rate along with a sequence of operations in each shooting mode, with reference to the time charts regarding the trigger and the shooting mode.

When the shooting button 2 is pressed, the normal-speed shooting is started. At this time, as indicated by the time chart at time t0, the shooting is performed at normal aperture and exposure, and at a normal speed 45. It is presumed that at this time, the high-speed shooting mode switch 4 is in the state of "ON".

When the high-speed shooting switch 16 is half-pressed to be in the half-pressed state (16c: first trigger) while the normal shooting is performed, the apparatus transits from a normal mode 46 to a high-speed shooting preparation mode 47.

In the high-speed shooting preparation mode 47, the aperture is opened so as not to change the amount of exposure per frame, and at the same time, the exposure time is decreased gradually. In the example shown in FIG. 5, the aperture is opened in accordance as the exposure time is decreased during a time period between time t1 and time t2, and when, at time t2, the exposure time becomes an exposure time per frame for the high-speed shooting, the normal shooting is performed by maintaining the state. How the aperture and exposure time are controlled will be described later in <Aperture/exposure time transition process>.

After this, when the high-speed shooting switch 16 is pressed to be in the fully pressed state (second trigger), the apparatus transits from the high-speed shooting preparation mode 47 to a high-speed shooting mode 70, and from time t4, the high-speed shooting is actually performed. The frame transition table 200 shows the transition of the frame rate in a time period from time t3 to time t5 around time t4 at which the frame rate changes (hereinafter the time at which the frame rate changes is referred to as a "transition point"). After the transition point t4, the shooting is performed at the rate of 180 fps, indicating that the time increases at the rate of $1/180$ second per frame.

After this, when the high-speed shooting switch 16 is released to be in the not-pressed state (16b: third trigger) to end the high-speed shooting, the apparatus transits from the high-speed shooting mode 70 to a normal-speed shooting preparation mode 47a, and then to a normal mode 46a. At time t7 when the apparatus transits to the normal-speed shooting preparation mode 47a, the normal-speed shooting is resumed. The frame transition table 200 shows the transition of the frame rate in a time period from time t6 to time t8 around the transition point t7.

In the normal-speed shooting preparation mode 47a, an operation the reverse of the operation in the high-speed shooting preparation mode 47 is performed, that is to say, the aperture is gradually closed in accordance as the exposure time is gradually increased until they return to the aperture and exposure time in the normal mode 46.

In FIG. 5, in the time chart regarding the amplification rate, the amplification rate increases during a period from time t4 to time t7 while the high-speed shooting is performed. This is because the substantial exposure time in the high-speed shooting mode is shorter than that in the normal shooting mode (see a range from time t4 to time t7 in the time chart regarding the exposure time). The reason for increasing the amplification rate is that, in the present embodiment, the exposure time is determined in the high-speed shooting preparation mode 47 without taking the vertical blanking interval into consideration. Thus, when the vertical blanking interval is taken into consideration, or when the vertical blanking interval can be neglected compared with the vertical sync period, there is no need to increase the amplification rate.

In the present embodiment, to compensate for the reduction of the exposure time in the period from time t4 to time t7, the gain of the amplifier is increased at time t4, and the amount of change in the brightness of the image signal is reduced during the period from time t4 to time t7. This is because, when the follow speed of the aperture is taken into consideration, it is difficult to compensate for the reduction of the exposure time with the aperture.

Figure 6:
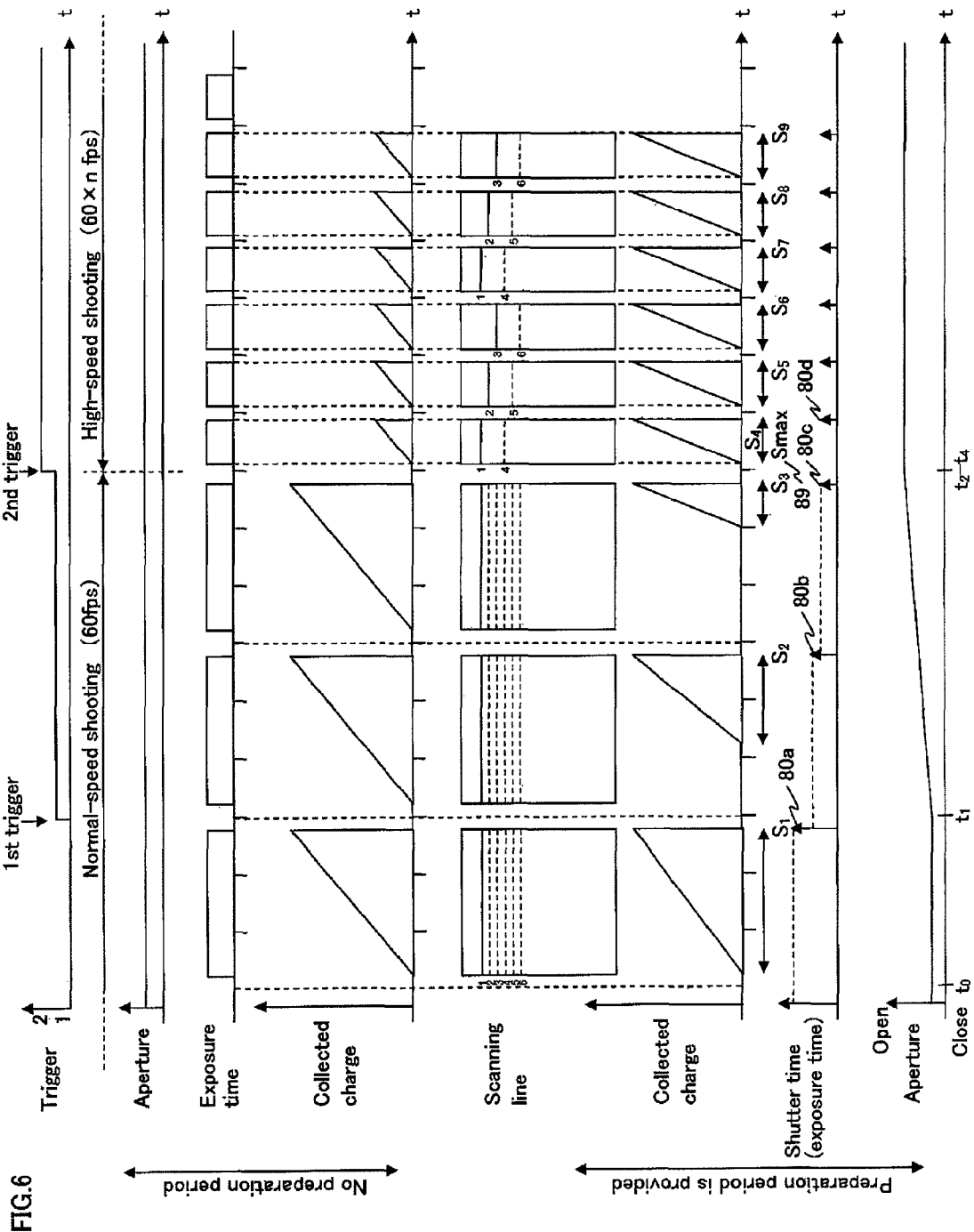
FIG. 6 shows how the amount of collected charges changes as the frame rate is changed, in the two cases: the case in which the preparation period is provided; and the case in which the preparation period is not provided.

Next, a description is given of adjustment of the exposure time, collected charges, and aperture, with reference to FIG. 6.

FIG. 6 shows how the amount of collected charges changes as the frame rate is changed, in the two cases separately: the case in which the preparation period is provided; and the case in which the preparation period is not provided. The second to fourth rows in FIG. 6 show the case in which the preparation period is not provided; and the sixth to eighth rows show the case in which the preparation period is provided.

The first row shows a time chart regarding the trigger, and the second row and the eighth row, the lowest row, show time charts regarding the aperture. These time charts are the same as the corresponding time charts in FIG. 5.

The third row shows a time chart regarding the exposure time. Different from the corresponding one in FIG. 5, in the time chart shown in FIG. 6, the length of the exposure time is represented by the horizontal axis.

Next, the fifth, row shows scanning lines that represent read-out collected charges. Note that, in the high-speed shooting, what is called reduction method is used.

The fourth row and the sixth row show time charts regarding the collected charges. The vertical axis indicates the amount of collected charges. In FIG. 6, the time charts indicate how the amount of collected charges changes under a predetermined condition concerning the amount of incident light. The ranges S1 to S9 that are each indicated by the bi-directional arrows and are shown along the horizontal axis represent time periods during which charges are collected, namely, the exposure time.

Next, the fifth row shows scanning lines that represent read-out collected charges. Note that, in the high-speed shooting, what is called reduction method, is used. The vertical arrows 80a, 80b, 80c, 80d and so on represent the shutter times. The longer the arrow is, the longer the shutter time is. In the actuality, the shutter time means a time period in which the charges are collected, namely, the exposure time. In FIG. 6, the shutter times correspond to the ranges S1 to S9 indicated by the bi-directional arrows.

Note that times t0 and so on in FIG. 6 correspond to times t0 and so on in FIG. 5, and that times t2 to t4 are omitted in FIG. 6 for the sake of convenience.

First, the case in which the frame rate is changed without the preparation period will be described.

In this example, as understood from the time charts shown in the second, third, and fourth rows, the exposure time corresponds to a time per frame of the frame rate while the aperture is not changed, and as the frame rate increases, the amount of corrected charges, decreases as much, that is to say, the reproduction screen becomes dark.

In the case of the reduction scanning method as shown in the fifth row, when, for example, two scanning lines are reduced and the speed is increased to thrice, the amount of substantial light becomes approximately $1/3$.

More specifically, when the exposure time per frame in the normal shooting is longer than the exposure time per frame in the high-speed shooting (see the time chart regarding the exposure time shown in the third row), the amount of collected charges drastically, with great amount, decreases at the transition point (see the time chart regarding the collected charges shown in the fourth row).

In this way, the normal shooting and the high-speed shooting differ in the brightness. As a result, during the reproduction, the screen becomes dark sharply before and after the transition point. In such a situation, even if the gain is added to keep the same brightness, the amount of noise increases, and the viewer will feel uncomfortable at the transition point. That is to say, it causes a problem that the image is not reproduced seamlessly in terms of brightness because the substantial brightness decreases sharply at the transition point.

Next, the case in which the preparation period is provided when the frame rate is changed will be described.

In this example, as understood from the time chart regarding the collected charges shown in the sixth row, the exposure time becomes shorter gradually from the time t1 when the first trigger is input, in order from S1 to S2 and to S3, and the exposure time becomes Smax at time t4 when the second trigger is input and the frame rate is changed, where Smax represents the maximum exposure time that can be ensured by the frame rate after the change.

At the same time, the aperture is opened gradually in a period from time t1 to t2 (t4) such that the value of the collected charges is maintained constantly, as shown in the time chart regarding the aperture in the eighth row.

As described above, the exposure time is shortened gradually by controlling the exposure time and aperture during the preparation period before the frame rate is changed. With this structure, even if the frame rate is changed directly when the second trigger is input, the amount of collected charges per frame does not decrease, and the reproduction screen does not become dark.

FIG. 6 shows an example case in which the exposure time is shortened gradually during the preparation period. However, there is a case where the exposure time does not need to be changed during the preparation period.

Such a case will be explained with reference to FIG. 7.

The time charts shown in the first to eighth rows, in definition, are the same as the corresponding ones in FIG. 6.

Figure 7:
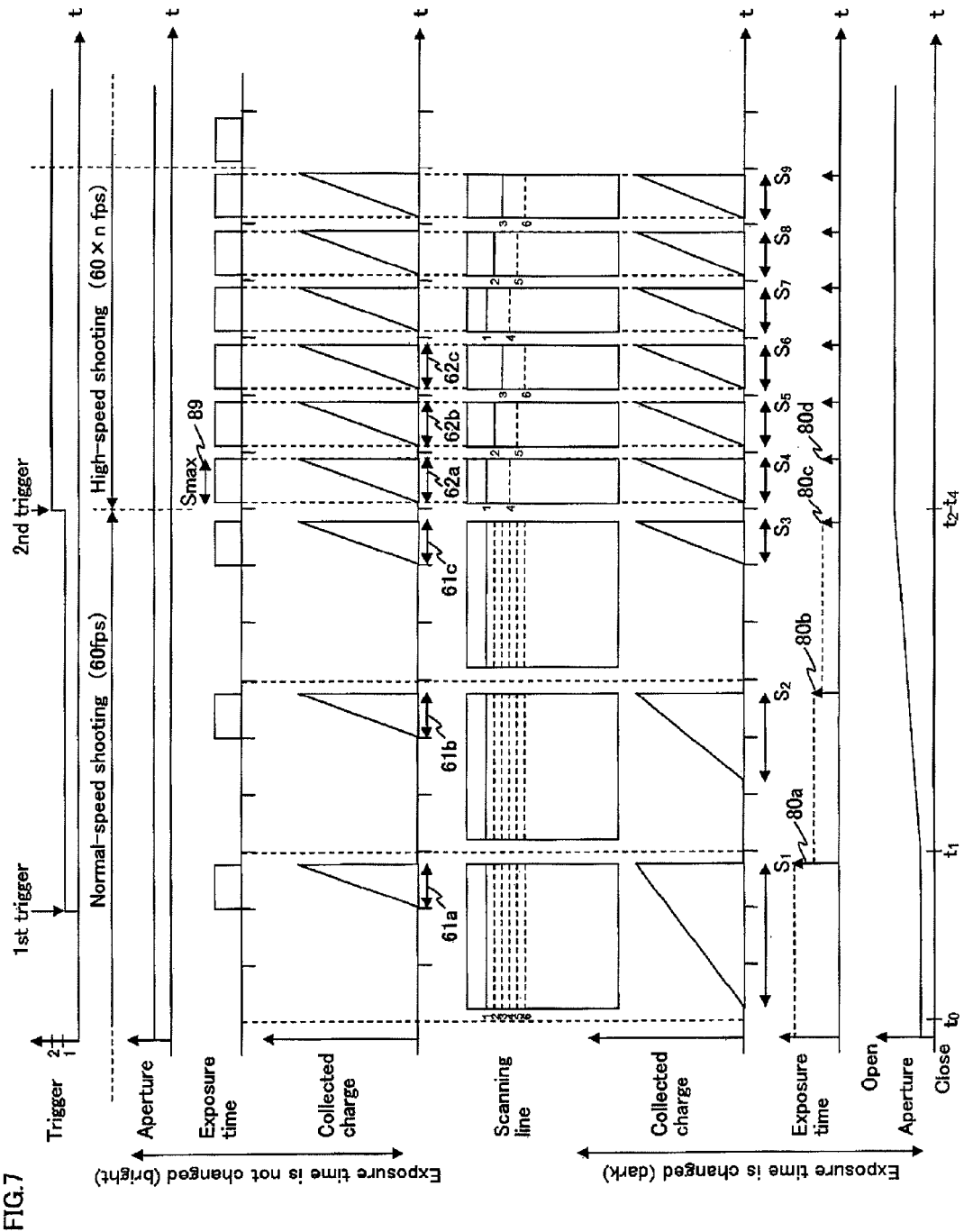
FIG. 7 shows two cases: the case in which the exposure time does not need to be changed; and the case in which the exposure time needs to be changed.

FIG. 7 shows two cases separately; the case in which the exposure time does not need to IDS changed; and the case in which the exposure time needs to be changed. The second to fourth rows show the case in which the exposure time does not need to be changed; and the sixth to eighth rows show the case in which the exposure time needs to be changed.

The sixth to eighth rows showing the case in which the exposure time needs to be changed are that same as those for the case in which the preparation period is provided, shown in FIG. 6. Accordingly, here, only the second to fourth rows showing the case in which the exposure time does not need to be changed will be described.

The case in which the exposure time does not need to be changed can be paraphrased as the case in which the exposure time is already equal to or shorter than the maximum exposure time per frame of the frame rate after change. Such a case occurs when, for example, the incident light is so strong that merely adjusting the aperture cannot prevent an overexposure from occurring.

As shown in the time chart regarding the exposure time in the third row, exposure times $61a$, $61b$, and $61c$ before the frame rate change are each smaller than or substantially equal to a maximum value Smax $89$ of the exposure time after the frame rate change. In this case, without shortening the exposure time, the substantial brightness can be ensured even after the frame rate change, and therefore there is no need to change the exposure time, nor need to change the aperture, as shown in the time chart regarding the aperture in the second row.

Accordingly, in this case, it is possible to perform the high-speed shooting without the preparation period.

As described above, the present image shooting apparatus does not adjust the exposure time or the aperture for the frame rate change when there is a large amount of incident light; and maintains the amount of exposure per frame to be approximately constant by greatly changing the exposure time and the aperture for the frame rate change when there is a small amount of incident light.

<Case in which Aperture Adjustment is of No Use>

Described above is a structure in which, when the exposure time is short, the amount of exposure is ensured by opening the aperture. However, there is a case in which the aperture is fully opened and the amount of exposure cannot be ensured. So the following describes how to handle such a case.

Figure 8:
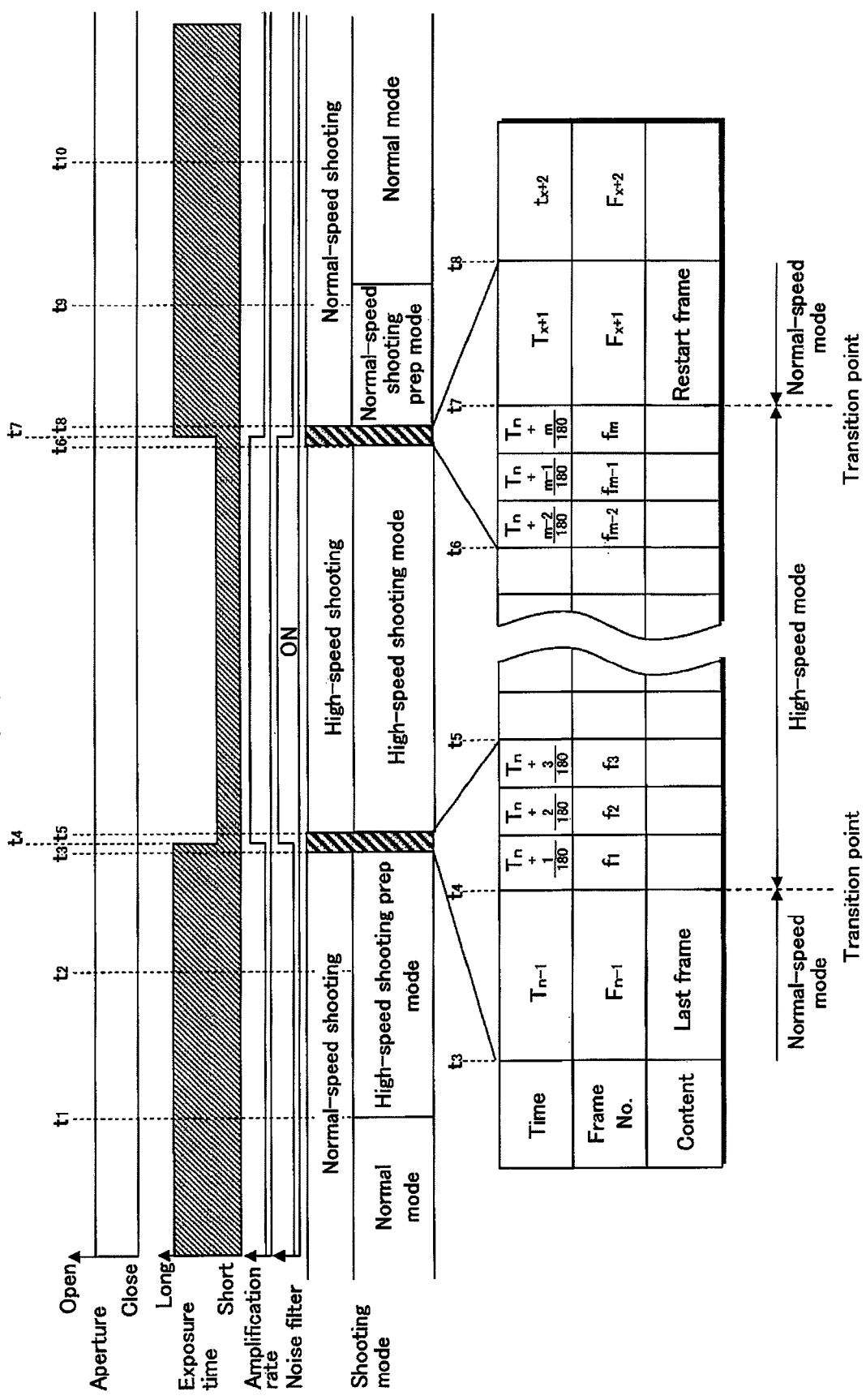
FIG. 8 shows a high-speed shooting method when the aperture adjustment cannot be used.

FIG. 8 shows a high-speed shooting method when the aperture adjustment cannot be used.

Like FIG. 5, FIG. 8 shows time charts regarding the aperture, exposure time, amplification rate, noise filter, and shooting mode and the frame transition table when a normal shooting, a high-speed shooting, and a normal shooting are performed in the stated order. Note that although a time chart regarding the trigger is omitted, it is presumed that triggers occur at the same timings as in FIG. 5.

When the amount of exposure cannot be ensured by adjusting the aperture, it is assumed that the amount of noise rises sharply if an attempt is made to ensure the amount of exposure merely by the gain adjustment by the amplifier.

As shown in the time chart regarding the aperture in the first row, when the aperture is not changed, the high-speed shooting during a period from time t4 to time t7 has a shorter substantial exposure time, thus a reduced amount of exposure (see the time chart regarding the exposure time shown in the second row).

To supplement the shortage of the amount of exposure, the amplification rate is increased during a period from time t4 to time t7 such that the brightness of the image signal does not change (see the time chart regarding the amplification rate in the third row).

In this case, since the amount of noise increases during the period from time t4 to time t7, the noise filter $74$ is operated before the A/D converter $52$ (see the noise filter being "ON" in the time chart regarding the noise filter in the fourth row). Alternatively, the occurrence of noise is made less prominent by increasing the attenuation rate of the noise filter. This enables a more seamless image to be shot.

A still another method for making the occurrence of noise less prominent is to add noise intentionally.

The method of adding noise will be explained with reference to FIG. 9.

Figure 9:
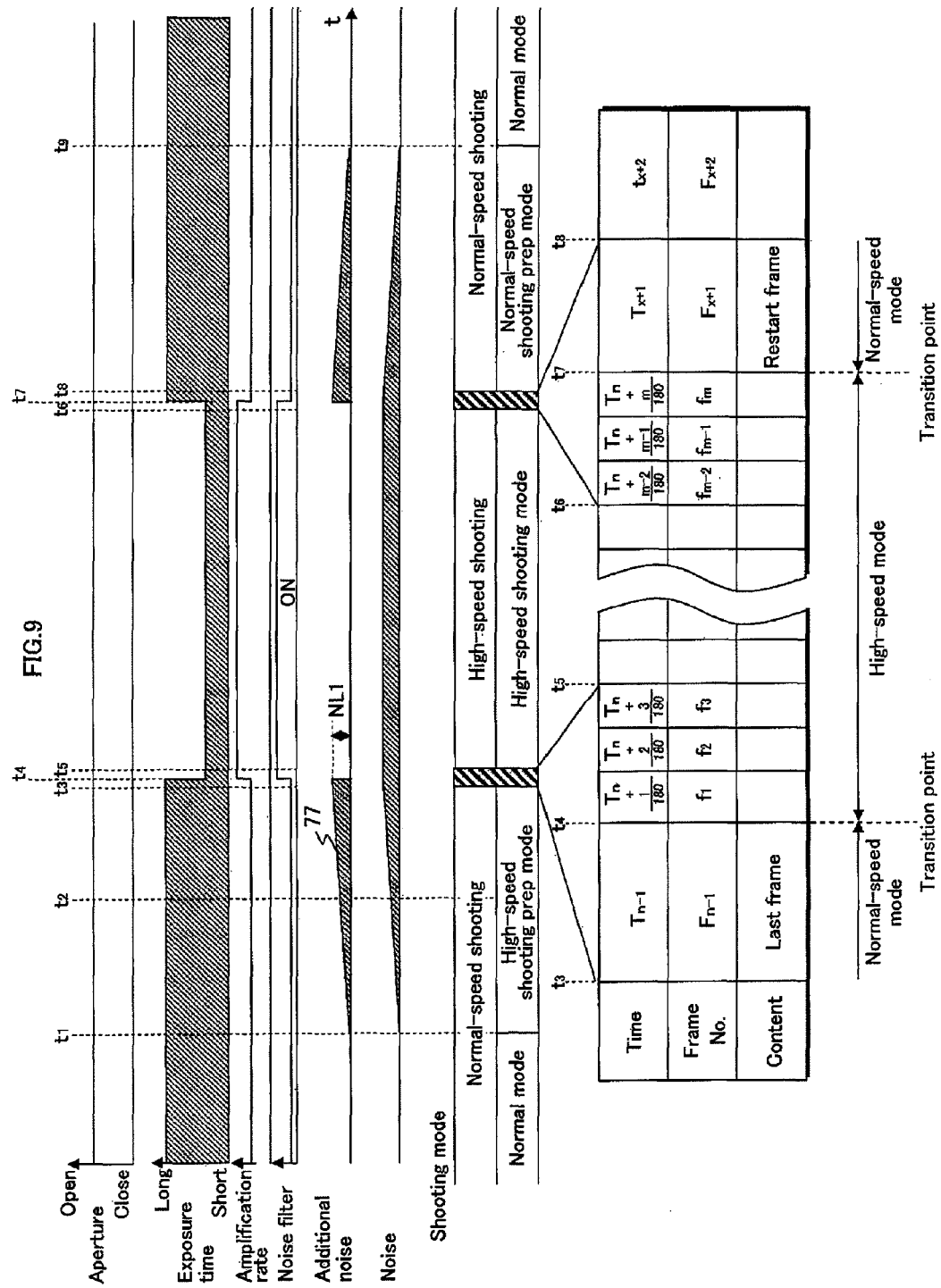
FIG. 9 shows a high-speed shooting method when the noise is added.

FIG. 9 shows a high-speed shooting method when the noise is added.

Like FIG. 5, FIG. 9 shows time charts regarding the aperture, exposure time, amplification rate, noise filter, additional noise, noise, and shooting mode and the frame transition table when a normal shooting, a high-speed shooting, and a normal shooting are performed in the stated order. Note that although a time chart regarding the trigger is omitted, it is presumed that triggers occur at the same timings as in FIG. 5.

The time chart regarding the additional noise indicates the additional noise. The time chart regarding the noise indicates noise that actually occurs, namely, a combination of the additional noise and the noise that occurs by amplification.

During the preparation period (from time t1 to time t4) for the high-speed shooting, noise $77$ is caused (see the time chart regarding the additional noise shown in the fifth row), and the noise $77$ is increased gradually up to a noise level NLS which is the same as the level of the noise that occurs in the high-speed shooting.

This method can suppress the sharp increase of the noise during the period from time t1 to time t7, thus producing an effect that the image at the transition point between the normal-speed shooting mode and the high-speed shooting mode becomes more seamless.

<Case in which Preparation Period is not Provided>

Figure 10:
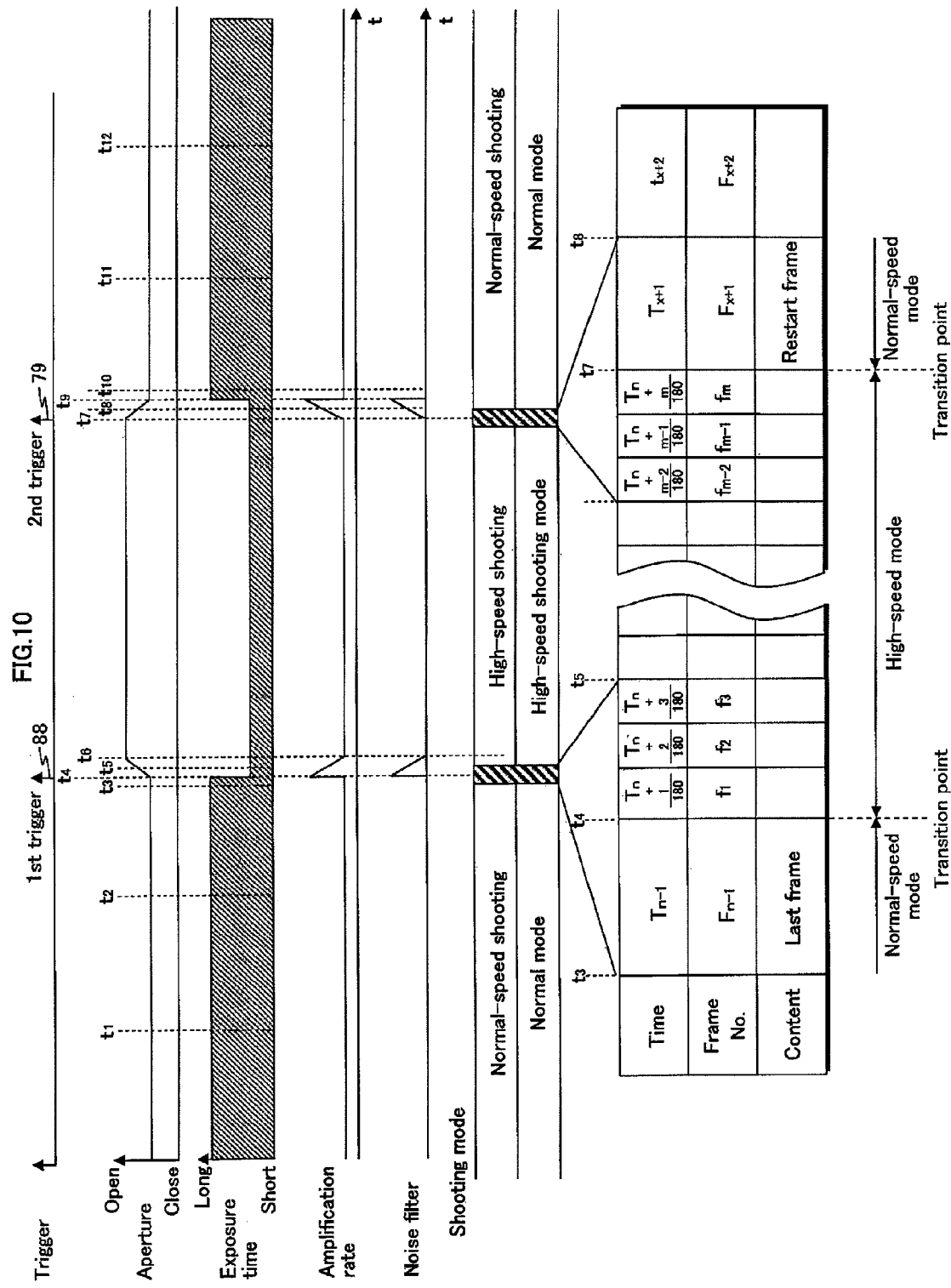
FIG. 10 shows a high-speed shooting method without the preparation period.
Figure 11:
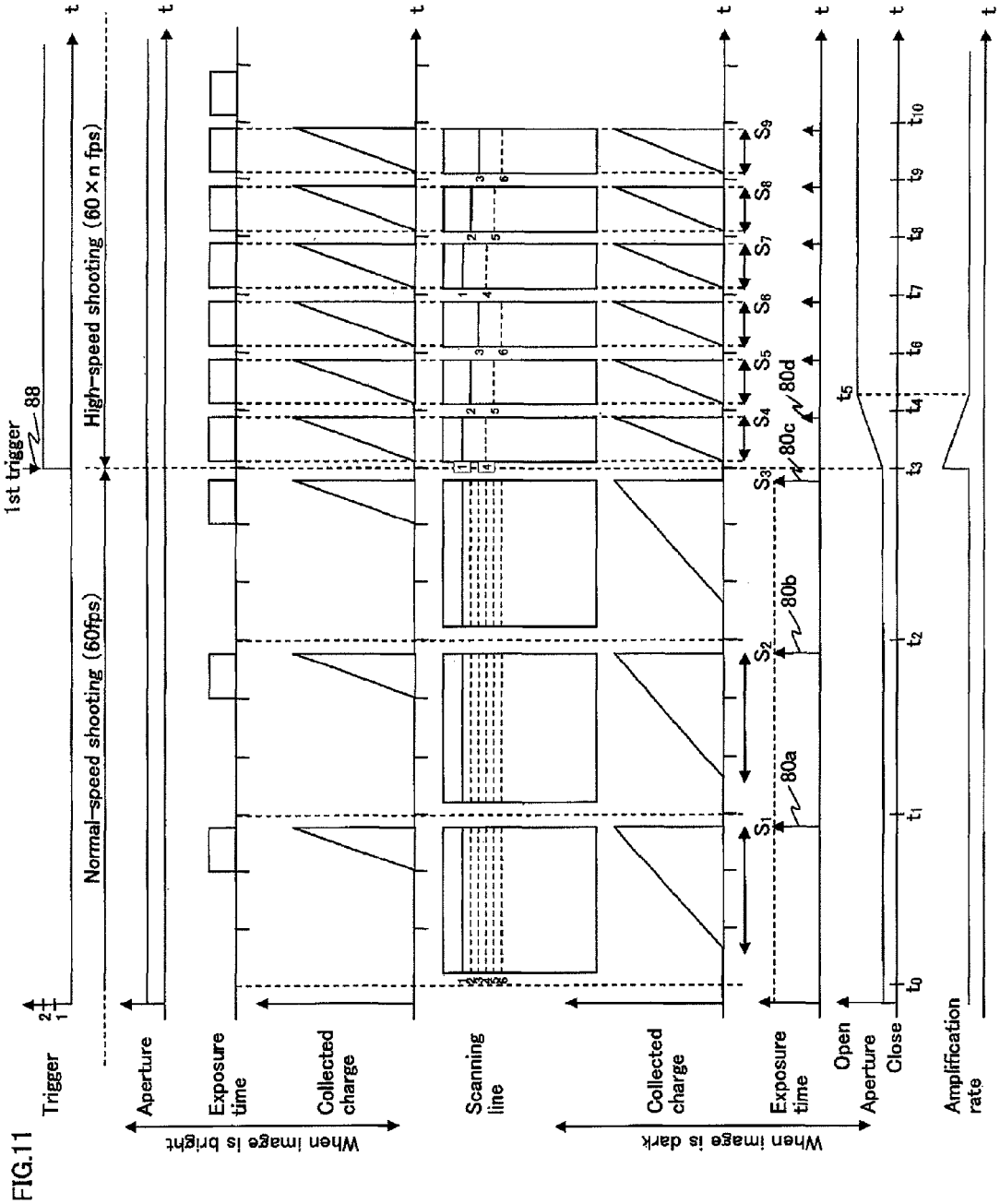
FIG. 11 shows adjustments of aperture and amplification rate.

Next, the following describes the case in which the high-speed shooting is performed without the preparation period, and the case in which the preparation period is scarcely provided even in the mode in which the preparation period should be provided, with reference to FIGS. 10 and 11.

Concretely, such a case occurs (i) when the high-speed shooting switch $16$ is fully pressed while the high-speed shooting mode switch $4$ is "OFF", or (ii) when the high-speed shooting switch $16$ is fully pressed after scarcely half-pressed while the high-speed shooting mode switch $4$ is "ON".

Suppose that the aperture can be changed during the vertical blanking interval, then the follow time becomes as long as approximately 10 through 15 msec. This is because the amount of exposure does not change even if the shooting transits to the high-speed shooting, but the aperture can be changed mechanically. For this reason, it is difficult to adopt the method of changing the aperture during the vertical blanking interval. Therefore, the present invention adopts the following method.

FIG. 10 shows a high-speed shooting method without the preparation period.

Like FIG. 5, FIG. 10 shows time charts regarding the trigger, aperture, exposure time, amplification rate, noise filter, and shooting mode and the frame transition table when a normal shooting, a high-speed shooting, and a normal shooting are performed in the stated order. Note that the high-speed shooting preparation mode and the normal-speed shooting preparation mode are not provided.

The following describes the procedure for transiting directly from the normal-speed shooting to the high-speed shooting, upon receiving a first trigger 88 that is a trigger to start the high-speed shooting.

It is presumed in the following example that the high-speed shooting is performed during a period from time t4 to time t7, where the first trigger 88 is received at time t4 and a second trigger 79 that is a trigger to end the high-speed shooting is received at time t7.

The normal-speed shooting is performed until the high-speed shooting switch 16 is pressed at time t4. Also, at time t4, the frame rate changes from the normal speed to the high speed.

Also, since the exposure time becomes ⅓ at this point in time (see the time chart regarding the exposure time in the third row), a process of opening the aperture to an aperture target value is started (see the time chart regarding the aperture in the second row). The aperture target value will be described later in <Aperture/exposure time transition process>.

Also, in a period from time t4 to time t6, in accordance as the aperture is opened, the amplification rate is decreased (see the time chart regarding the amplification rate in the fourth row), and the attenuation rate of the noise filter is decreased (see the time chart regarding the noise filter in the fifth row).

When the aperture reaches the aperture target value at time t6, the values of the amplification rate and noise filter return to the values in the normal shooting.

When the second trigger 79 is received at time t7, an operation the reverse of the operation in the period from time t4 to time t6 is performed.

More specifically, the frame rate is returned from the high speed to the normal speed at time t7, and during the period from time t7 to time t9, the aperture is closed and the amplification rate and the noise filter are increased.

At time t9 when the aperture returns to the previous aperture value, the exposure time is returned to the value in the normal-speed shooting (see the time chart regarding the exposure time in the third row).

By adjusting the aperture, amplification rate, and noise filter in this way, the shooting is performed seamlessly during a period between the high-speed shooting and, the normal-speed shooting.

In this method, the frame rate is changed to the high speed and the amplification rate is increased simultaneously as the high-speed shooting instruction is received. This makes it Possible to enter the high-speed shooting mode simultaneously as the high-speed shooting switch 16 is pressed. This structure produces an advantageous effect that a switch to the high-speed shooting is quickly performed, and the shutter opportunity for an important scene cannot be missed.

Next, the adjustment of the aperture and amplification rate will be explained with reference to FIG. 11.

The time charts shown in the first to eighth rows, in definition, are the same as the corresponding ones in FIG. 6. The ninth row shows the time chart regarding the amplification rate.

FIG. 11 shows two cases separately: the case in which the exposure time does not need to be changed because the subject is bright; and the case in which the exposure time needs to be changed because the subject is dark. The second to fourth rows show the case in which the exposure time does not need to be changed; and the sixth to ninth rows show the case in which the exposure time needs to be changed.

When the subject is bright, there is no need to change the exposure time, and thus the shooting transits to the high-speed shooting without changing the aperture.

On the other hand, when the subject is dark, the exposure time is shortened when the first trigger 88, which is a trigger to start the high-speed shooting, is received (see the time chart regarding the exposure time in the seventh row).

At the same time, the gain is raised sharply (see the time chart regarding the amplification rate in the ninth row), and the aperture starts to be opened gradually (see the time chart regarding the aperture in the eighth row).

After this, the gain starts to be decreased at time t3 (see the time chart regarding the amplification rate in the ninth row).

By adjusting the aperture and amplification rate in this way, the shooting is performed seamlessly during a period between the high-speed shooting and the normal-speed shooting, and the discontinuity level in brightness of the reproduced image is reduced.

<Modifications>

The following describes two modifications of the above-described high-speed shooting method.

First, the first modification will be described with reference to FIG. 12.

Figure 12:
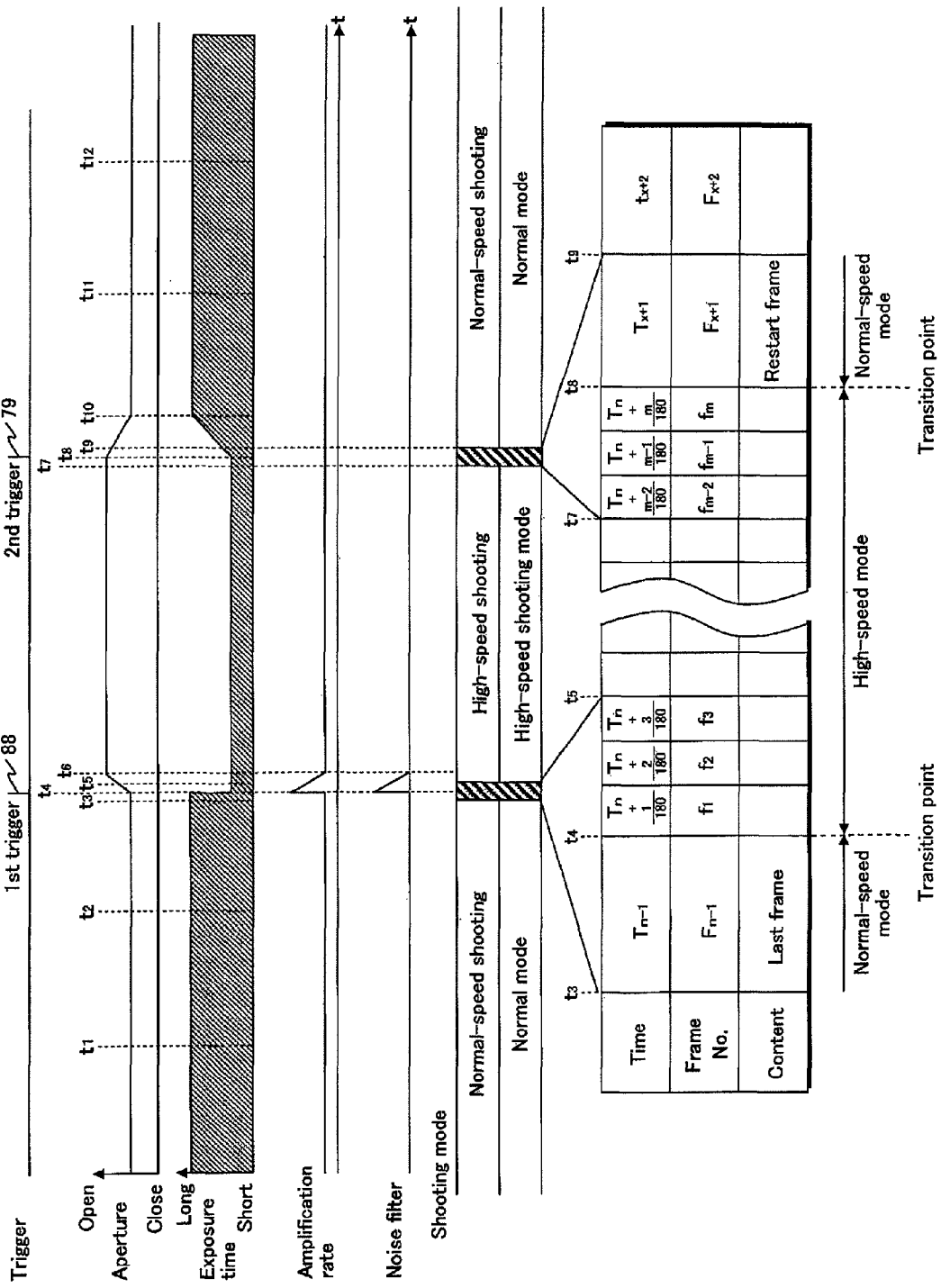
FIG. 12 shows a method in which the normal shooting transits to the high-speed shooting directly, but the high-speed shooting transits back to the normal shooting gradually.

FIG. 12 shows a method in which the normal shooting transits to the high-speed shooting directly, but the high-speed shooting transits back to the normal shooting gradually.

The method has this structure for the following reasons. That is to say, when the normal shooting transits to the high-speed shooting, a quick response is required not to miss the shutter opportunity. On the other hand, when the high-speed shooting ends, such a quick response is not required.

Like FIG. 10, FIG. 12 shows time charts regarding the trigger, aperture, exposure time, amplification rate, noise filter, and shooting mode and the frame transition table when a normal shooting, a high-speed shooting, and a normal shooting are performed in the stated order.

The operation performed in the period from time t4 to time t6 upon receiving the first trigger 88, which is a trigger to start the high-speed shooting, is the same as the operation shown in FIG. 10. More specifically, the amplification rate is increased and the aperture starts to be opened when the first trigger 88 is received at time t4.

On the other hand, the operation after the second trigger 79, which is a trigger to end the high-speed shooting, is received at time t8 is different from the operation shown in FIG. 10.

In the present modification, when the second trigger 79 is received at time t8, the aperture is gradually closed without changing the amplification rate (see the time chart regarding the aperture in the second row), and at the same time, the exposure time is increased (see the time chart regarding the exposure time in the third row).

Also, at time t8, the frame rate is returned to the normal speed.

In this method, when the normal shooting transits to the high-speed shooting, the high-speed shooting starts simultaneously as the first trigger is received so that the shutter opportunity is not missed, but the image quality is slightly deteriorated. With respect to this, if deterioration of the signal level can be prevented, the necessity for the amplification is minimized, thus deterioration of the image quality can be suppressed.

On the other hand, when the high-speed shooting ends and returns to the normal shooting, the aperture is gradually closed without changing the gain. This structure produces an advantageous effect that the occurrence of noise is suppressed and that the deterioration of image quality is reduced when the high-speed shooting ends.

Next, the second modification will be described with reference to FIG. 13.

Figure 13:
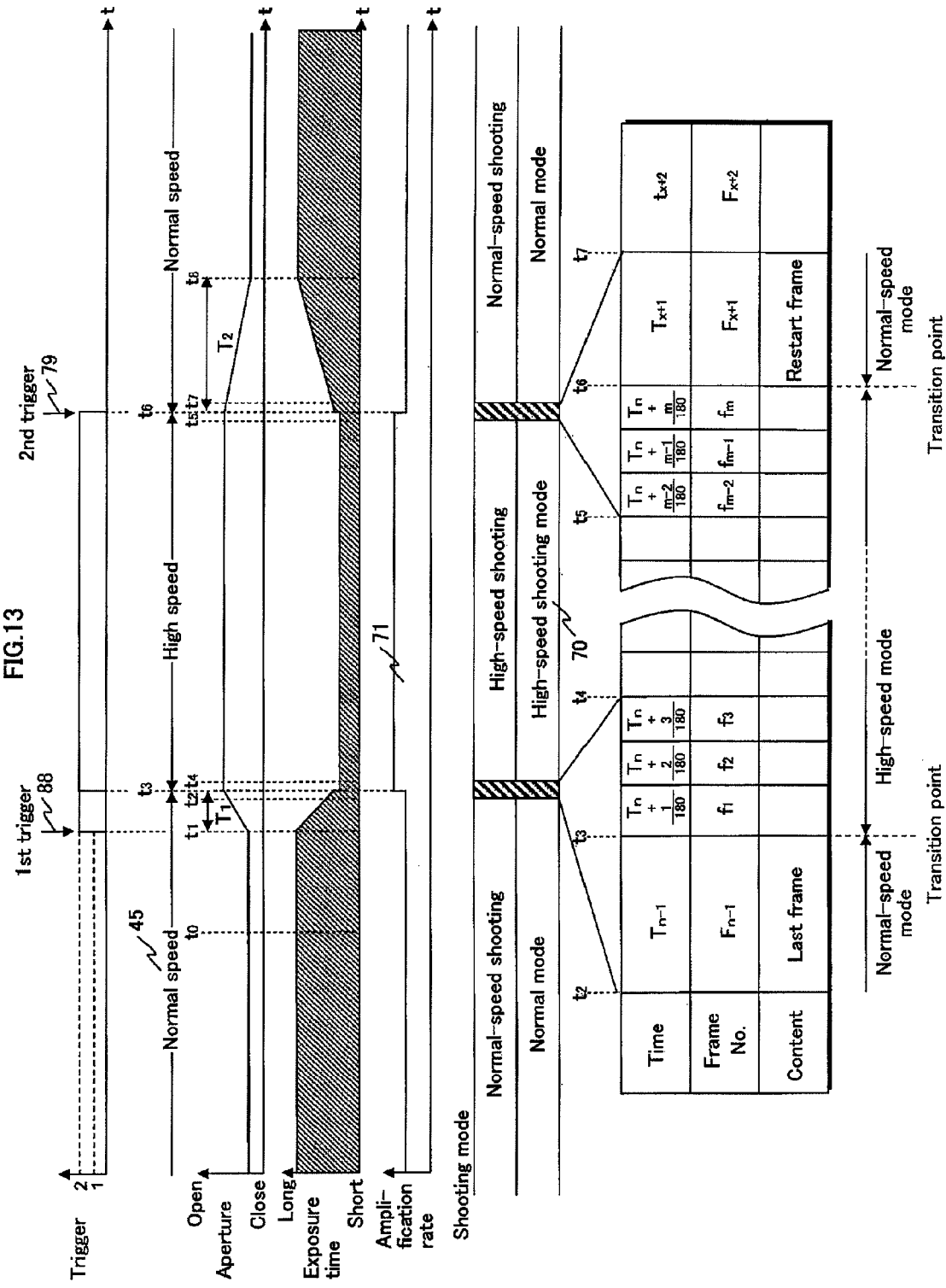
FIG. 13 shows a method in which it takes time when the normal shooting transits to the high-speed shooting.

FIG. 13 shows a method in which it takes time when the normal shooting transits to the high-speed shooting.

In the first modification, the high-speed shooting starts simultaneously as the first trigger 88, which is a trigger to start the high-speed shooting, is received, but the image quality is slightly deteriorated. In the second modification, the high-speed shooting starts with a slight delay, but the image quality is not deteriorated.

In many cases, when the normal shooting transits to the high-speed shooting, a quick response is required not to miss the shutter opportunity. The second modification is suited for the case in which a high image quality is required even if the high-speed shooting has to be started with a slight delay to achieve it.

Like FIG. 12, FIG. 13 shows time charts regarding the trigger, aperture, exposure time, amplification rate, and shooting mode and the frame transition table when a normal shooting, a high-speed shooting, and a normal shooting are performed in the stated order. Note that a time chart regarding the noise filter is not shown in FIG. 13. Also, the time chart regarding the amplification rate is not indispensable, as is the case with FIG. 5.

When the first trigger 88, a trigger to start the high-speed shooting, is received at time t1, the aperture is opened gradually and the exposure time is decreased gradually in period T1 from time t1 to time t3 (see the time chart regarding the aperture in the second row, and the time chart regarding the exposure time in the third row).

At time t3 when the exposure time becomes the length of time for the high-speed shooting, the high-speed shooting is started.

At time t6, when the second trigger 79 that is a trigger to end the high-speed shooting is received, the shooting returns from the high-speed shooting to the normal-speed shooting. In period T2 from time t6 to time t8, the aperture is closed gradually and the exposure time is increased gradually in accordance with the transition of the aperture (see the time chart regarding the aperture in the second row, and the time chart regarding the exposure time in the third row).

At time t8, the values of the aperture and the exposure time are the same as those during the normal shooting.

In the second modification, the period T2 is longer than the period T1. The reason is that, if a long time is taken to transit from the normal shooting to the high-speed shooting, a shutter opportunity might be missed, and thus it is critically important that the transition takes a short time. For this reason, the period T1 is set to be as small as possible.

On the other hand, when the high-speed shooting ends, such urgency is not required in terms of the shutter opportunity and so on, and thus the transition may take a long time. Rather, as the transition take a longer time, more seamless images, namely, a higher image quality can be obtained. That is to say, the image quality is given higher priority than the transition time, and the period T2 is set to be longer than the period T1.

Accordingly, setting period T2 to be longer than period T1 produces advantageous effects that the response at the start of the high-speed shooting becomes quicker, and that the brightness changes less over time at the end of the high-speed shooting, making the shooting more seamless.

<Operation>

Figure 14:
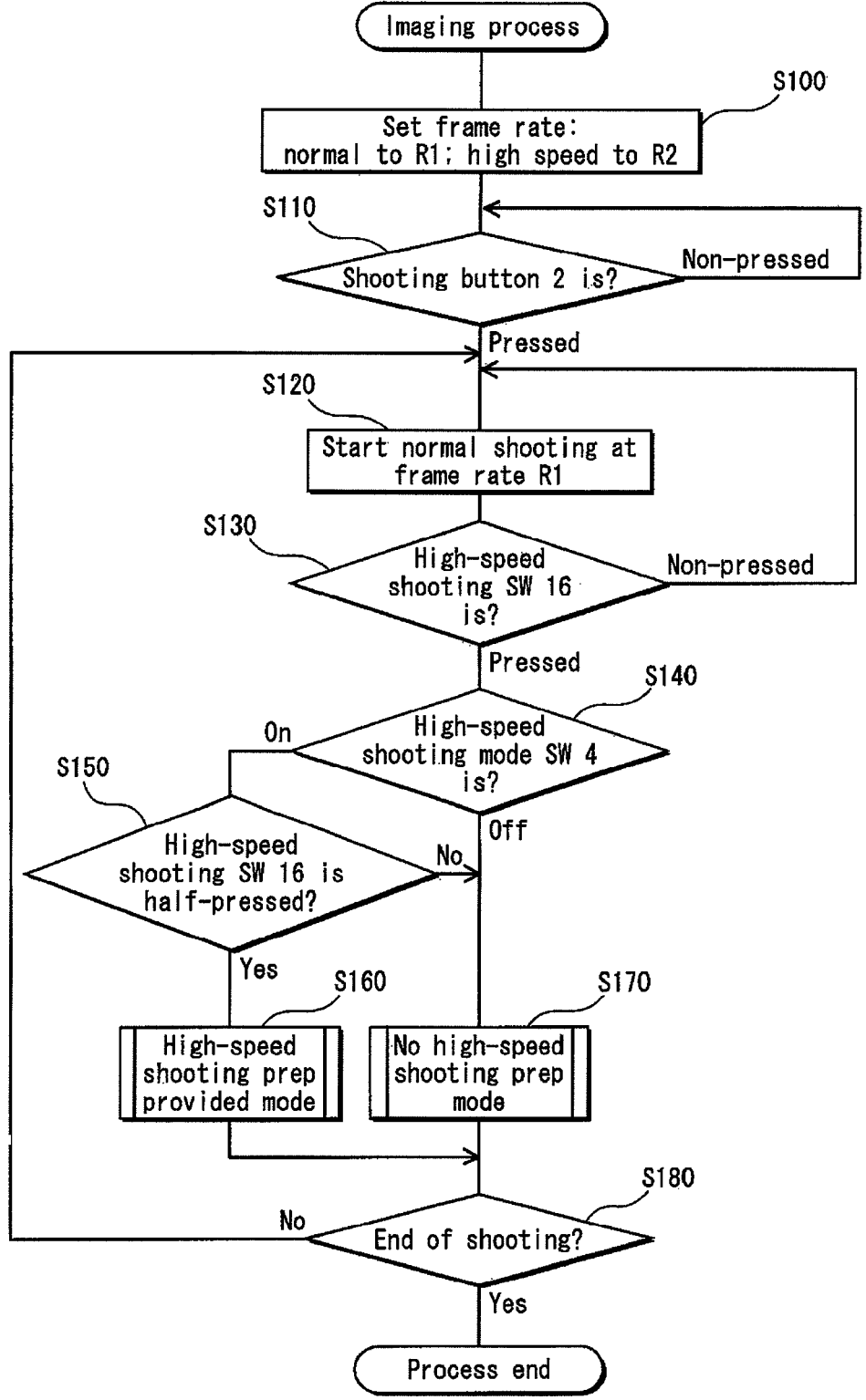
FIG. 14 is a flowchart showing the procedures of the normal and high-speed shootings.
Figure 15:
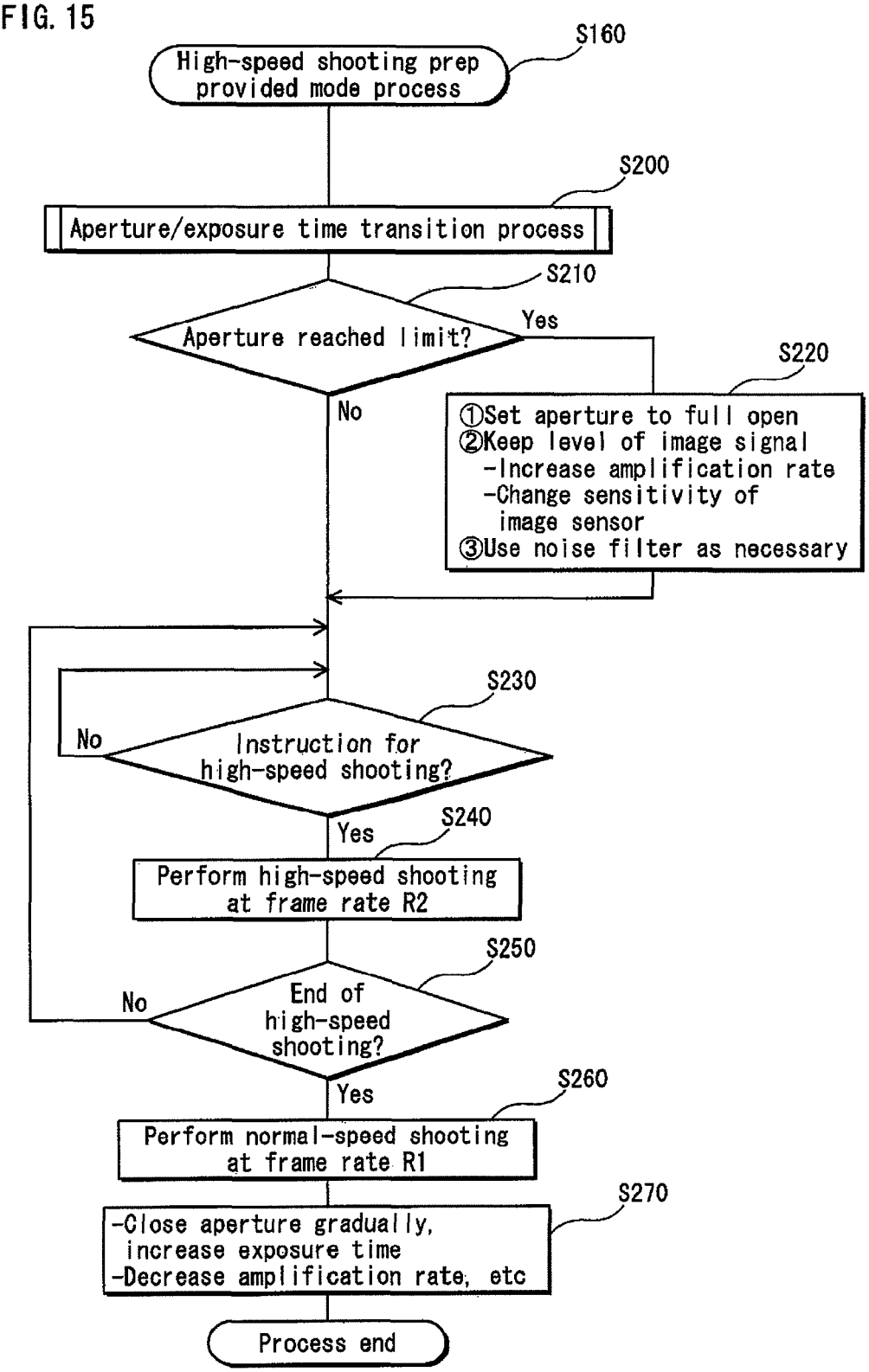
FIG. 15 is a flowchart showing the procedures of the high-speed shooting in the high-speed shooting preparation provided mode.
Figure 16:
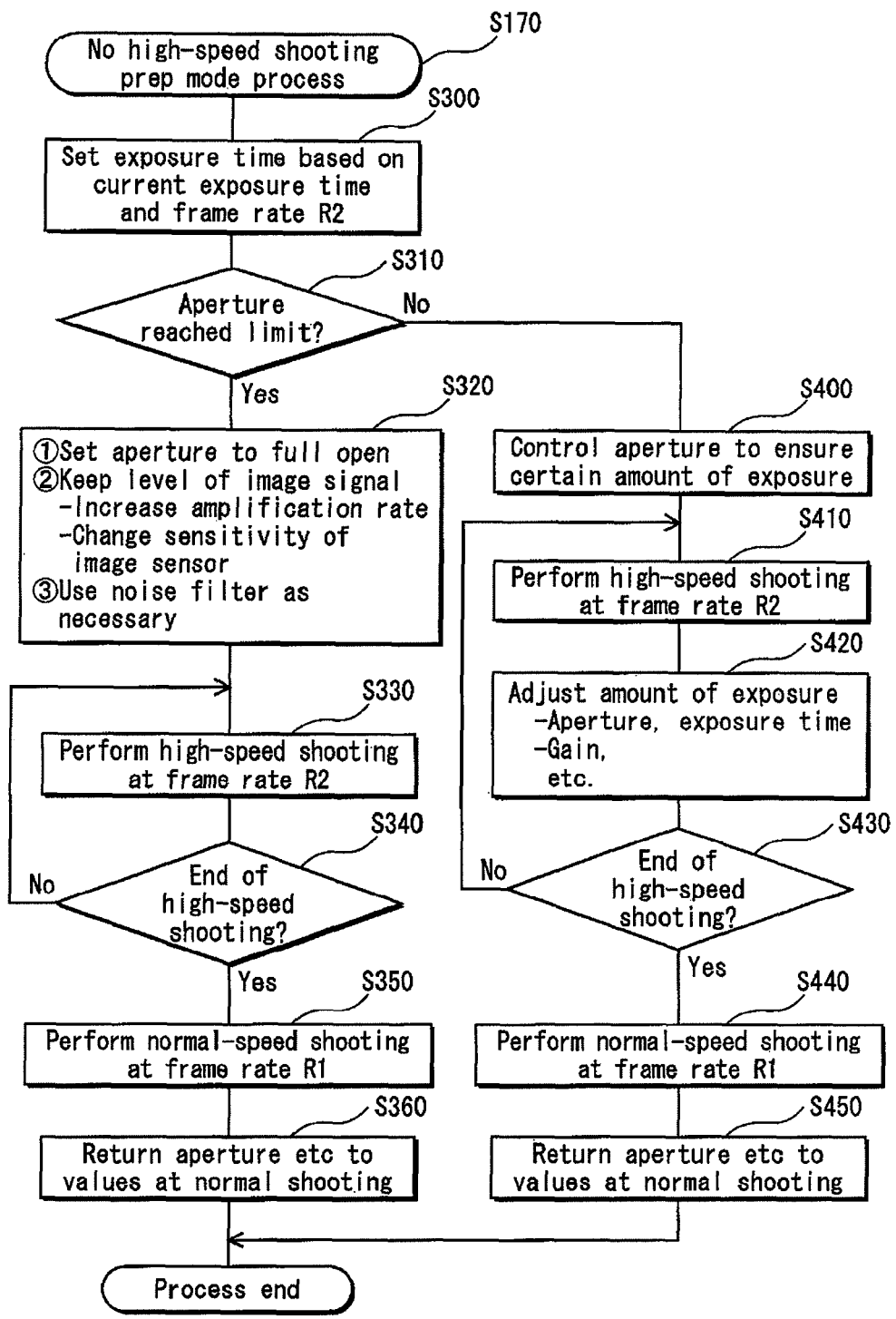
FIG. 16 is a flowchart showing the procedures of the high-speed shooting in the no high-speed shooting preparation mode.

The following describes operation of the image shooting apparatus of the present invention with reference to FIGS. 14-16.

FIG. 14 is a flowchart showing the procedures of the normal and high-speed shootings.

First; the user, as the initial settings, sets the frame rate for the normal-speed shooting to R1, and sets the frame rate for the high-speed shooting to R2 (step S100). This operation is performed with use of the mode setting dial 5 shown in FIG. 1.

Upon detecting this operation of the user, the whole apparatus control unit 100 stores the set frame rates R1 and R2 into the first frame rate and the second frame rate of the aperture target value calculating unit 55, respectively.

Then, the user turns the high-speed shooting mode switch 4 "ON" or "OFF". Upon detecting this operation of the user, the whole apparatus control unit 100 sets the high-speed shooting mode 43 in the mode setting unit 42 when the high-speed shooting mode switch 4 is "ON"; and sets the normal shooting mode 44 in the mode setting unit 42 when the high-speed shooting mode switch 4 is "OFF". More specifically, for example, the whole apparatus control unit 100 sets the high-speed shooting mode 43 when a shooting state flag (not illustrated) is set to "1"; and sets the normal shooting mode 44 when the shooting state flag is set to "0".

The user presses the shooting button 2 to start the normal shooting (step S110: "Pressed"). Upon detecting this, the whole apparatus control unit 100 starts the normal shooting at the frame rate R1 by sending instructions to the focus driving unit 32 and the like (step S120).

The user presses the high-speed shooting switch 16 to instruct the apparatus to start the high-speed shooting (step S130: "Pressed"). Upon detecting this, the whole apparatus control unit 100 notifies the high-speed shooting control unit 48 that the high-speed shooting is to be started.

Upon receiving the instruction to start the high-speed shooting, the high-speed shooting control unit 48 inquires the whole apparatus control unit 100 whether the high-speed shooting mode switch 4 is "ON" or "OFF", and whether the high-speed shooting switch 16 is half-pressed or fully pressed.

Upon receiving the inquiries, the whole apparatus control unit 100 returns "ON" when the high-speed shooting mode 43 is set in the mode setting unit 42; and returns "OFF" when the normal shooting mode 44 is set in the mode setting unit 42. Also, the whole apparatus control unit 100 returns "Half-pressed" when the high-speed shooting switch 16 is in the half-pressed state 16c; and returns "Fully pressed" when the high-speed shooting switch 16 is in the fully pressed state 16d.

Upon receiving the states of the high-speed shooting mode switch 4 and the high-speed shooting switch 16, the high-speed shooting control unit 48 performs the high-speed shooting in the high-speed shooting preparation provided mode (step S160) when the high-speed shooting mode switch 4 is "ON" (step S140: "ON") and the high-speed shooting switch 16 is "Half-pressed" (step S150: "Yes").

The high-speed shooting control unit 48 performs the high-speed shooting in the no high-speed shooting preparation mode (step S170) when the high-speed shooting mode switch 4 is "OFF" (step S140: "OFF") or the high-speed shooting switch 16 is "Fully pressed" (step S150: "No").

After this, until the user releases the shooting button 2 to the not-pressed state to instruct to end the shooting (step S180), the shooting operation from step S120 to step S170 is performed repeatedly.

Next, the process of the high-speed shooting in the high-speed shooting preparation provided mode will be described with reference to FIG. 15.

The process to be explained here is based on the shooting method having been described with reference to FIGS. 5, 8, and 9.

FIG. 15 is a flowchart showing the procedures of the high-speed shooting in the high-speed shooting preparation provided mode.

First, the high-speed shooting control unit 48 instructs the aperture driving unit 35 to start opening the aperture, and instructs the shutter time control unit 49 to start decreasing the exposure time by ejecting the charges that are generated by the photoelectric conversion during the exposure stop time adjusted by the exposure stop time control unit 53 (step S200).

This process will be described in detail in <Aperture/exposure time transition process>.

When the aperture level reaches the limit (step S210: YES), the high-speed shooting control unit 48 sets the aperture to full open (the value for the brightest), increases the signal output by increasing the gain of the amplifier 51 or by changing the sensitivity of the image sensor 40 with use of the sensitivity control unit 73, and decreases the noise by using the noise filter (step S220).

After this, when the user instructs to actually start the high-speed shooting by fully pressing the high-speed shooting switch 16 (step S230: YES), the whole apparatus control unit 100, detecting this, notifies it to the high-speed shooting control unit 48. Upon receiving the notification, the high-speed shooting control unit 48 instructs the frame rate control unit 60 to set the frame rate to R2 (step S230: YES).

Upon receiving the instruction, the frame rate control unit 60 instructs the image sensor 40 to set the frame rate to R2, and with this, the high-speed shooting is started (step S240).

After this, when the user releases the high-speed shooting switch 16 to the not-pressed state to instruct to end the high-speed shooting (step S250: YES), the whole apparatus control unit 100, detecting this, instructs the frame rate control unit 60 to return the frame rate to R1, and notifies the high-speed shooting control unit 48 that the high-speed shooting should end (step S250: YES).

Upon receiving the instruction, the frame rate control unit 60 instructs the image sensor 40 to return the frame rate to R1, and with this, the normal shooting is restarted (step S260).

Upon receiving the instruction to end the high-speed shooting, the high-speed shooting control unit 48 closes the aperture gradually and, at the same time, increases the exposure time gradually so that the aperture and the exposure time return to the states in the normal shooting, and decreases the amplification rate or the like as necessary (step S270).

Next, the process of the high-speed shooting in the no high-speed shooting preparation mode will be described with reference to FIG. 16.

The process to be explained here is based on the shooting method having been described with reference to FIGS. 8 and 10. Steps from S320 to S360 constitute the process when the shooting method of FIG. 8 is used and there is almost no period for the high-speed shooting preparation provided mode. Also, steps from S400 to S450 constitute the process when the shooting mode of FIG. 10 is used.

FIG. 16 is a flowchart showing the procedures of the high-speed shooting in the no high-speed shooting preparation mode.

It is presumed here that the current exposure time when the normal shooting is performed at the frame rate R1 is referred to as "first exposure time T1"; and the maximum exposure time when the high-speed shooting is performed at the frame rate R2 is referred to as "second exposure time T2".

First, the high-speed shooting control unit 48 instructs the shutter time control unit 49 to adjust the exposure time to the first exposure time T1 or the second exposure time T2 that is smaller than the other, and the shutter time control unit 49 adjusts the exposure time accordingly (step S300). In other words, it decreases T1 so that T1=T2 is satisfied.

When it judges that the aperture will reach, the limit if the first exposure time T1 is adjusted (step S310: YES), the high-speed shooting control unit 48 sets the aperture to full open (the value for the brightest), increases the signal output by increasing the gain of the amplifier or by changing the sensitivity of the image sensor 40, and decreases the noise by using the noise filter (step S320).

After this, the high-speed shooting control unit 48 instructs the frame rate control unit 60 to set the frame rate to R2, and upon receiving the instruction, the frame rate control unit 60 instructs the image sensor 40 to set the frame rate to R2; and with this, the high-speed shooting is started (step S330).

After this, when the user releases the high-speed shooting switch 16 to the not-pressed state to instruct to end the high-speed shooting (step S340: YES), the whole apparatus control unit 100, detecting this, notifies the high-speed shooting control unit 48 that the high-speed shooting should end, and upon receiving this notification, the high-speed shooting control unit 48 instructs the frame rate control unit 60 to return the frame rate to R1.

Upon receiving the instruction, the frame rate control unit 60 instructs the image sensor 40 to return the frame rate to R1, and with this, the normal shooting is restarted (step S350).

Also, simultaneously with instructing the frame rate control unit 60, the high-speed shooting control unit 48 increases the exposure time by performing a control to decrease the amplification rate and close the aperture, and the normal shooting is restarted (step S360).

On the other hand, when it judges that the aperture will not reach the limit if the first exposure time T1 is adjusted (step S310: NO), the high-speed shooting control unit 48 controls the aperture so that a predetermined amount of exposure is obtained (step S400).

After this, the high-speed shooting control unit 48 instructs the frame rate control unit 60 to set the frame rate to R2, and upon receiving the instruction, the frame rate control unit 60 instructs the image sensor 40 to set the frame rate to R2, and with this, the high-speed shooting is started (step S410).

The amount of exposure is adjusted by a combination of the aperture, exposure time, and gain (step S420).

After this, when the user releases the high-speed shooting switch 16 to the not pressed state to instruct to end the high-speed shooting (step S430: YES), the whole apparatus control unit 100, detecting this, notifies the high-speed shooting control unit 48 that the high-speed shooting should end, and upon receiving the instruction, the high-speed shooting control unit 48 instructs the frame rate control unit 60 to return the frame rate to R1.

Upon receiving the instruction, the frame rate control unit 60 instructs the image sensor 40 to return the frame rate to R1, and with this, the normal shooting is restarted (step S440).

Also, when it instructs the frame rate control unit 60 to return the frame rate to R1, the high-speed shooting control unit 48, at the same time, increases the exposure time by performing a control to decrease the amplification rate and close the aperture, and the normal shooting is restarted (step S450).

<Aperture/Exposure Time Transition Process>

Here, a description is given of the aperture/exposure time transition process. This process is performed in the preparation period when the high-speed shooting is performed in the high-speed shooting preparation provided mode. The process is performed in step S200 shown in FIG. 15.

The aperture/exposure time transition process is described with reference to FIGS. 17 and 18.

Figure 17:
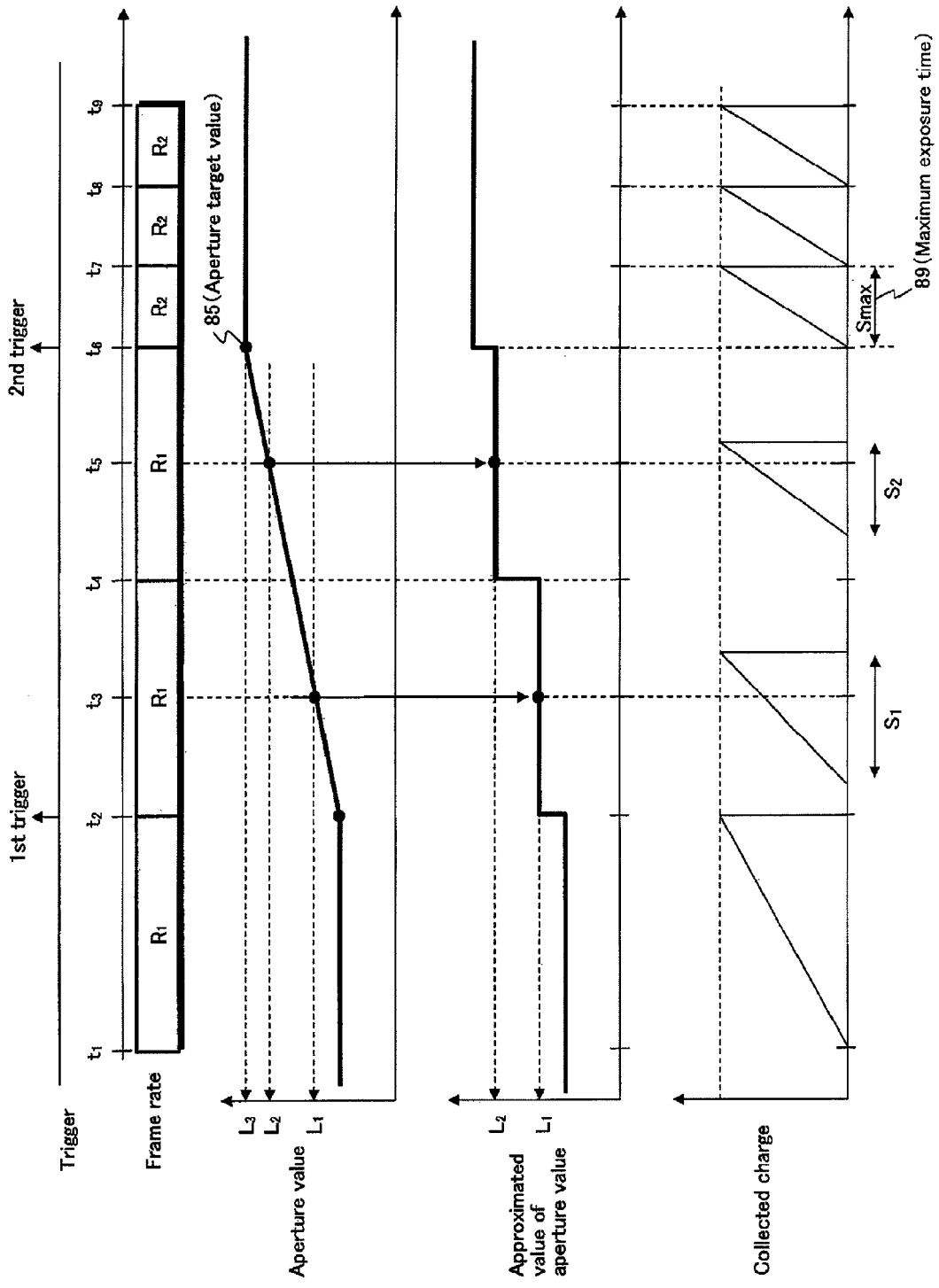
FIG. 17 shows time charts regarding the aperture and exposure time when the normal shooting transits to the high-speed shooting in the high-speed shooting preparation provided mode.

FIG. 17 shows time charts regarding the aperture and exposure time.

FIG. 17 explains the period from time t1 to time t2 shown in FIG. 5, where the period from time t2 to time t4 shown in FIG. 5 is omitted for the sake of convenience. Also note that the signs such as "t1" in FIG. 17 and FIG. 5 represent different times.

The first row in FIG. 17 shows a time chart regarding the trigger indicating the triggers for operations. Also, the second row shows a time chart regarding the frame rate. The third row shows a time chart regarding the aperture, and the vertical axis indicates how the aperture is opened. The third row shows a time chart regarding the exposure time, where the vertical axis indicates the aperture value, and L1, L2, L3 represent aperture values that are larger in this order. Note that, as the aperture value is larger, the aperture is more opened.

The fourth row shows a time chart regarding the approximated value of aperture value. This value is used to obtain the exposure time.

The fifth row shows a time chart regarding the collected charges, where the vertical axis indicates the amount of collected charges and the bi-directional arrows S1 and the like indicate exposure times.

Here, a brief explanation is given with reference to FIG. 17. Upon receiving the first trigger, the image shooting apparatus calculates the aperture target value 85, and changes the aperture toward the aperture target value 85, and at the same time, decreases the exposure time to transit to the maximum exposure time Smax 89 for the frame rate R2 for the high-speed shooting. Here, the exposure time for each frame is obtained from (i) the approximated value of aperture value for each frame and (ii) the charges to be collected for each frame.

Upon receiving the second trigger, the image shooting apparatus changes the frame rate from R1 to R2, and Starts the high-speed shooting.

The aperture target value is calculated based on the fact that the increased or decreased amount of light per frame is determined uniquely when the frame rate for the normal shooting and the frame rate for the high-speed shooting are determined. That is to say, when the frame rate is determined, the increased or decreased amount of light is determined, and thus the target value for opening pr closing the aperture is determined. How the aperture target value is calculated will be described in <How to calculate aperture target value>.

Figure 18:
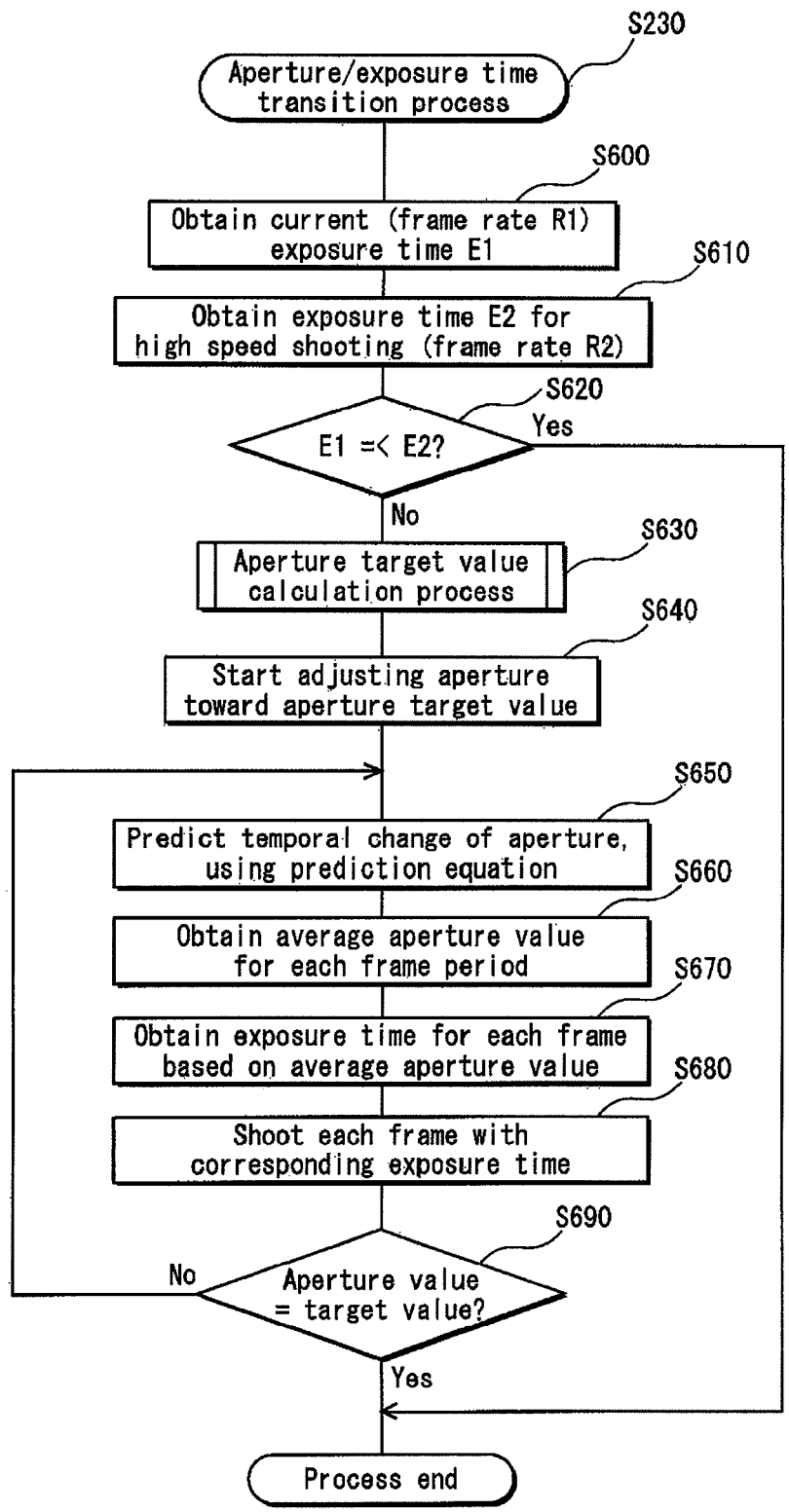
FIG. 18 is a flowchart showing the procedures of the aperture/exposure time transition process.

FIG. 18, is a flowchart showing the procedures of the aperture/exposure time transition process.

The high-speed shooting control unit 48 obtains the current exposure time E1 from the shutter time control unit 49 (step S600), and obtains the exposure time E2, namely the exposure time target value 87, from the frame rate R2 for the high speed shooting (step S610). Here, the exposure time target value 87 is presumed to be the maximum exposure time Smax 89 for the frame rate R2. Generally, the largest value among a plurality of selectable values is selected as the exposure time target value 87. The value Smax is uniquely determined only from the frame rate R2.

When the current exposure time E1 is equal to or smaller than the exposure time E2 being the exposure time target value 87 (step S620: YES), nothing is performed since there is no need for adjusting the aperture. This case corresponds to "the case in which the exposure time does not need to be changed" shown in FIG. 7.

When the current exposure time E1 is larger than the exposure time E2 (step S620: NO), the aperture target value calculating unit 55 is requested to calculate the aperture target value 85 (step S630). Upon receiving the request, the aperture target value calculating unit 55 calculates the aperture target value 85, and passes it over to the high-speed shooting control unit 48.

The high-speed shooting control unit 48 then instructs the aperture driving unit 35 to open the aperture 36 gradually so that the aperture value becomes the received aperture target value 85 (step S640).

Since the aperture is mechanically controlled, it takes 10 ms to 30 ms of time for the aperture to be opened. As shown in FIG. 17, the aperture is opened gradually during the period from time t2 to time t6.

The change of the aperture is predicted by using prediction equation (step S650). The change of the aperture can be predicted by using a simple prediction equation since the control characteristics of the image shooting apparatus 1 for controlling the aperture 36 is preliminarily known.

Next, aperture values L1 and L2 are calculated, where the aperture values L1 and L2 are each an average aperture value for a corresponding frame period (step S660, see the time chart regarding the approximated value of aperture value shown in FIG. 17).

Next, exposure times S1 and S2, with which optimum exposures can be obtained at the apertures L1 and L2 respectively, are calculated for each frame (step S670).

The high-speed shooting control unit 48 shoots each frame by specifying the optimum exposure times S1 and S2 to the shutter time control unit 49 (step S680).

When the aperture value reaches the aperture target value 85 (step S690: YES), the aperture value and exposure time are held.

Upon receiving from the whole apparatus control unit 100 a notification that the second trigger was received, the high-speed shooting control unit 48 instructs the frame rate control unit 60 to set the frame rate to R2, and starts the high-speed shooting.

As described above, according to the present invention, the aperture target value calculating unit 55 can calculate the aperture target value 85 and the exposure time target value 87 for the high-speed shooting depending on the frame rate for the high-speed shooting, and thus the aperture 36 and exposure time are controlled momentarily by the feed-forward method. The structure reduces the processing time greatly, compared with the case where the exposure control unit 76 corrects the aperture based on a conventional automatic exposure method. This makes it possible to transit from the normal-speed shooting to the high-speed shooting in a shorter time. It is therefore possible to provide the user with an image shooting apparatus that is quick in response and easy-to-use.

Note that, when the image shooting apparatus were operated according to the automatic exposure method, the brightness would be detected from the image sensor 40, and the exposure control unit 76 would adjust the aperture and the shutter speed by performing the feedback control. According to the automatic exposure method, information on the brightness of the image is obtained only in unit of a frame or a field. That is to say, the feedback control should be performed based on up to approximately 60 pieces of sample data per second. To perform the feedback control, at least a plurality of samples of brightness are necessary, namely, image information of a plurality of frames is necessary. This means that it takes time to change the aperture. In this way, when the automatic exposure method with the feedback control is used, the response is slow requiring several tens of frames, and the aperture changes at a slow follow speed when the shooting transits from the normal-speed shooting to the high-speed shooting. Therefore, with the automatic exposure method, the user may miss a shutter opportunity and may not be able to capture a desired scene by the high-speed shooting because it takes time for the frame rate to be changed after the high-speed shooting button is pressed.

<How to Calculate Aperture Target Value>

Next, the aperture target value calculation process will be explained with reference to FIGS. 19A, 19B and 20.

Figure 20:
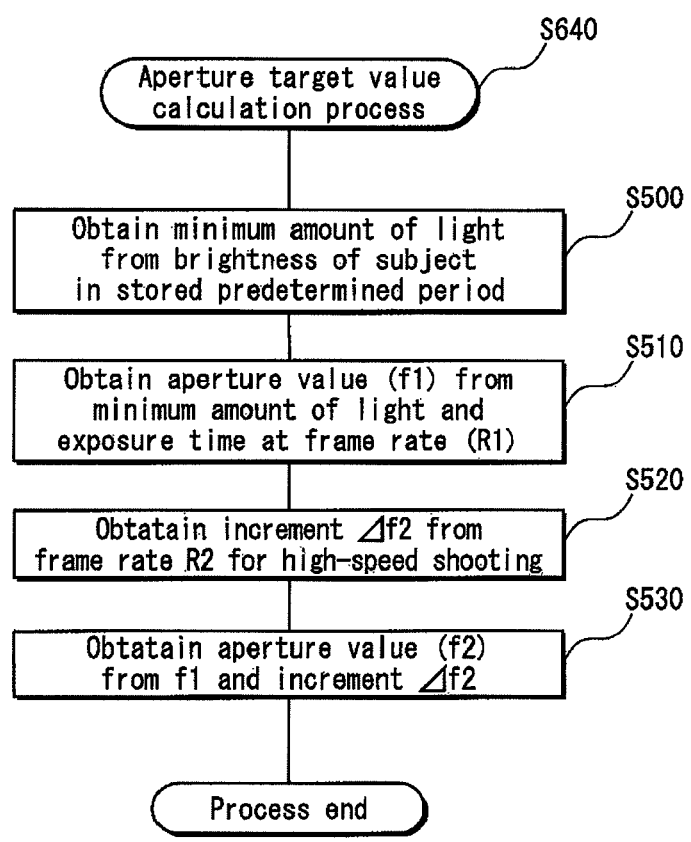
FIG. 20 is a flowchart showing the procedures of the aperture target value calculation process.

FIG. 20 is a flowchart showing the procedures of the aperture target value calculation process performed by the aperture target value calculating unit 55.

Figure 19A:
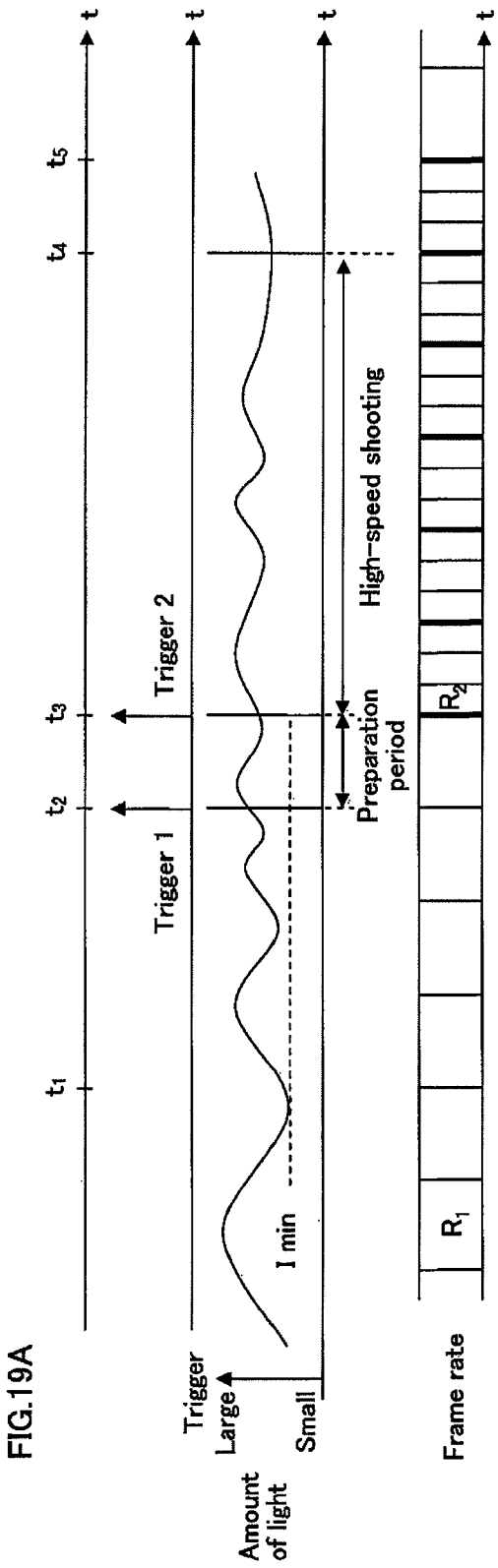
FIG. 19A shows a time chart regarding the amount of light.

FIG. 19A shows a time chart regarding the amount of light.

The first row of FIG. 19A shows a time chart regarding the trigger.

The second row shows the time chart regarding the amount of light, where the vertical axis indicates the amount of light. The amount of light is detected by the brightness detecting unit 56, and is stored in a work area inside the aperture target value calculating unit 55 for a predetermined time period.

Also, the third row shows a time chart regarding the frame rate, where one rectangular box represents one frame. The signs "R1" and "R2" in the boxes respectively indicate frame rates at which the shooting is performed.

Figure 19B:
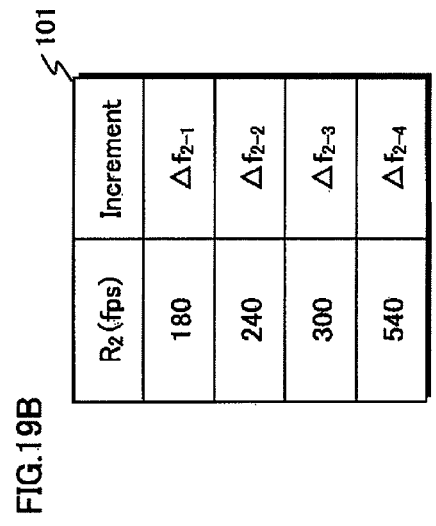
FIG. 19B shows a correspondence table 101 showing correspondence between the frame rate and the increment of aperture.

FIG. 19B shows a correspondence table 101 showing correspondence between the frame rate and the increment of aperture. A value of increment Δf2 is determined uniquely from a value of the second frame rate R2. Based on this fact, the correspondence table 101 indicates the correspondence between values of the frame rate and increment. That is to say, when the value of R2 is determined, the maximum exposure time Smax is determined according to the value of R2, and thus the value of increment Δf2 is determined uniquely.

The aperture target value 85 can be calculated based on the first frame rate (the frame rate R1 for the normal shooting), the first exposure time, the first aperture, and the second frame rate (the frame rate R2 for the high-speed shooting).

The most important parameter in this calculation is the second frame rate 81. This is because the first frame rate, the first exposure time, and the first aperture have already been obtained, and the increment or decrement of the amount of light greatly varies in a range from 1 to 1/n depending on the second frame rate 81.

Furthermore, the value of the first aperture is an important factor when the aperture target value 85 is calculated. That is to say, the brightness of the subject of shooting is not always constant. Therefore, the aperture target value 85 may not be calculated appropriately when the aperture immediately before the change of the frame rate is used. For example, when the subject is bright immediately before the change of the frame rate, an excessively low value may be obtained as the aperture target value 85.

In view of this, the image shooting apparatus 1 determines, as the first aperture, a value of aperture at the time when the subject is darkest during a predetermined time period before the change of the frame rate. This arrangement produces an advantageous effect of preventing images shot by the high-speed shooting from becoming underexposure.

The following explains the method of calculating the value of the second aperture f2 for the high-speed shooting, the second aperture f2 being equivalent with the aperture target value 85, with reference to FIG. 20.

First, as shown in FIG. 19A, the amount of light is measured and the measured value is stored. In this example, a minimum value Imin is measured and stored at time t2, where "Imin" represents the minimum value of amount of light during a period from time t1 to time t2, namely a period before a trigger 1 is received, the trigger 1 being a trigger to start the preparation for the high-speed shooting.

At time t2 when the trigger 1 is received, the stored minimum value of amount of light is obtained (step S500). In the example shown in FIG. 19A, the minimum value is an amount of light "I" at time t1.

A first aperture f1 is obtained from the minimum value Imin (step S510). More specifically, the first aperture is obtained from the first exposure time and the amount light represented by the "Imin".

Next, the increment Δf2 of the second frame rate R2 is obtained from the correspondence table 101, and the second aperture f2 is obtained from the obtained increment Δf2 and the first aperture f1 (step S520).

As shown in FIGS. 19A and 19B, when the first aperture f1 is obtained based on the minimum value of amount of light during a predetermined period before the trigger 1 is received, the second aperture of the darkest state is determined as the target value.

Since the aperture target value 85 is determined as described above, even if the amount of light changes during a period from time t3 to time t4, statistically, there is a low possibility that the amount of light is smaller than "Imin", and there is a low possibility that an exposure shortage occurs.

Also, the second exposure time is typically set to the maximum value during the period from time t3 to time t4. Therefore, if the subject becomes darker, the exposure time cannot be increased any longer. That is to say, the exposure time cannot be used to compensate the darkness. Also, the aperture adjustment is a mechanical operation and cannot follow it at a high speed. Thus the aperture cannot be used to compensate the darkness, either. For these reasons, determining the aperture of the darkest state as the aperture target value reduces the possibility that an exposure shortage occurs.

As described up to now, according to the present invention, the brightest value of "f", is set to "f2" because the aperture f1 is obtained based on the minimum amount of light Imin during a predetermined period before the trigger 1 is received, and the obtained aperture f1 is used. The present invention with this structure produces an advantageous effect that an exposure, shortage does not occur during the period from time t3 to time t4.

In the present embodiment, the amount of light is measured and stored. However, not limited to this, the aperture may be stoked. In this case, the maximum aperture among the stored values of aperture, namely the aperture of the brightest state is set to the first aperture.

<Modification>

The following describes a modification of the above-described aperture/exposure time transition process.

This modification is a transition process for the high-speed shooting method having been explained with reference to FIG. 13.

Figure 21:
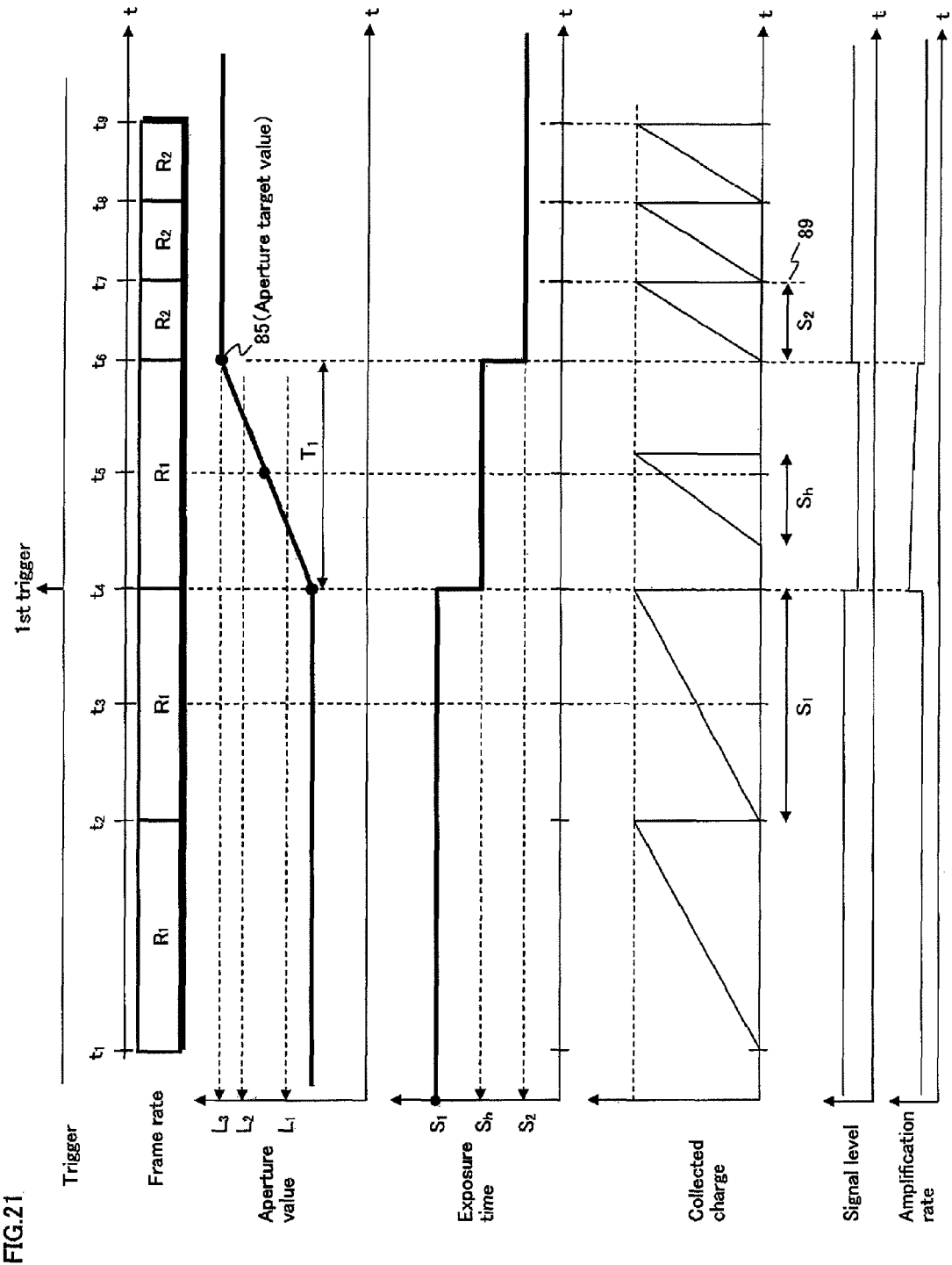
FIG. 21 shows time charts regarding the aperture and exposure time when the normal shooting transits to the high-speed shooting in the no high-speed shooting preparation mode.

FIG. 21 shows a method of switching the shooting from the normal shooting to the high-speed shooting, where the time taken to transit from the normal shooting to the high-speed shooting is shorter than that in the method shown in FIG. 17. The present modification reduces the time taken to transit from the normal shooting to the high-speed shooting by applying the gain.

FIG. 21 shows, as FIG. 17, time charts regarding the trigger, frame rate, aperture value, and collected charges, and also shows time charts regarding the exposure time, signal level, and amplification rate.

The time per frame is approximately 16.7 ms at the frame rate R1 for the normal speed. On the other hand, with the feed forward method of the present invention, the aperture's response speed is in a range from 10 to 15 ins. Accordingly, as shown in the time chart of the third row regarding the aperture, it is possible to change the aperture during a period from time t4 to time t6, namely, during a time period of one frame.

In this case, the exposure time of the frame corresponding to the period from time t4 to time t6 is set to "Sh" that represent an intermediate value between the exposure time S1 at the frame rate R1 and the exposure time S2 at the frame rate R2.

By setting the exposure time in this way, it is possible to change the frame rate in a period of a transition time T1 from time t4 to time t6. This produces an advantageous of effect of making the response quicker.

In this case, as shown in the time chart regarding the signal level in the sixth row, the level of image signal falls during the period from time t4 to time t6. However, when the brightness detecting unit 56 is used to detect the brightness and the AGC unit 57 is used to adjust the gain, it is possible to make the change (increase or decrease) of brightness smoother, as shown in the time chart of the seventh row regarding the amplification rate. In this way; it is possible to reproduce the images more seamlessly when the shooting mode is changed.

Note that, when the shooting transits from the normal shooting to the high-speed shooting without a preparation period therebetween, the exposure time becomes short in accordance with the frame rate immediately after the start of the high-speed shooting, and when the aperture is increased in the period from time t4 to time t6 shown in FIG. 10, it is also possible to change the frame rate in the same way.

Figure 22:
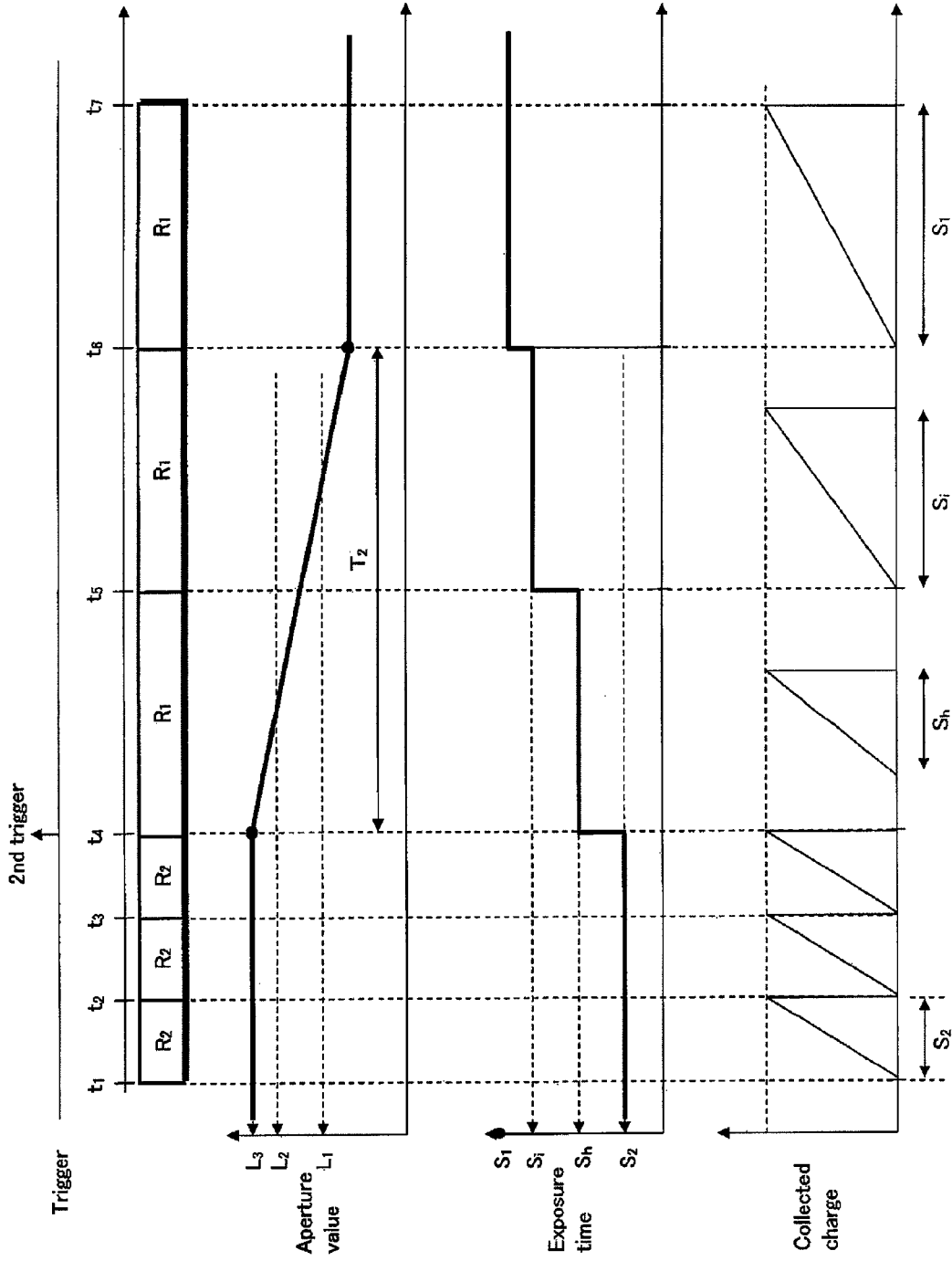
FIG. 22 shows time charts regarding the aperture and exposure time when the high-speed shooting transits to the normal shooting.

Next, FIG. 22 shows a method of switching the shooting from the high-speed shooting to the normal shooting.

FIG. 22 shows, as FIG. 17, time charts regarding the trigger, frame rate, aperture value, and collected charges, and also shows a time chart regarding the exposure time.

At time t4 when a trigger 2 is received, the frame rate is changed from R2 to R1, where the trigger 2 is a trigger to end the high-speed shooting.

After this, during the transition time from time t4 to time t6, the aperture is decreased, and the exposure time in increased. It is presumed here that the transition time from time t4 to time t6 is a period of two frames.

When the frame rate is changed from R1 for the normal shooting to R2 for the high-speed shooting, it is changed in a short time such as the transition time T1 shown in FIG. 21 so that a quick response is provided and a shutter opportunity is not missed.

On the other hand, when the frame rate is changed from R2 for the high-speed shooting to R1 for the normal shooting, the transition may take a relatively long time of several tens of frames because the aperture or the exposure time may be corrected after the frame rate change. Rather, it produces an advantageous effect of making the change more seamless.

The present invention satisfies the relation "T1<T2". This produces an advantageous effect that both the seamlessness and the response are realized.

Embodiment 2

In Embodiment 1, a method of switching from the normal shooting to the high-speed shooting was described. In Embodiment 2, a method of collecting the image data of the images shot by the high-speed shooting is described.

<Method of Recording Images Shot by High-Speed Shooting>

It is practically impossible to record data of all images shot by the high-speed shooting, due to the limitation in terms of memory, processing speed, recording speed and the like.

In view of this, it is a more practical way to temporarily store the shot images in the buffer memory 90, extract only necessary images from those stored in the buffer memory 90, and record the extracted images into the recording medium 91 that is an IC memory or the like (see FIG. 3).

This method of extracting and recording only necessary images is described with reference to FIGS. 23 and 24.

Figure 23:
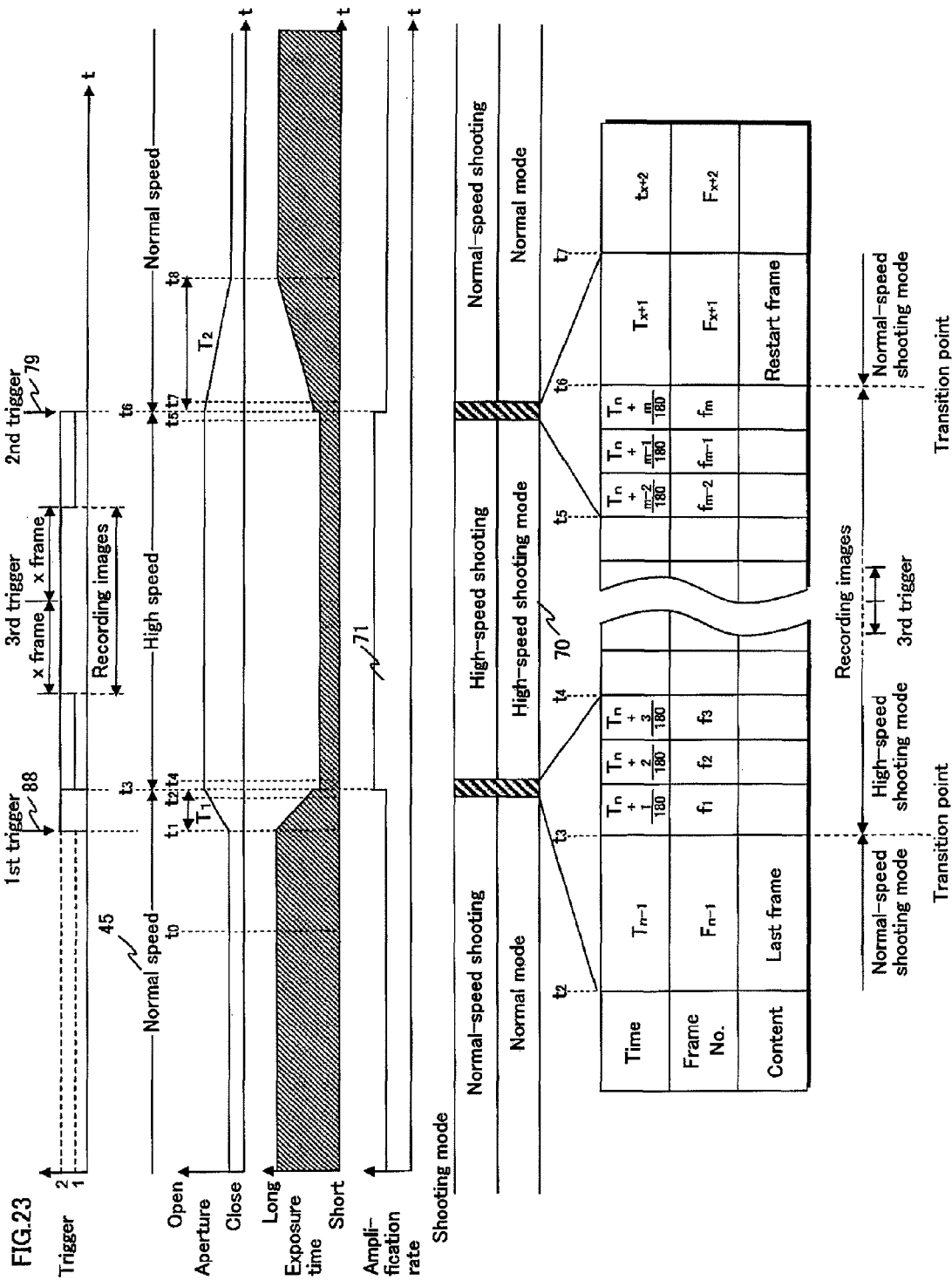
FIG. 23 shows a method, of switching the shooting from the normal shooting to the high-speed shooting, and recording part of the images shot by the high-speed shooting.

FIG. 23 shows a method of switching the shooting from the normal shooting to the high-speed shooting, and recording part of the images shot by the high-speed shooting.

FIG. 23 shows, as FIG. 13, time charts regarding the trigger, aperture, exposure time, amplification rate, and shooting mode and the frame transition table when a normal shooting, a high-speed shooting, and a normal shooting are performed in the stated order. In this example, a method of recording part of the shot images while the high-speed shooting is performed by the image shooting method shown in FIG. 13. However, this method is also applicable to other image shooting methods such as the method shown in FIG. 5.

When the first trigger 88, a trigger to start the high-speed shooting, is received at time t1, the aperture is opened gradually and the exposure time is decreased gradually during the period T1 from time t1 to time t3 (see the time chart regarding the aperture in the second row, and the time chart regarding the exposure time in the third row).

At time t3 when the exposure time becomes the length of time for the high-speed shooting, the high-speed shooting is started.

When a third trigger, a trigger to record, is received while the high-speed shooting is being performed, a predetermined number (n) of frames before and after the receiving of the third trigger are recorded. The third trigger may be received a plurality of times before the second trigger is received, and at each receiving of the third trigger, n frames before and after the receiving of the third trigger are recorded. In this example, it is presumed that the third trigger is received once.

At time t6, when the second trigger 79 that is a trigger to end the high-speed shooting is received, the shooting returns from the high-speed shooting to the normal-speed shooting. In the period T2 from time t6 to time t8, the aperture is closed gradually and the exposure time is increased gradually in accordance with the transition of the aperture (see the time chart regarding the aperture in the second row, and the time chart regarding the exposure time in the third row).

At time t8, the values of the aperture and the exposure time are the same as those during the normal shooting.

With this recording method, it is possible to prevent the user from missing a shutter opportunity, namely prevent the user from making a shooting failure because, for example, when the user presses the image recording switch at a timing when a golfer makes a shot, images shot before and after the timing of making the shot are recorded as high-speed images. Accordingly, the method produces an advantageous effect that even a user who is not familiar with the high-speed shooting can easily shoot images by the high-speed shooting.

Next, an image recording method is described with reference to FIG. 24.

Figure 24:
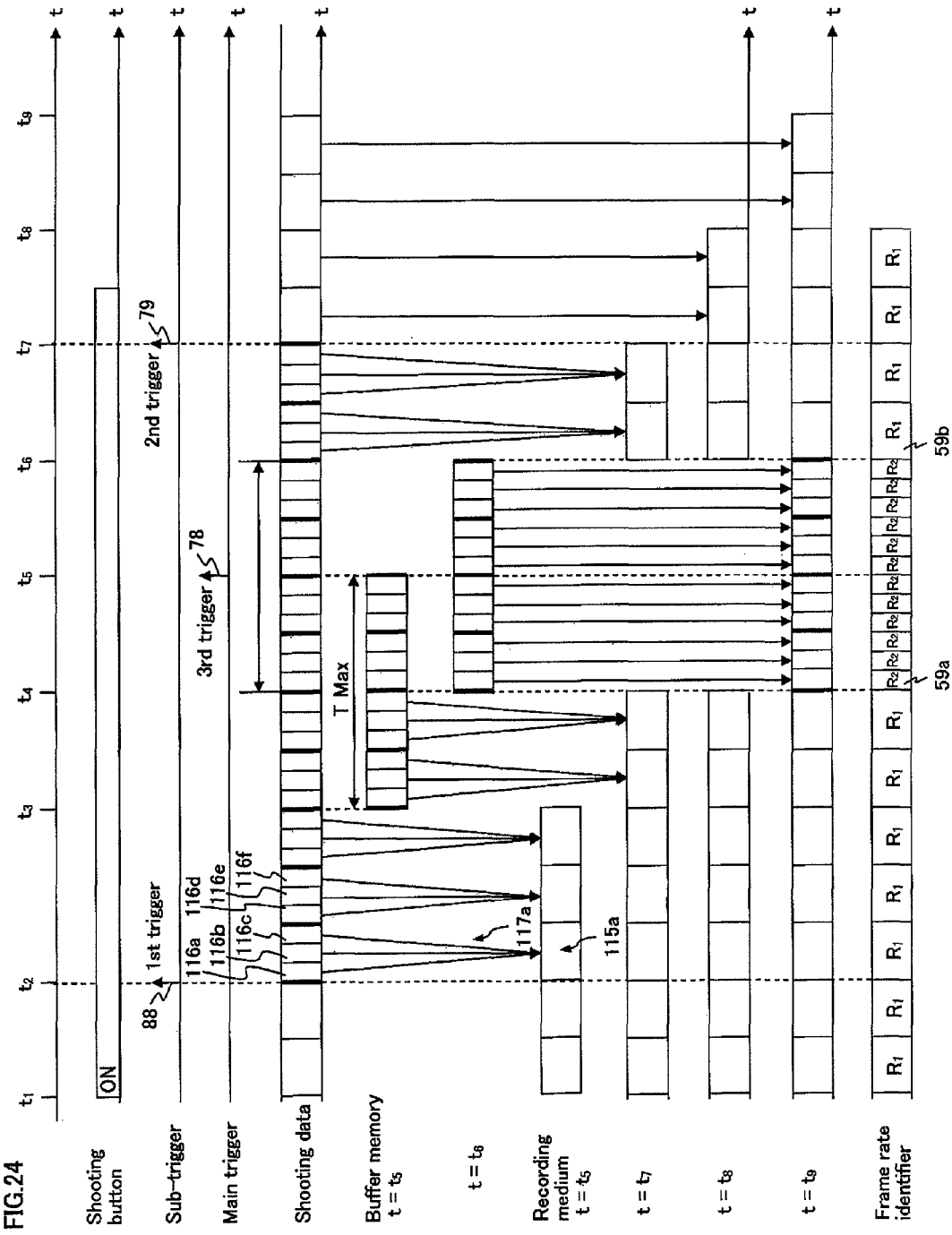
FIG. 24 shows a method of recording images.

FIG. 24 shows a method of recording images shot by the high-speed shooting. In this method, upon receiving the first trigger, the normal shooting transits to the high-speed shooting, and upon receiving the third trigger, the images shot by the high-speed shooting are recorded, and upon receiving the second trigger, the shooting returns to the normal shooting. This is also applicable to other image shooting methods.

The first row shows a time chart regarding the state in which the shooting button 2 is, and in this example, the sign "ON" indicates that the button is fully pressed (see FIG. 2).

The second row shows a time chart regarding the input of sub-trigger. The third row shows a time chart regarding the input of main trigger. In this example, it is presumed that the sub-trigger is when the high-speed shooting switch 16 is half-pressed; and the main trigger is when the high-speed shooting switch 16 is fully pressed (see FIG. 2).

The fourth row shows a time chart regarding the shooting data. One rectangular box represents one frame. Hereinafter, a frame shot at the frame rate R1 is referred to as "normal frame"; and a frame shot at the frame rate R2 is referred to as "high-speed frame".

The fifth and sixth rows show time charts regarding the data of images shot by the high-speed shooting and recorded in the buffer memory 90 at times t5 and t6, respectively.

The seventh through tenth rows show time charts regarding the data of images shot by the high-speed shooting and recorded in the recording medium 91 at times t 5, t7, t8, and t 9, respectively.

The eleventh row shows a time chart regarding the frame rate identifier of the recorded high-speed shooting image data. In this example, the sign "R1" represents the frame rate R1, the sign "R2" represents the frame rate R2, and the frame rate identifier is attached to each frame. The frame rate identifier is used, for example, when the high-speed shooting image data is converted into the normal shooting image data so that an image can be reproduced.

When the first trigger 88 that is a trigger to start the high-speed shooting is input at time t2 while the normal shooting is being performed, with the shooting button 2 being fully pressed, the frame rate changes from R1 to R2, and the high-speed shooting is started at time t2 (see the time chart regarding the shooting data).

The recording of the high-speed shooting image data into the buffer memory 90 is started from time t2. Note here that only image data of images shot in the period Tmax is recorded into the buffer memory 90. That is to say, when a new high-speed frame is recorded, an old high-speed frame is transferred to the recording medium 91 as a normal frame, and is deleted from the buffer memory 90.

In the present embodiment, the frame rate R1 is 60 fps, and the frame rate R2 is 180 fps. Accordingly, three high-speed frames correspond to one normal frame. Therefore, one normal frame is generated from three high-speed frames, and the generated normal frame is recorded into the recording medium 91.

More specifically, at the time of time t5, the image data of images shot in the period Tmax from time t3 to time t5 has been stored in the buffer memory 90, and high-speed frames of the period from time t2 to time t3 are synthesized by the frame synthesizing unit 58 (see step 117a), and the synthesized data is recorded into the recording medium 91 as a normal frame 115.

That is to say, three high-speed frames 116a, 116b, and 116c are synthesized into one frame 115a through processes of addition and the like, and the frame 115a is recorded into the recording medium 91 or a memory. Alternatively, only the high-speed frame 116b, namely, a middle one among the three high-speed frames, may be recorded as the frame 115a.

When the third trigger 78 that is a trigger to record images is input at time t5, only frames of images shot in the periods from time t4 to time t5 and from time t5 to time t6, namely images before and after time t5, are recorded as high-speed frames.

At the time of time t6, two normal frames generated by synthesizing six high-speed frames of the period from time t3 to time t4 have been recorded in the recording medium 91, and high-speed frames of the period from time t4 to time t6 have been recorded in the buffer memory 90 as they are.

From time t6 and onwards, high-speed frames are synthesized into normal frames and the normal frames are recorded. When the second trigger 79, which is a trigger to end the high-speed shooting, is input at time t7, the frame rate is returned from R1 to R1, and the normal shooting is restarted (see the time chart regarding the shooting data). Thereafter, the normal shooting image data is recorded into the recording medium 91 as the normal frames.

At time t9, "n" high-speed frames before and after the input of the third trigger that have been recorded in the buffer memory 90 are recorded into the recording medium 91.

When the frames are recorded, a frame rate identifier, which indicates a frame rate, is attached to each frame (see the time chart regarding the frame rate identifier).

A frame rate identifier 59b, which indicates R1, is attached to each normal frame; and a frame rate identifier 59a, which indicates R2, is attached to each high-speed frame. In FIG. 24, the frame rate identifier 59b, which indicates R1, is represented as "R1"; and the frame rate identifier 59a, which indicates R2, is represented as "R2".

With the above-described structure in which "n" frames of high-speed shooting images, before and after the input of the third trigger 78 during a high-speed shooting, are collected and recorded in the buffer memory 90, an advantageous effect of making the capacity of the buffer memory minimum is produced. Also, since "±n" frames of images are recorded as high-speed shooting images when the user presses the image recording switch, the structure produces an advantageous effect that images are shot without missing the shutter opportunity and the shot images are recorded.

FIG. 24 shows an example where high-speed frames of images shot in the period Tmax before and after the input of the third trigger, a trigger to record images, are recorded. Now, an example where high-speed frames of images shot in the period Tmax before the input of the third trigger are recorded will be described with reference to FIG. 25; and an example where high-speed frames of images shot in the period Tmax after the input of the third trigger are recorded will be described with reference to FIG. 26.

Figure 25:
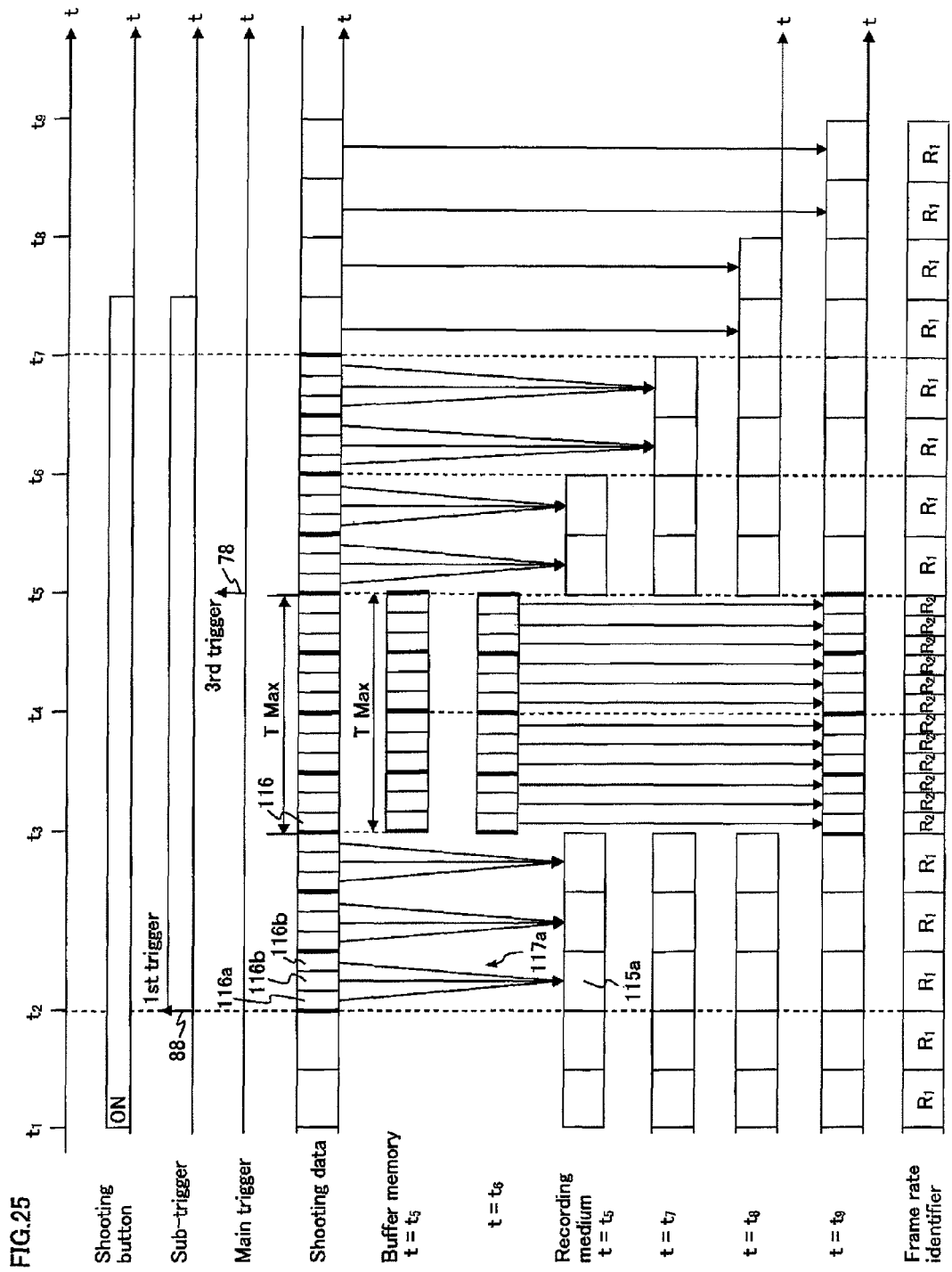
FIG. 25 shows a method of recording high-speed frames of images shot in the period Tmax before the input of the third trigger.

The recording method shown in FIG. 25 is almost the same as the recording method shown in FIG. 24. The only difference from FIG. 24 is that high-speed frames of images shot in the period Tmax before the input of the third trigger 78 are recorded.

In this example, the third trigger 78 is received at time t5. At this point in time, high-speed frames 116 of images shot in the period from time t3 to time t5 have been recorded in the buffer memory 90.

In this example, normal frames are each generated by synthesizing every three high-speed frames of images shot in the periods from time t2 to time t3 and from time t5 and onwards, and the generated normal frames are recorded into the recording medium 91.

In this example shown in FIG. 25, the user presses the image recording switch when the action ends, and the high-speed shooting images of the action are recorded.

Figure 26:
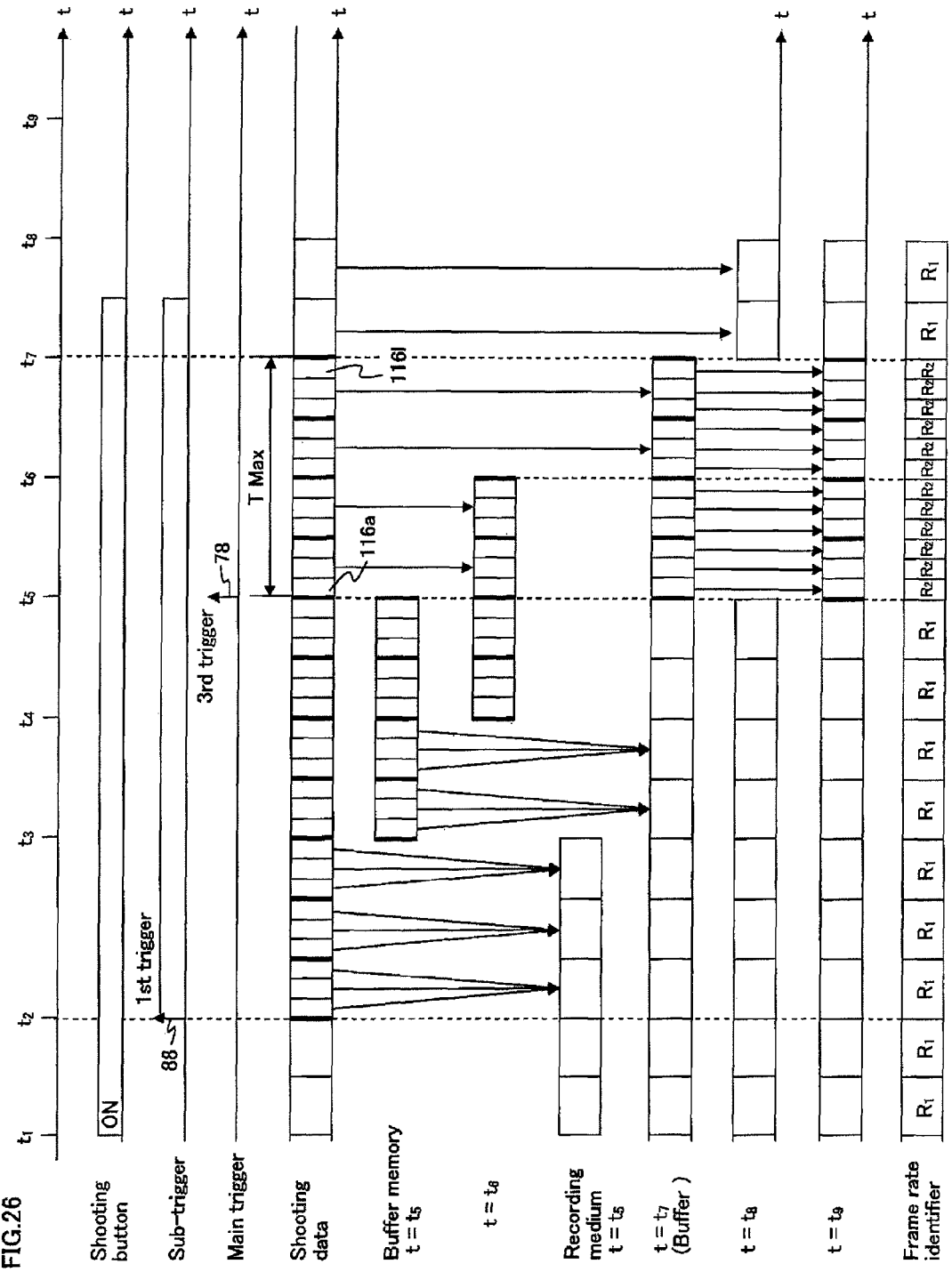
FIG. 26 shows a method of recording high-speed frames of images shot in the period Tmax after the input of the third trigger.

FIG. 26 shows an operation that is a reverse of FIG. 25. That is to say, when the third trigger 78 is input at time t5, high-speed frames 116*a* through 116*l* of images shot in the period from time t5 to time t7 are recorded as high-speed frames, and the frames of images shot in the periods from time t2 to time t5 and from time t7 and onwards are recorded as normal frames.

In this example shown in FIG. 26, the user presses the image recording switch immediately before the action starts, and the high-speed shooting images of the action are recorded.

The recording methods having been described with reference to FIGS. 24, 25, and 26 are effective for the high-speed shooting by the direct scanning method or the pixel mixing method, as well as the high-speed shooting by the reduction method.

Next, the operation for the recording processes shown in FIGS. 24, 25, and 26 is explained with reference to FIGS. 27 and 28.

Figure 27:
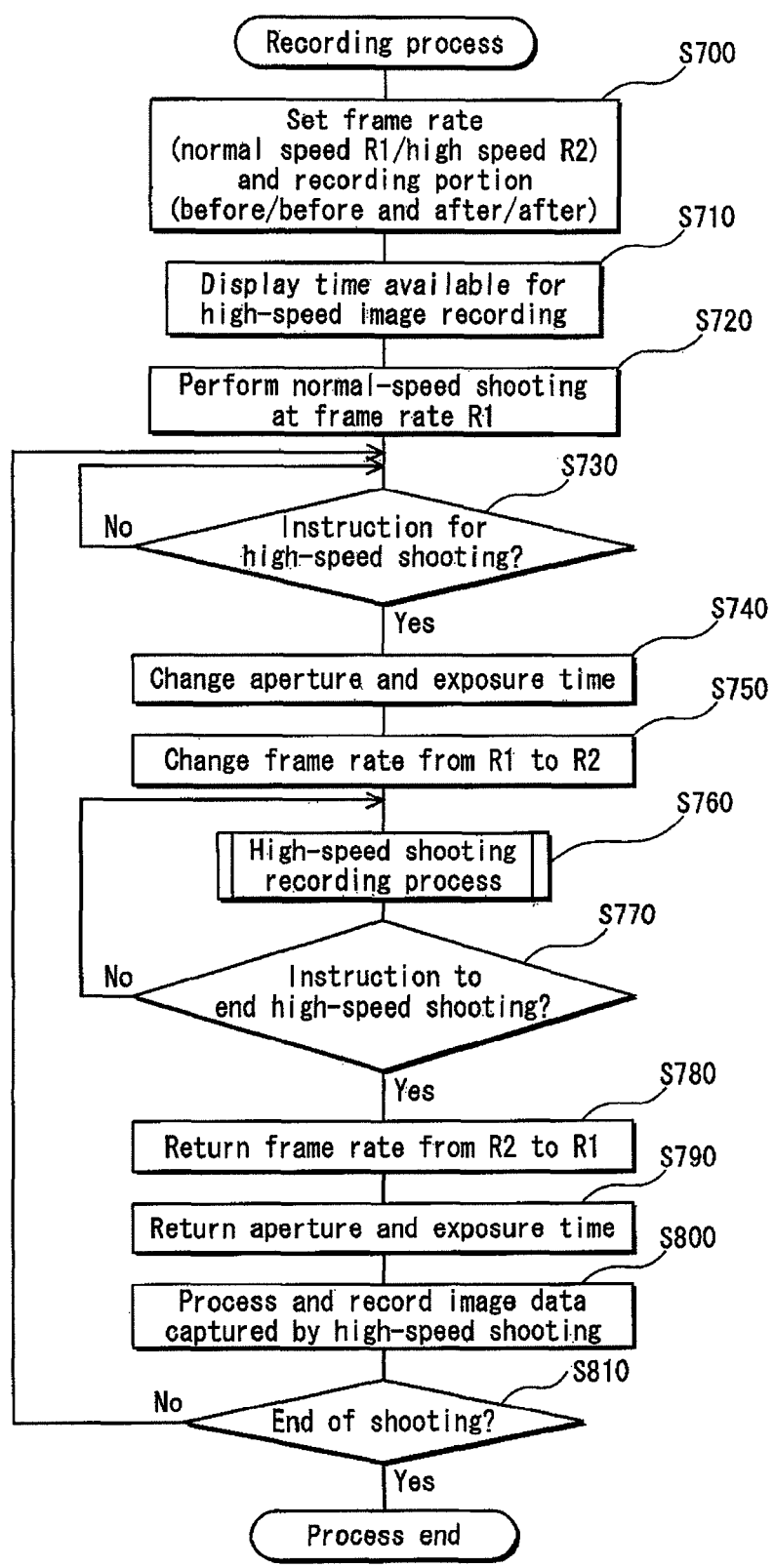
FIG. 27 is a flowchart showing the procedures of the recording process in the image shooting apparatus 1.

FIG. 27 is a flowchart showing the procedures of the recording process in the image shooting apparatus 1.

First, the image shooting apparatus 1 sets the recording mode to specify either the frame rate R1 for the normal shooting or the frame rate R2 for the high-speed shooting, and specify which among three portions (portions before, before and after, and after the input of the third trigger to start the high-speed shooting) should be recorded (step S700). For this setting, the mode dial 5 shown in FIG. 1 is used.

Upon detecting the setting, the whole apparatus control unit 100 calculates the value of "Tmax" which indicates the time period available for high-speed image recording, based on the frame rate R2 and the number of frames which can be recorded into the buffer memory 90, and displays the calculated value onto the liquid crystal monitor 17 (step S710).

The user then presses the shooting button 2 to start the normal shooting. Upon detecting the pressing of the button, the whole apparatus control unit 100 instructs the focus driving unit 32 and the like to start performing the normal, shooting at the frame rate R1 (step S720).

During the normal shooting, the user half-presses the high-speed shooting switch 16 to instruct the apparatus to start the high-speed shooting (step S730: YES). Upon detecting the pressing of the switch, the whole apparatus control unit 100 notifies the high-speed shooting control unit 48 that the high-speed shooting should be started.

Upon receiving the instruction to start the high-speed shooting, the high-speed shooting control unit 48 causes the aperture target value calculating unit 55 to calculate the aperture target value. The aperture target value calculating unit 55 calculates the aperture target value, and sends the calculated aperture target value to the high-speed shooting control unit 48. The high-speed shooting control unit 48 instructs the aperture driving unit 35 to start opening the aperture toward the aperture target value, and instructs the shutter time control unit 49 to start adjusting the exposure time in accordance with the aperture in transition (step S740).

When the aperture has reached the aperture target value, the frame rate is changed from R1 to R2 (step S750), and the recording process is performed (step S760). The recording process will be described in detail later with reference to FIG. 28.

After this, the user returns the high-speed shooting switch 16 to the non-pressed state to instruct the apparatus to end the high-speed shooting (step S770: YES). Upon detecting the operation of the switch, the whole apparatus control unit 100 notifies the high-speed shooting control unit 48 that the high-speed shooting should be ended.

Upon receiving the instruction to end the high-speed shooting, the high-speed shooting control unit 48 causes the aperture target value calculating unit 55 to calculate the aperture target value. The aperture target value calculating unit 55 calculates the aperture target value, and sends the calculated aperture target value to the high-speed shooting control unit 48. The high-speed shooting control unit 48 returns the frame rate from R2 to R1 (step S780), and return the values of aperture and exposure time to those for the normal shooting (step S790).

After this, the whole apparatus control unit 100 instructs the image signal processing unit 54 to process the high-speed shooting image data recorded in the buffer memory 90, and record the processed image data into the recording medium 91 (step 800).

The user returns the shooting button 2 to the non-pressed state to instruct the apparatus to end the normal shooting (step S810: YES). Upon detecting the operation of the button, the whole apparatus control unit 100 performs the process for ending the normal shooting.

Next, the high-speed shooting recording process is described with reference to FIG. 28.

Figure 28:
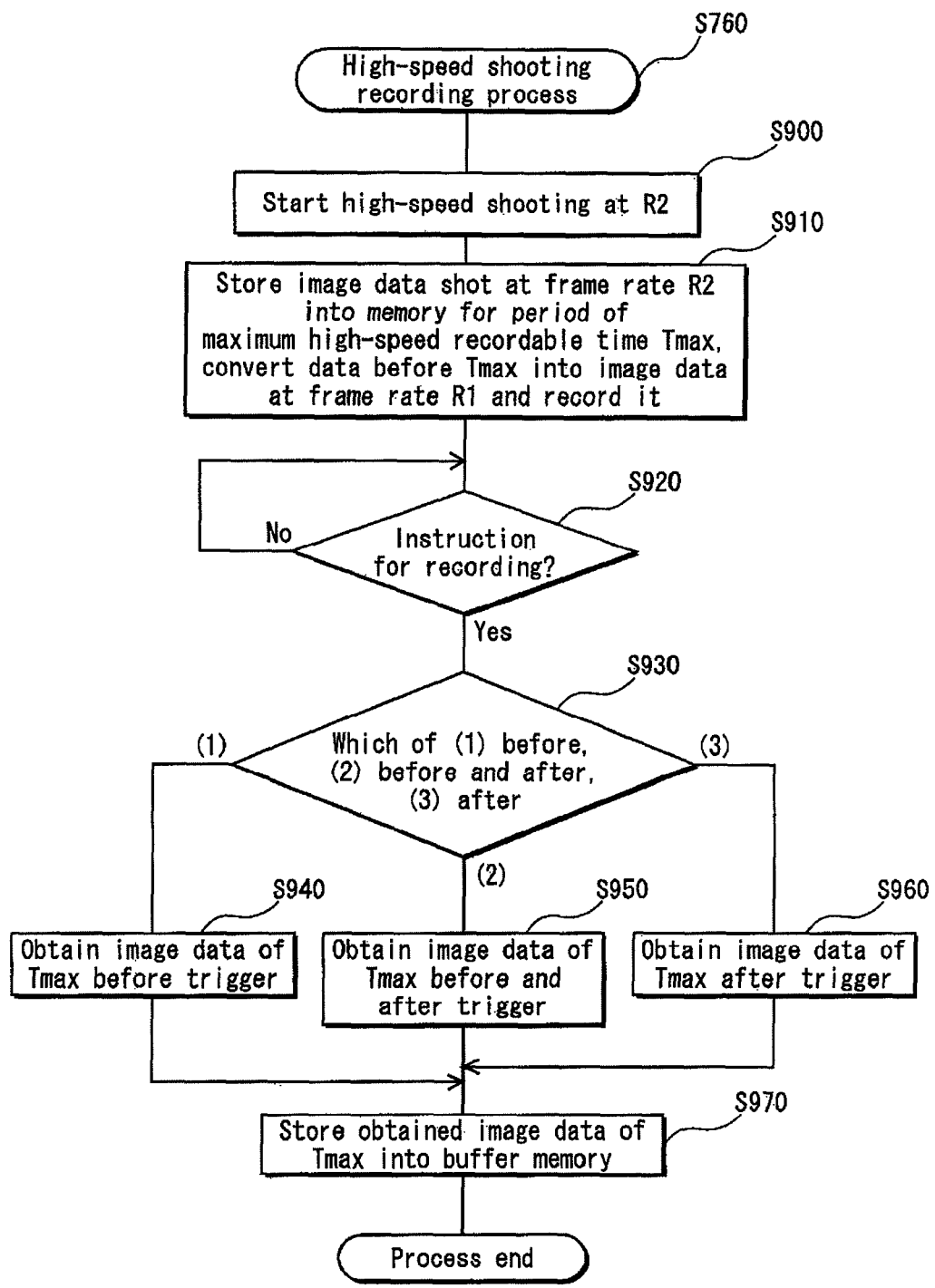
FIG. 28 is a flowchart of the high-speed shooting recording process.

FIG. 28 is a flowchart showing the procedure of the high-speed shooting recording process.

The image signal processing unit 54 processes the image data which is sent from the image sensor 40 via the front end unit 50 at the frame rate R2, and records the processed data into the buffer memory 90 (step S900).

The image signal processing unit 54 stores the high-speed shooting image data of images shot in the maximum high-speed recordable time period Tmax into the buffer memory 90, converts the data of images shot before the period Tmax from image data of frame rate R2 to image data of frame rate R1, and record the image data after the conversion into the recording medium 91 (step S910). This conversion is performed by the frame synthesizing unit 58.

The user fully presses the high-speed shooting switch 16 to instruct the recording (step S920: YES). Upon detecting the pressing of the switch, the whole apparatus control unit 100 instructs the image signal processing unit 54 to start recording. In so doing, the whole apparatus control unit 100 notifies the image signal processing unit 54 of the recording mode that has been set by the user preliminarily: to record image data of images shot before the input of the recording instruction; to record image data of images shot before and after the input of the recording instruction; or to record image data of images shot after the input of the recording instruction.

Upon receiving the instruction, the image signal processing unit 54 obtains high-speed shooting image data of images shot in the period Tmax, in accordance with the notified recording mode, and records the obtained image data into the buffer memory 90 (step S970). The obtained image data other than the image data of images shot in the period Tmax is converted into the image data of images shot at the frame rate R1, and the converted data is recorded into the recording medium 91.

When the notified recording mode indicates that the image data before the input of the recording instruction should be recorded (step S930: (1)), the image signal processing unit 54 obtains the image data of images shot in the period Tmax before the input of the recording instruction (step S940); when the notified recording mode indicates that the image data before and after the input of the recording instruction should be recorded (step S930: (2)), the image signal processing unit 54 obtains the image data of images shot in the period Tmax before and after the input of the recording instruction (step S950); and when the notified recording mode indicates that the image data after the input of the recording instruction should be recorded (step S930: (3)), the image signal, processing unit 54 obtains the image data of images shot in the period Tmax after the input of the recording instruction (step S960).

<Method of Recording Frames at Shooting Mode Change>

When the shooting mode is changed from the normal shooting to the high-speed shooting, there may be a case where one frame of image cannot be guaranteed. The following describes how to deal with the case.

The case in concern may occur when the frame rates are changed by the reduction method (see FIG. 4). In other words, the image signal may be interrupted for a period corresponding to one frame when the scanning method is changed, namely, when the scanning method is changed from the full scanning to the reduction scanning, or from the reduction scanning to the full scanning.

Figure 29:
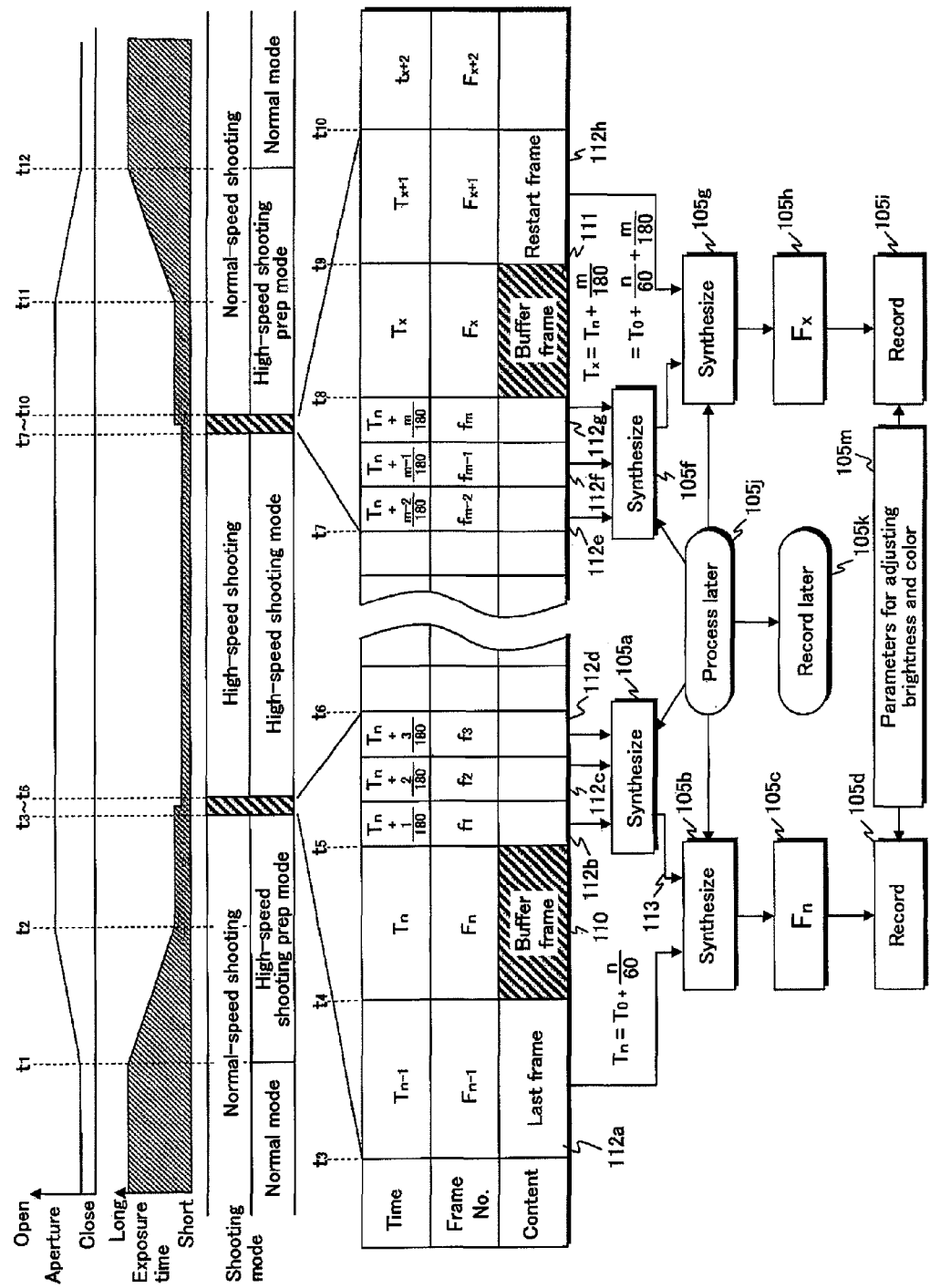
FIG. 29 shows how to generate a frame when the frame rate is changed.

The following describes how to generate one frame of image when one frame of image cannot be guaranteed, with reference to FIG. 29.

FIG. 29 shows how to generate a frame when the frame rate is changed.

FIG. 29, like FIG. 5, shows time charts regarding the aperture; exposure time, and shooting mode and the frame transition table when a normal shooting, a high-speed shooting, and a normal shooting are performed in the stated order. The lower part of FIG. 29 shows the flow of the frame synthesizing process.

The frame corresponding to the period from time t4 to time t5 and the frame corresponding to the period from time t8 to time t9 are frames that cannot be guaranteed. In FIG. 29, these frames are referred to as buffer frames 110 and 111, respectively.

That is to say, the buffer frame 110 is inserted between the last frame 112a of the normal shooting shot at the normal frame rate, and the first frame 112b of the high-speed shooting shot at the high-speed frame rate, and the change of the scanning method for the image sensor 40 is performed during the buffer time. This structure produces an advantageous effect that it is possible to prevent an influence of an output interrupted image signal.

The buffer frame 111 placed after the high-speed shooting is inserted between the frame 112g and the frame 112h.

However, by inserting these buffers, there is no image information of the frame corresponding to the period from time t4 to time t5 and the frame corresponding to the period from time t8 to time t9. This prevents images from being shot seamlessly.

To solve the blanks, the present invention, in step 105a, generates a synthesized frame 113 by synthesizing frames 112b, 112c, and 112d of images shot at the high-speed frame rate.

Next, the present invention, in step 105b, generates a synthesized frame by synthesizing the synthesized frame 113 with a frame 112a of image shot at the formal frame rate.

In step 105c, "Fn" is defined so that frames continue really or virtually between the last frame 112a and the frame 112b. In step 105d, the data is recorded into the memory.

The buffer frame is processed similarly. Steps 105f, 105g, and 105h are performed, and the data is recorded into the memory in step 105i.

Note that, when these processes are performed during a shooting period, it gives an excessively heavy load onto the CPU or the image signal processing unit 54. Accordingly, as shown in steps 105j and 105k, the processes and recording-ere performed after the shooting ends. This produces an advantageous effect that an excessively heavy load is prevented and the structure is simplified.

In this way, according to the present invention, the buffer frames 110 and 111 are inserted, and images are supplemented based on the frames that precede and follow the vacancies that are created after the buffer frames are extracted. This produces an advantageous effect that the connection among the frames is made smooth, and images can be shot continuously and seamlessly.

Figure 30:
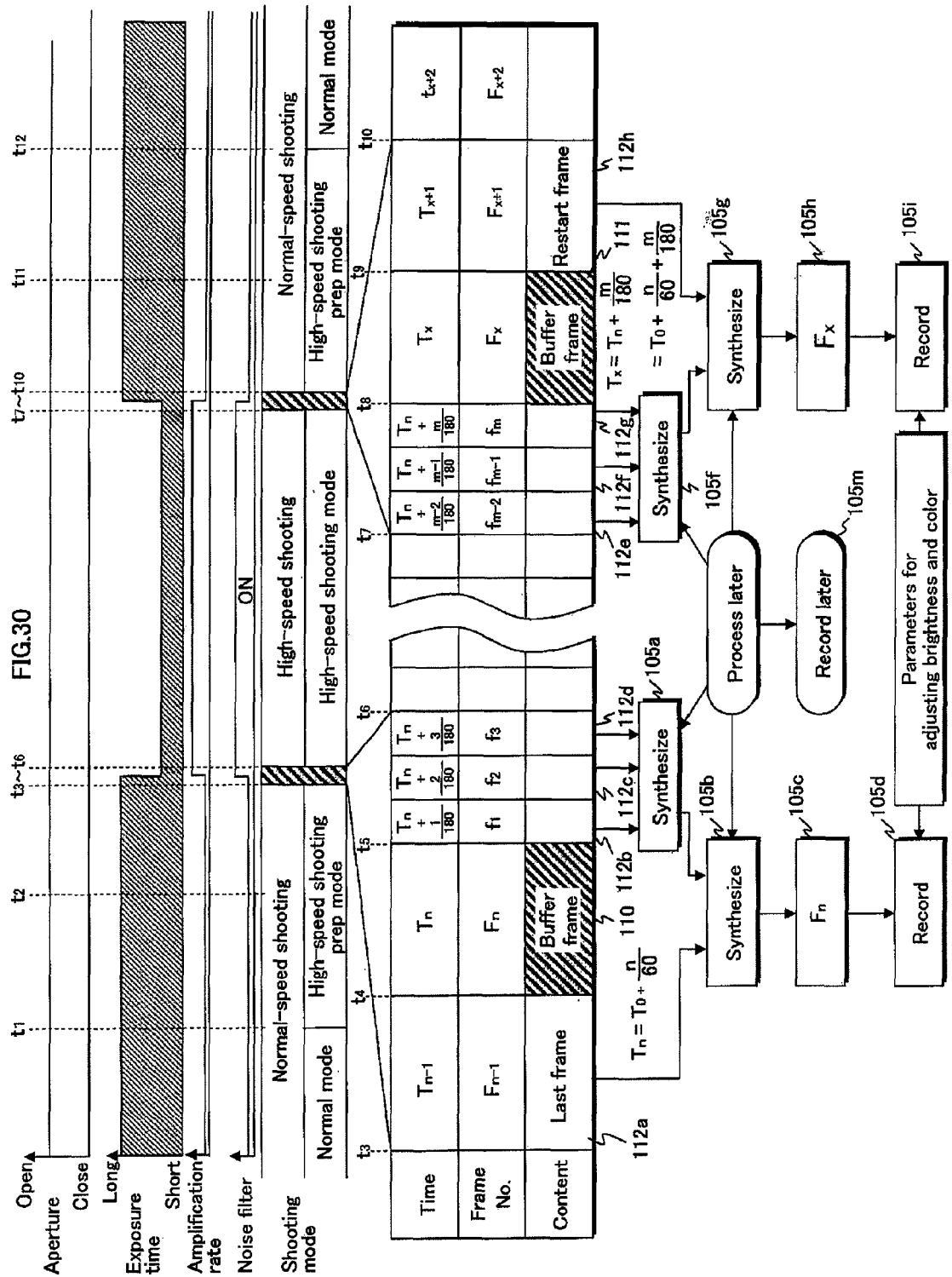
FIG. 30 shows an example in which the aperture correction method has been replaced with the gain correction method.

FIG. 30 shows an example in which the aperture correction method shown in FIG. 29 has been replaced with the gain correction method shown in FIG. 8. The operation of this example is the same as the one having explained earlier, and thus description thereof is omitted.

<Reproduction Method with Reduction Method>

Next, a method of reproducing the recorded image data will be described.

Figure 31:
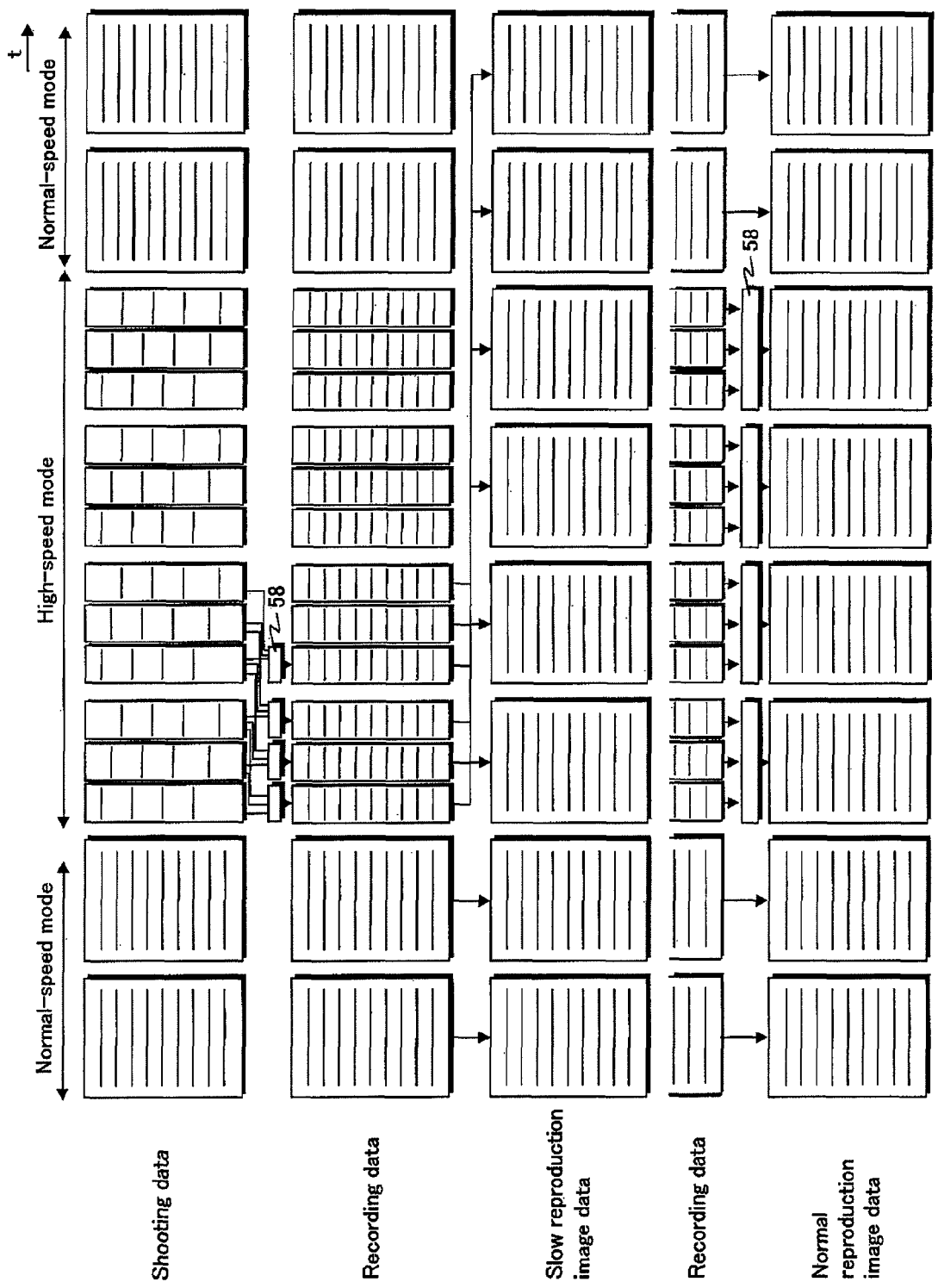
FIG. 31 shows the method of reproducing the image data of images that were shot by the reduction method.

FIG. 31 shows the method of reproducing the image data of images that were shot by the reduction method. In FIG. 31, each rectangular box represents one frame, and horizontal lines in each frame indicate scanned lines. It is, presumed here that the frame rate for the high-speed shooting mode is 180 fps, and the frame rate for the normal-speed shooting mode is 60 fps.

The first row shows image data of images that were actually shot by the reduction method. The second row shows image data that is being recorded. The third row shows slow reproduction image data.

The fourth row shows the same image data as the second row. The fifth row shows normal reproduction image data.

In this example, among the image data obtained by shooting, the frame synthesizing unit 58 converts reduction-format frames, which are frames of images shot by the reduction method, into full-line format frames by interpolating the missing lines by referring to other frames, and stores the full-line format frames (see the second row). One example of this method will be described later with reference to FIG. 32. This recording method makes it possible for the recorded image data to be reproduced by a general-purpose reproduction apparatus.

When the recorded data is reproduced as it is at the normal frame rate, the portion of the data of images that were shot in the high-speed mode is reproduced as an slow image (see the third row).

To reproduce the recorded data normally, every three high-speed frames of images shot in the high-speed mode are synthesized into one frame by the frame synthesizing unit 58 (see the fourth row), and when the synthesized frames are reproduced at the normal frame rate, the images are reproduced as normal-speed images (see the fifth row).

The image data of images, which were shot in the high-speed shooting period by the reduction method as shown in the first row, can be reproduced substantially at the normal speed when the frame is output once every three frames as shown in the fourth and fifth rows, with the images moving in substantially the same way as images shot in the normal-speed shooting period. Note that the image data of images shot by the direct method with a high-speed scanning are the same as the recording data shown in the second row of FIG. 31, thus can be reproduced at the normal speed in the same way.

Next, a method of generating full-line format frames from reduction-format frames will be described with reference to FIGS. 32 through 36.

Figure 32:
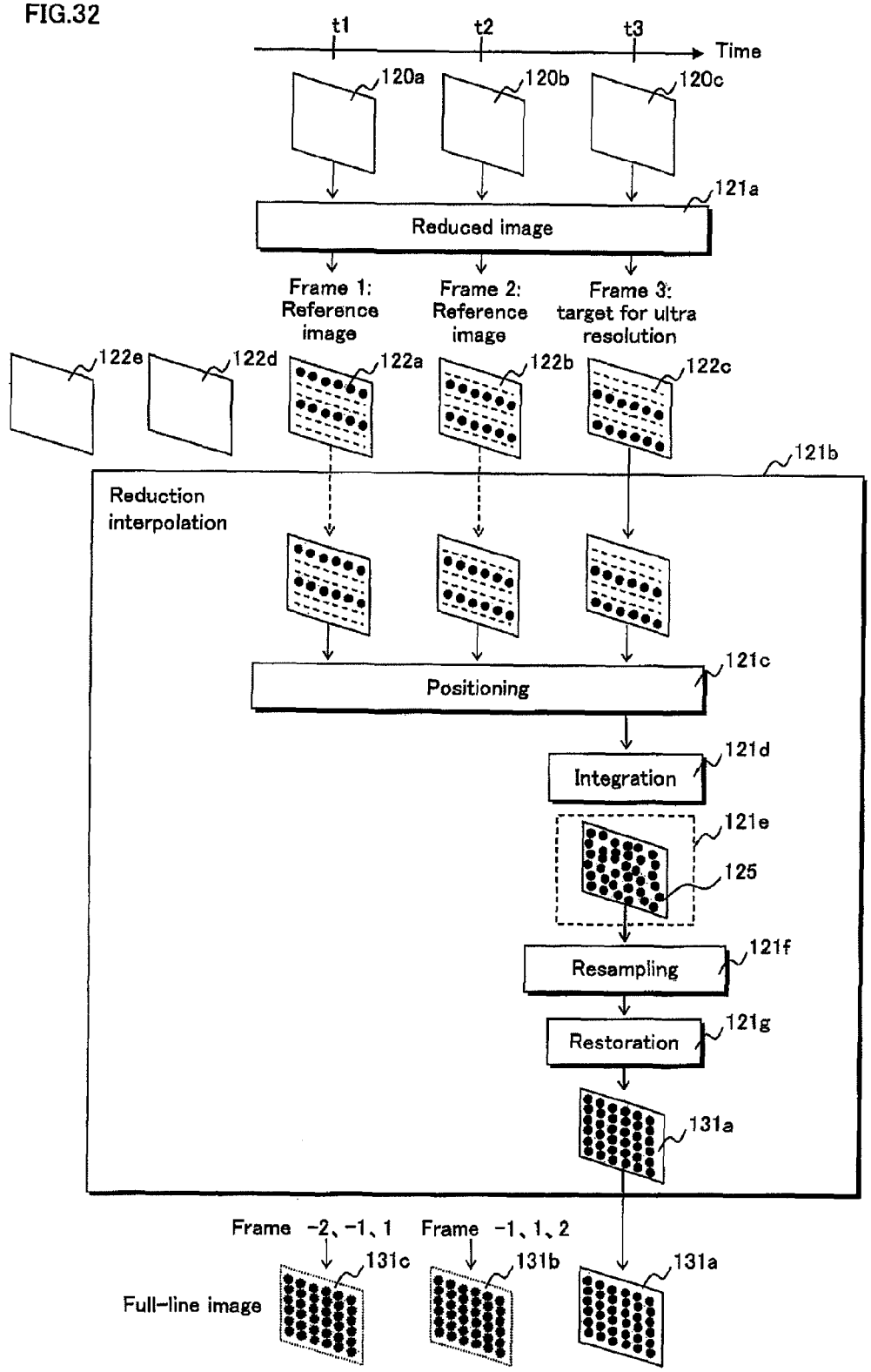
FIG. 32 shows a flow of the reduction interpolation process.

FIG. 32 shows a flow of the reduction interpolation process.

Frames 120a, 120b, and 120c are subjected to the reduction scanning (step 121a), and are output as reduced images 122a, 122b, and 122c.

The reduced images are subjected to a motion correction performed by a motion detecting unit 126 shown in FIG. 2, and are subjected to a positioning (step 121c) to be positioned in units of blocks by a position adjusting unit 124 of a reduction interpolating unit 123 (step 121b).

The pixels having passed through these processes are integrated by an integrating unit 128 (step 121d) into an integrated image 125 (step 121e), and the integrated image 125 is subjected to a re-sampling performed by a re-sampling unit (step 121f). Note that the re-sampling is, when the positioning is performed in accuracy of a small number of pixels, round off the positioning results to the closest integer pixel positions.

After this, when it is found that the reduced images have not been positioned correctly due to the occlusion, deformation, or excessively large motion vector, a restoring unit 130 performs a restoration and obtains, for example, a full-line image 131a of 1080 P (step 121g).

Figure 36:
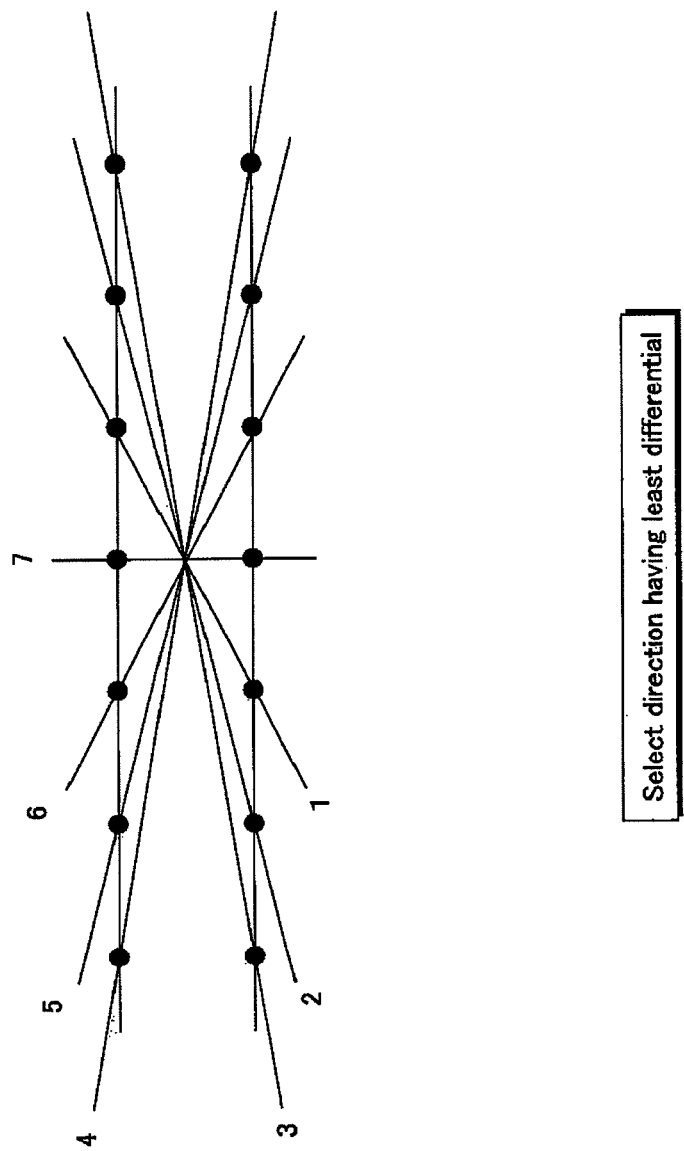
FIG. 36 shows positioning in reduced images.

Note that the restoration is what is call in-screen interpolation. As shown in FIG. 36, a differential detecting unit 127 obtains a differential between pixels on each line in directions 1 through 7, selects a direction having the least differential, and interpolates pixels of the reduced lines by using the pixels of the selected direction. For example, pixels of the reduced scanning lines are generated from two pixels positioned on selected scanning lines in the direction having the least differential.

Similarly, the frame 131b that precedes the full-line image 131a is obtained from the three reduced images 122d, 122a, and 122b; and the frame 131c that precedes the frame 131b is obtained from the three reduced images 122e, 122d, and 122a, both by the interpolation performed by the reduction interpolation unit 121b.

Here, the reduction interpolation process is described with reference to FIG. 33.

Figure 33:
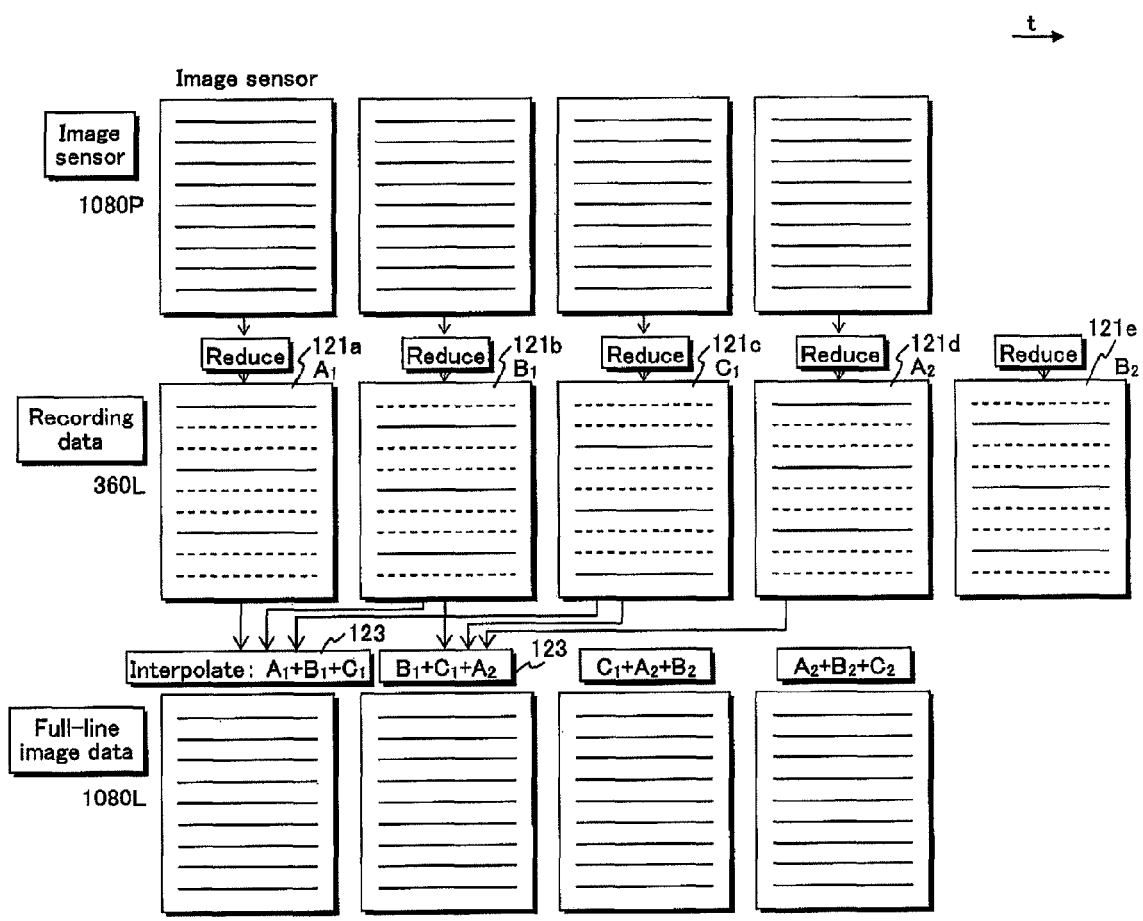
FIG. 33 shows the reduction interpolation process.

The first row of FIG. 33 shows images shot by the image sensor 40, and the second row shows recorded image data. The recorded image data shown in FIG. 33 is, different from FIG. 31, data of reduced frames.

The third row shows full-line image data.

First, a reduction is performed onto the images shot by the image sensor 40 (see the first row) to obtain reduced images 121a, 121b, 121c, and 121d (see the second row).

In this example, the reduced images are recorded. However, as shown in the third row, full-line images 131a, 131d, 131e, and 131f may be obtained by an interpolation, and the obtained full-line images may be recorded.

It is necessary to determine which of the reduced images and the full-line image's should be recorded, depending on the data processing ability of the image shooting apparatus. To interpolate a full-line image 131 shown in FIG. 32, high data processing capability and power are necessary.

For this reason, to perform the real-time interpolation process and video encoding process onto full-line images in a camera, it is necessary to wait for a great improvement in the semiconductor technology.

In view of this, the present invention proposes a practical method.

The reduced images 121a and the like shown in the second row of FIG. 33 do not suit for the display on the screen as they are because moire or the like may occur due to aliasing noise.

Figure 34:
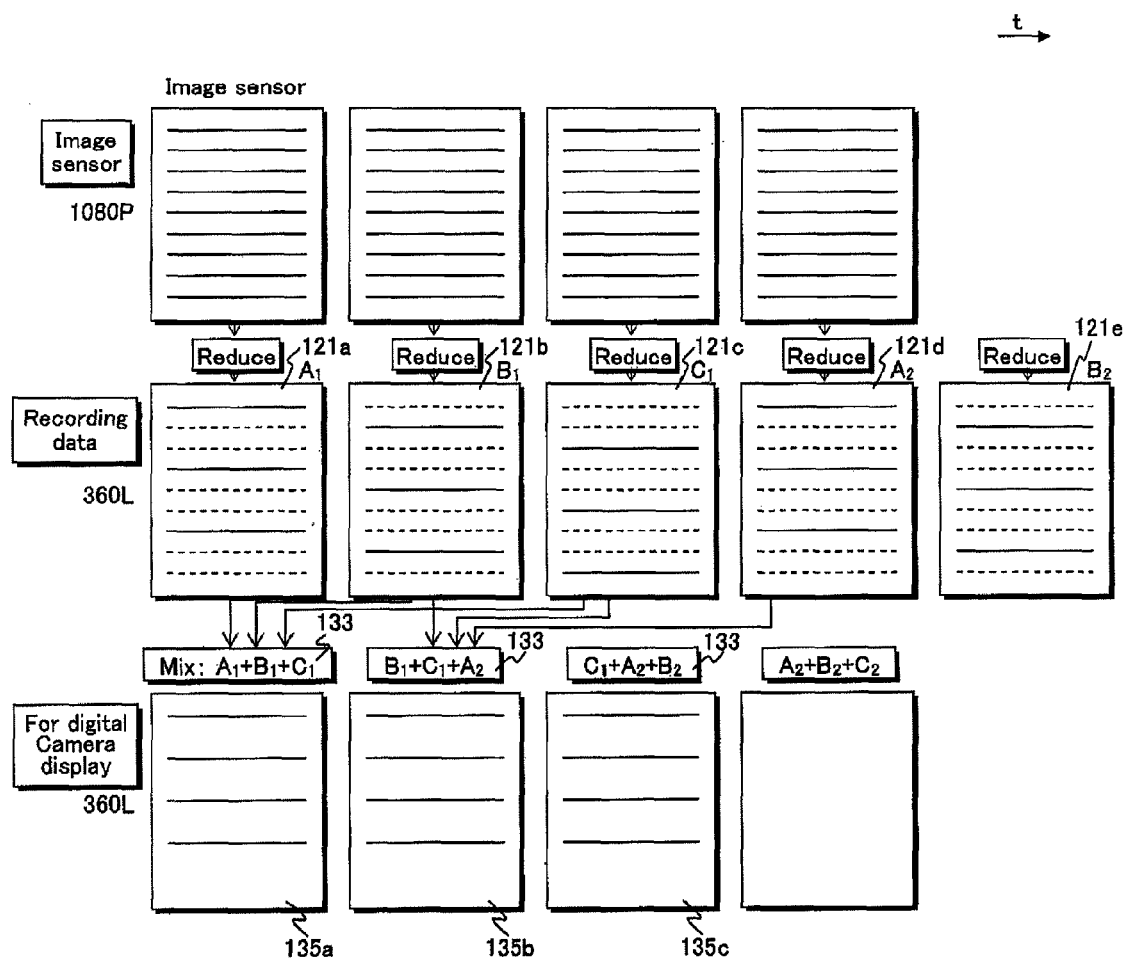
FIG. 34 shows the reduction interpolation process.

Accordingly, as shown in FIG. 34, the reduced images 121a, 121b, and 121c are subjected to a motion correction performed by a motion detecting unit 134 in a synthesizing unit 138. And a mixing unit 133 generates lines by mixing lines in the vertical direction.

With this, a mixed image 135a which includes, in the vertical direction, lines that are ⅓ of those of the original image is obtained.

Mixed images 135b and 135c are also obtained in a similar manner. These images do not have moire or the like due to aliasing noise, and can be used as images to be displayed on the camera. The number of lines is ⅓ of the original, but since the screen size of the digital camera is small, it does not cause a large problem.

Also, this interpolation process requires ⅓ amount of processing of, the interpolation process for the full-line images, thus can be processed even by a digital camera. Also, this interpolation process produces an advantageous effect that it requires ⅓ power consumption of the interpolation process for the full-line images and thus can reduce the battery capacity.

Note that general users cannot discern between a normal image and an image of ⅓ lines on a small screen of a digital camera.

However, users often zoom up an image to check the focus or the like. In that case, the mixed image having ⅓ number of lines appears to have rough resolution.

Figure 35:
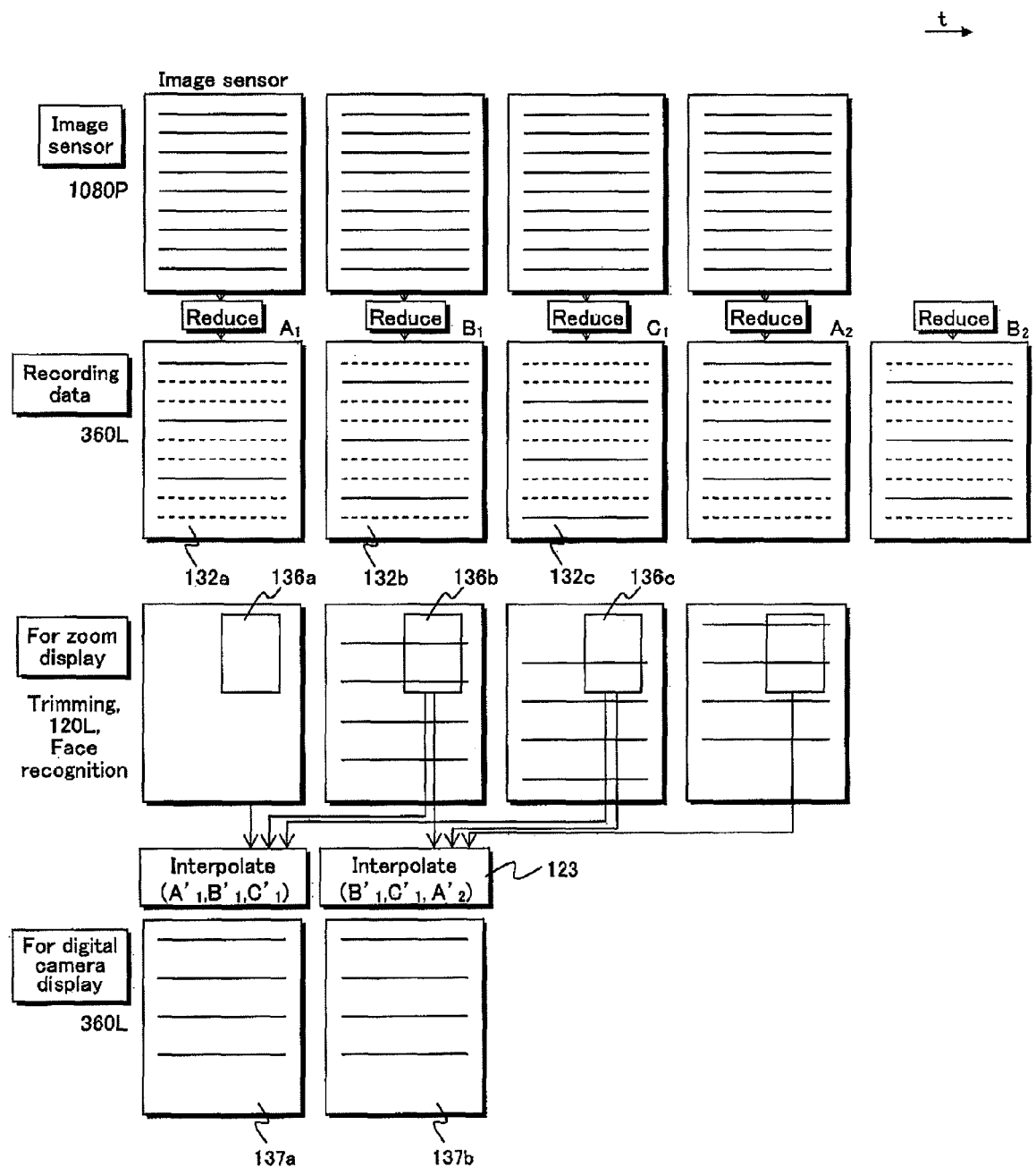
FIG. 35 shows the reduction interpolation process in zooming operation.

In view of this, the present invention provides an improvement as shown in FIG. 35. In this improvement, up to a predetermined level of zooming up, the zoomed image has a rough resolution. However, when the image is zoomed up over the predetermined level, partial areas 136a, 136b, and 136c (shown in the third row) of reduced images 132a, 132b, and 132c (shown in the second row) are displayed as partially interpolated areas 137a, 137b and the like, which are obtained by interpolation performed by the reduction interpolating unit 123.

The resolution of the partially interpolated areas 137a, 137b and the like is the same as that of the full-line image 131; only with respect to these partial areas. Accordingly, with the zoom-up, an image having the same resolution as a full-line image is displayed on the screen of the digital camera, making it possible for the user to check the focus or the like. This method performs the interpolation process onto only a partial area. Thus, it requires 1/n (for example, ⅓) amount of processing of other methods and ⅓ power consumption. This makes it possible to produce an advantageous effect that a practical digital camera is realized.

<Supplementary Notes>.

Up to now, the present invention has been described through several embodiments thereof. However, the present invention is not limited to these embodiments, but includes, for example, the following modifications.

(1) Part or all of the constituent elements of the image shooting apparatus shown in FIG. 3 may be realized as an integrated circuit composed of one chip or a plurality of chips. For example, a portion encircled with a dotted line in FIG. 3 may be realized in one chip.

(2) Part or all of the constituent elements of the image shooting apparatus shown in FIG. 3 may be realized as a computer program, or may be realized in any other form.

When part or all of the constituent elements are realized as a computer program, the computer program may be written in any recording medium such as a memory card or a CD-ROM, and the computer program may be read out by a computer to be run on the computer, or may be downloaded into the computer via a network to be run on the computer.

The image shooting apparatus of the present invention, having a mechanism for keeping a constant amount of exposure when the shooting frame rate is switched, is useful as a high-speed camera that can shoot a subject that is moving at a high speed. The image shooting apparatus of the present invention is also applicable to the use as a video camera, a digital camera or the like that has a high-speed shooting function for shooting a subject that is moving at a high speed, while shooting a normal video image.

The invention claimed is:

1. An image shooting apparatus, comprising:
   an imaging unit operable to read out signals from an image sensor and output image frames in sequence at a predetermined frame rate, the image sensor collecting charges through a photoelectric conversion of incident light;
   a frame rate changing unit operable to change a frame rate while the imaging unit outputs the image frames in sequence;
   an aperture adjusting unit operable to adjust a level of aperture that determines an amount of the incident light;
   an exposure time adjusting unit operable to adjust an exposure time that is a time taken for collecting the charges through the photoelectric conversion of the incident light;
   a determining unit operable to determine a post-change aperture level so that a post-change amount is substantially equal to a pre-change amount, the post-change amount being an amount of collected charges corresponding to each frame of an image shot at a post-change frame rate, the pre-change amount being an amount of collected charges corresponding to each frame of an image shot at a pre-change frame rate, where the frame rate changing unit changes the frame rate from the pre-change frame rate to the post-change frame rate; and
   a control unit operable, before the change of the frame rate, to control the aperture adjusting unit to adjust the level of aperture to transit to the post-change aperture level determined by the determining unit, and to control the exposure time adjusting unit to adjust the exposure time in accordance with the level of aperture in transition so that the post-change amount of collected charges is substantially equal to the pre-change amount of collected charges,
   wherein the adjustment to the level of aperture by the aperture adjusting unit and the adjustment to the exposure time by the exposure time adjusting unit, under control by the control unit, are completed before the change of the frame rate is initiated,
   the post-change frame rate is higher than the pre-change frame rate, and
   the image shooting apparatus further comprises:
   a recording instruction obtaining unit operable to obtain an instruction for recording;
   a conversion unit operable to convert from an image frame output at the post-change frame rate to an image frame output at the pre-change frame rate; and
   a storage unit storing the image frames output from the imaging unit,
   wherein, when the recording instruction obtaining unit obtains the instruction for recording after the frame rate changing unit changes the frame rate, the storage unit stores a predetermined number of image frames before and after the receiving of the recording instruction, and image frames other than the image frames before and after the receiving of the recording instruction are converted conversion unit and results of the conversion are stored in the storage unit.

2. The image shooting apparatus of claim 1 further comprising
   an instruction obtaining unit operable to obtain from outside an instruction for changing the frame rate while the image frames are output by the imaging unit in sequence, wherein
   the determining unit determines the post-change aperture level when the instruction obtaining unit obtains the instruction for changing the frame rate, and
   when the instruction obtaining unit obtains the instruction, the control unit, before the change of the frame rate, controls the aperture adjusting unit and the exposure time adjusting unit to start adjusting respectively the level of aperture and the exposure time.

3. The image shooting apparatus of claim 1, wherein
   the determining unit further determines a post-change exposure time in accordance with the post-change frame rate, and when having determined the post-change exposure time to be "1/a" times the exposure time before the change, determines the post-change aperture level so that an area of opening of an aperture becomes substantially "a" times thereof, and
   the control unit controls the exposure time adjusting unit to adjust the exposure time to transit to the post-change exposure time determined by the determining unit.

4. The image shooting apparatus of claim 1, wherein
   after the frame rate changing unit returns the frame rate from the post-change frame rate to the pre-change frame rate, the control unit controls the aperture adjusting unit to adjust the level of aperture to transit from the post-change aperture level to an aperture level before the change, and controls the exposure time adjusting unit to adjust the exposure time in accordance with the level of aperture in transition so that an amount of collected charges for each image frame after the return of the frame rate is substantially equal to an amount of collected charges for each image frame before the return.

5. An integrated circuit for use in an image shooting apparatus, the integrated circuit comprising:
   an imaging unit operable to read out signals from an image sensor and output image frames in sequence at a predetermined frame rate, the image sensor collecting charges through a photoelectric conversion of incident light;
   a frame rate changing unit operable to change a frame rate while the imaging unit outputs the image frames in sequence;
   an aperture adjusting unit operable to adjust a level of aperture that determines an amount of the incident light;
   an exposure time adjusting unit operable to adjust an exposure time that is a time taken for collecting the charges through the photoelectric conversion of the incident light;
   a determining unit operable to determine a post-change aperture level so that a post-change amount is substantially equal to a pre-change amount, the post-change amount being an amount of collected charges corresponding to each frame of an image shot at a post-change frame rate, the pre-change amount being an amount of collected charges corresponding to each frame of an image shot at a pre-change frame rate, where the frame rate changing unit changes the frame rate from the pre-change frame rate to the post-change frame rate; and a control unit operable, before the change of the frame rate, to control the aperture adjusting unit to adjust the level of aperture to transit to the post-change aperture level determined by the determining unit, and to control the exposure time adjusting unit to adjust the exposure time in accordance with the level of aperture in transition so that the post-change amount of collected charges is substantially equal to the pre-change amount of collected charges, wherein the adjustment to the level of aperture by the aperture adjusting unit and the adjustment to the exposure time by the exposure time adjusting unit, under control by the control unit, are completed before the change of the frame rate is initiated, the post-change frame rate is higher than the pre-change frame rate, and the image shooting apparatus further comprises:

a recording instruction obtaining unit operable to obtain instruction for recording;

a conversion unit operable to convert from an image frame output at the post-change frame rate to an image frame output at the pre-change frame rate; and a storage unit storing the image frames output from the imaging unit, wherein, when the recording instruction obtaining unit obtains the instruction for recording after the frame rate changing unit changes the frame rate, the storage unit stores a predetermined number of image frames before and after the receiving of the recording instruction, and image frames other than the image frames before and after the receiving of the recording instruction are converted by the conversion unit and results of the conversion are stored in the storage unit.

6. An image shooting method for use in an image shooting apparatus, the image shooting method comprising the steps of:

reading out signals from an image sensor and outputting image frames in sequence at a predetermined frame rate, the image sensor collecting charges through a photoelectric conversion of incident light;

changing a frame rate while the image frame outputting step outputs the image frames in sequence;

adjusting a level of aperture that determines an amount of the incident light;

adjusting an exposure time that is a time taken for collecting the charges through the photoelectric conversion of the incident light;

determining a post-change aperture level so that a post-change amount is substantially equal to a pre-change amount, the post-change amount being an amount of collected charges corresponding to each frame of an image shot at a post-change frame rate, the pre-change amount being an amount of collected charges corresponding to each frame of an image shot at a pre-change frame rate, where the frame rate changing step changes the frame rate from the pre-change frame rate to the post-change frame rate; and before the change of the frame rate, controlling the aperture adjusting step to adjust the level of aperture to transit to the post-change aperture level determined by the determining step, and controlling the exposure time adjusting step to adjust the exposure time in accordance with the level of aperture in transition so that the post-change amount of collected charges is substantially equal to the pre-change amount of collected charges, wherein the adjustment to the level of aperture by the aperture adjusting step and the adjustment to the exposure time by the exposure time adjusting step, under control by the control step, are completed before the change of the frame rate is initiated the post-change frame rate is higher than the pre-change frame rate, the image shooting method further comprises:

obtaining an instruction for recording;

converting from an image frame output at the post-change frame rate to an image frame output at the pre-change frame rate; and storing the image frames output, wherein, when the instruction is obtained for recording after the frame rate is changed, a predetermined number of image frames is stored before and after the receiving of the recording instruction, and image frames other than the image frames before and after the receiving of the recording instruction are converted and results of the conversion are stored.

* * * * *